(12) United States Patent
Nakashio et al.

(10) Patent No.: US 11,322,177 B2
(45) Date of Patent: May 3, 2022

(54) ORIENTATION DEVICE, PRODUCTION METHOD FOR MAGNETIC RECORDING MEDIUM, AND MAGNETIC RECORDING MEDIUM

(71) Applicant: Sony Corporation, Tokyo (JP)

(72) Inventors: Eiji Nakashio, Miyagi (JP); Hidetoshi Sakuma, Miyagi (JP); Shuhei Matsuya, Miyagi (JP); Hidetoshi Nishiyama, Kanagawa (JP); Jun Sasaki, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/613,700

(22) PCT Filed: Mar. 6, 2019

(86) PCT No.: PCT/JP2019/008847
§ 371 (c)(1),
(2) Date: Nov. 14, 2019

(87) PCT Pub. No.: WO2019/176684
PCT Pub. Date: Sep. 19, 2019

(65) Prior Publication Data
US 2020/0402533 A1  Dec. 24, 2020

(30) Foreign Application Priority Data
Mar. 16, 2018 (JP) .............................. JP2018-049088

(51) Int. Cl.
*G11B 5/78* (2006.01)
*G11B 5/845* (2006.01)
(Continued)

(52) U.S. Cl.
CPC ................ *G11B 5/845* (2013.01); *G11B 5/68* (2013.01); *G11B 5/70626* (2013.01);
(Continued)

(58) Field of Classification Search
None
See application file for complete search history.

(56) References Cited

U.S. PATENT DOCUMENTS 5,181,020 A * 1/1993 Furukawa ................ G01D 5/14
148/100
5,932,330 A * 8/1999 Ohkubo ................. G11B 5/842
428/216

(Continued)

FOREIGN PATENT DOCUMENTS

JP  S62-006442 A  1/1987
JP  H01-235029 A  9/1989

(Continued)

OTHER PUBLICATIONS

International Search Report and Written Opinion issued in connection with PCT Application No. PCT/JP2019/008847, dated Apr. 9, 2019. (9 pages).

*Primary Examiner* — Jefferson A Evans
(74) *Attorney, Agent, or Firm* — K&L Gates LLP

(57) ABSTRACT

[Object] To provide technologies such as an orientation device capable of increasing strength of a magnetic field in a transport path.
[Solving Means] An orientation device according to the present technology includes a transport path, a permanent magnet portion, and a yoke portion. The transport path allows a base on which a magnetic coating film containing magnetic powder has been formed to pass through the transport path along a transport direction. The permanent magnet portion includes a plurality of first permanent magnets, and a plurality of second permanent magnets that is opposed to the plurality of first permanent magnets across the transport path in a vertical direction that is vertical to the transport direction in a manner that opposite poles face each other, the permanent magnet portion vertically orienting (Continued)

particles of the magnetic powder by applying a magnetic field to the magnetic coating film on the base that passes through the transport path. The yoke portion is made of a soft magnetic material, and connects to poles on a side opposite to the transport path side of the plurality of first permanent magnets, and to poles on a side opposite to the transport path side of the plurality of second permanent magnets.

19 Claims, 24 Drawing Sheets

(51) Int. Cl.
  *G11B 5/706*    (2006.01)
  *G11B 5/712*    (2006.01)
  *G11B 5/68*     (2006.01)
  *G11B 5/852*    (2006.01)

(52) U.S. Cl.
  CPC .......... *G11B 5/70678* (2013.01); *G11B 5/712* (2013.01); *G11B 5/78* (2013.01); *G11B 5/852* (2013.01)

(56) References Cited

U.S. PATENT DOCUMENTS

| | | | | |
|---|---|---|---|---|
| 6,030,695 | A * | 2/2000 | Ohkubo | G11B 5/7022 428/216 |
| 6,261,647 | B1 * | 7/2001 | Komatsu | G11B 5/845 118/620 |
| 6,885,513 | B1 * | 4/2005 | Baker | G11B 5/865 360/15 |
| 6,960,385 | B2 * | 11/2005 | Huelsman | G11B 5/70 428/323 |
| 10,145,913 | B2 * | 12/2018 | Hugon | H01F 7/064 |
| 2002/0102351 | A1 * | 8/2002 | Noguchi | G11B 5/845 427/128 |
| 2003/0157371 | A1 * | 8/2003 | Ihara | G11B 5/845 428/842.2 |
| 2005/0111123 | A1 * | 5/2005 | Sakaguchi | G11B 5/855 360/16 |
| 2006/0024532 | A1 * | 2/2006 | Murao | G11B 5/7369 428/832.1 |
| 2006/0158818 | A1 * | 7/2006 | Fujisawa | G11B 5/865 361/143 |
| 2007/0014044 | A1 * | 1/2007 | Kitamura | G11B 5/0245 360/66 |
| 2007/0166571 | A1 * | 7/2007 | Meguro | G11B 5/733 428/840 |
| 2010/0079892 | A1 * | 4/2010 | Kubota | G11B 5/865 360/55 |
| 2010/0227201 | A1 * | 9/2010 | Sasaki | G11B 5/70 428/839 |
| 2013/0302532 | A1 * | 11/2013 | Abarra | G11B 5/84 427/543 |
| 2017/0287518 | A1 * | 10/2017 | Aoshima | G11B 5/7023 |
| 2017/0316799 | A1 * | 11/2017 | Shimizu | G11B 5/70 |
| 2020/0312364 | A1 * | 10/2020 | Terakawa | G11B 5/733 |
| 2020/0312365 | A1 * | 10/2020 | Yamaga | G11B 5/78 |

FOREIGN PATENT DOCUMENTS

| | | |
|---|---|---|
| JP | H04-028015 A | 1/1992 |
| JP | H0428015 A | 1/1992 |
| JP | 2011054230 A | 3/2011 |
| JP | 2011-138565 A | 7/2011 |
| JP | 2011-138566 | 7/2011 |

* cited by examiner

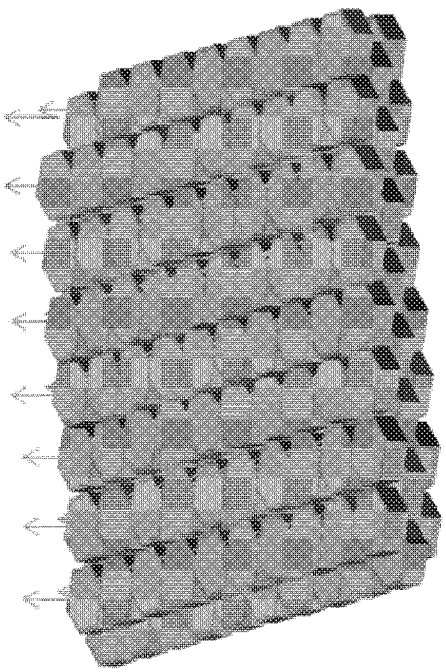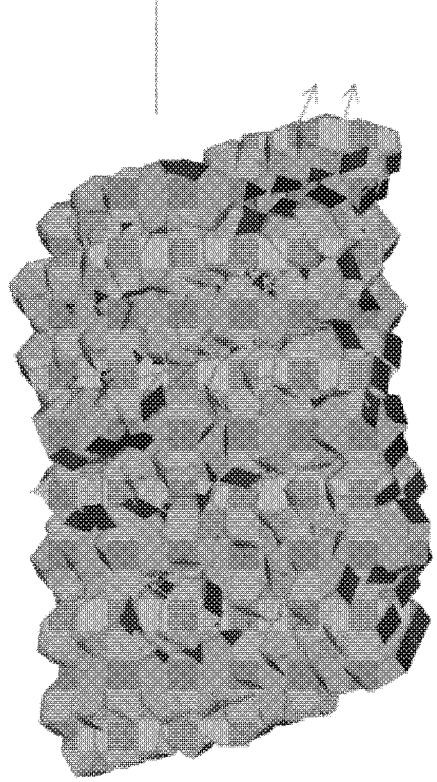
FIG.9

| | Permanent magnet | Strength (T) of magnetic field | Strength of magnetic field / coercive force of magnetic powder | Squareness ratio in vertical direction |
|---|---|---|---|---|
| Comparative Example 1 | NdFeB | 0.28 | 0.9 | 0.68 |
| Example 1 | NdFeB | 0.31 | 1.0 | 0.82 |
| Example 2 | NdFeB | 0.42 | 1.4 | 0.83 |
| Example 3 | NdFeB | 0.6 | 2.0 | 0.83 |
| Example 4 | NdFeB | 0.8 | 2.7 | 0.83 |
| Example 5 | NdFeB | 0.95 | 3.2 | 0.83 |

| | Permanent magnet | Remanent magnetic-flux density (T) of magnet | Magnet width (mm) | Material of yoke portion | Saturation magnetic-flux density of yoke portion | Thickness (mm) of yoke portion | Minimum strength (T) of magnetic field in transport path | Coercive force (Oe) of magnetic powder | Strength of magnetic field (equal to or higher than coercive force) | Bmag×W <Byoke×2T | Strength (Oe) of leakage magnetic field |
|---|---|---|---|---|---|---|---|---|---|---|---|
| Example 6 | NdFeB | 1.23 | 150 | SS400 | 1.7 | 55 | 0.8 | 3000 | ○ | ○ | ○ 9 |
| Comparative Example 2 | NdFeB | 1.23 | 150 | SS400 | 1.7 | 40 | 0.72 | 3000 | ○ | × | × 1050 |
| Comparative Example 3 | NdFeB | 1.23 | 150 | SS400 | 1.7 | 20 | 0.6 | 3000 | ○ | × | × 2080 |
| Example 7 | NdFeB | 1.23 | 150 | permalloy | 1 | 90 | 0.8 | 3000 | ○ | ○ | ○ 10 |
| Comparative Example 4 | NdFeB | 1.23 | 150 | permalloy | 1 | 75 | 0.6 | 3000 | ○ | × | × 1150 |
| Comparative Example 5 | NdFeB | 1.23 | 150 | permalloy | 1 | 40 | 0.5 | 3000 | ○ | × | × 2130 |
| Example 8 | NdFeB | 1.23 | 650 | SS400 | 1.7 | 240 | 0.8 | 3000 | ○ | ○ | ○ 6 |
| Comparative Example 6 | NdFeB | 1.23 | 650 | SS400 | 1.7 | 200 | 0.7 | 3000 | ○ | × | × 1180 |
| Comparative Example 7 | NdFeB | 1.23 | 650 | SS400 | 1.7 | 150 | 0.6 | 3000 | ○ | × | × 2150 |
| Example 9 | NdFeB | 1.23 | 650 | permalloy | 1 | 400 | 0.8 | 3000 | ○ | ○ | ○ 5 |
| Comparative Example 8 | NdFeB | 1.23 | 650 | permalloy | 1 | 350 | 0.6 | 3000 | ○ | × | × 1100 |
| Comparative Example 9 | NdFeB | 1.23 | 650 | permalloy | 1 | 255 | 0.5 | 3000 | ○ | × | × 2230 |

FIG.15

| | Permanent magnet | Magnetic flux density (T) | Magnet width (mm) | Material of yoke portion | Saturation magnetic-flux density of yoke portion | Thickness (mm) of yoke portion | Minimum strength (T) of magnetic field in transport path | Coercive force (Oe) of magnetic powder | Strength of magnetic field (equal to or higher than coercive force) | Bmag×W <Byoke×2T | Strength (Oe) of leakage magnetic field |
|---|---|---|---|---|---|---|---|---|---|---|---|
| Example 10 | NdFeB | 0.8 | 150 | SS400 | 1.7 | 40 | 0.8 | 3000 | ○ | ○ | ○ 10 |
| Comparative Example 10 | NdFeB | 0.8 | 150 | SS400 | 1.7 | 30 | 0.72 | 3000 | ○ | × | × 1120 |
| Comparative Example 11 | NdFeB | 0.8 | 150 | SS400 | 1.7 | 20 | 0.6 | 3000 | ○ | × | × 2180 |
| Example 11 | NdFeB | 0.8 | 650 | SS400 | 1.7 | 160 | 0.8 | 3000 | ○ | ○ | ○ 10 |
| Comparative Example 12 | NdFeB | 0.8 | 650 | SS400 | 1.7 | 120 | 0.6 | 3000 | ○ | × | × 1080 |
| Comparative Example 13 | NdFeB | 0.8 | 650 | SS400 | 1.7 | 100 | 0.5 | 3000 | ○ | × | × 2020 |

FIG.17

| | Permanent magnet | Magnet height (mm) | Distance X (mm) | X / magnet height | Coercive force (Oe) of magnetic powder | Minimum strength (T) of magnetic field in transport path | Strength of magnetic field |
|---|---|---|---|---|---|---|---|
| Comparative Example 14 | NdFeB | 25 | 4 | 0.16 | 3000 | 0.28 | × |
| Example 12 | NdFeB | 25 | 5 | 0.2 | 3000 | 0.31 | ○ |
| Example 13 | NdFeB | 25 | 10 | 0.4 | 3000 | 0.75 | ○ |
| Example 14 | NdFeB | 25 | 25 | 1.0 | 3000 | 0.75 | ○ |
| Comparative Example 15 | NdFeB | 50 | 4 | 0.1 | 3000 | 0.27 | × |
| Comparative Example 16 | NdFeB | 50 | 8 | 0.16 | 3000 | 0.29 | × |
| Example 15 | NdFeB | 50 | 10 | 0.2 | 3000 | 0.31 | ○ |
| Example 16 | NdFeB | 50 | 25 | 0.5 | 3000 | 0.75 | ○ |
| Example 17 | NdFeB | 50 | 50 | 1.0 | 3000 | 0.75 | ○ |

FIG.18

|  | Magnet width (mm) | Thickness (mm) of yoke portion | Thickness (mm) of magnet fixing plate (dummy) | Strength of magnetic field | Attractive force of yoke portion |
|---|---|---|---|---|---|
| Example 18 | 650 | 150 | 2 | ◎ | ○ |
| Example 19 | 650 | 150 | 3 | ◎ | ○ |
| Example 20 | 650 | 150 | 5 | ○ | ◎ |
| Comparative Example 21 | 650 | 150 | 1 | ◎ | × |
| Comparative Example 22 | 650 | 150 | 7 | × | ○ |
| Comparative Example 23 | 650 | 150 | 10 | × | ○ |

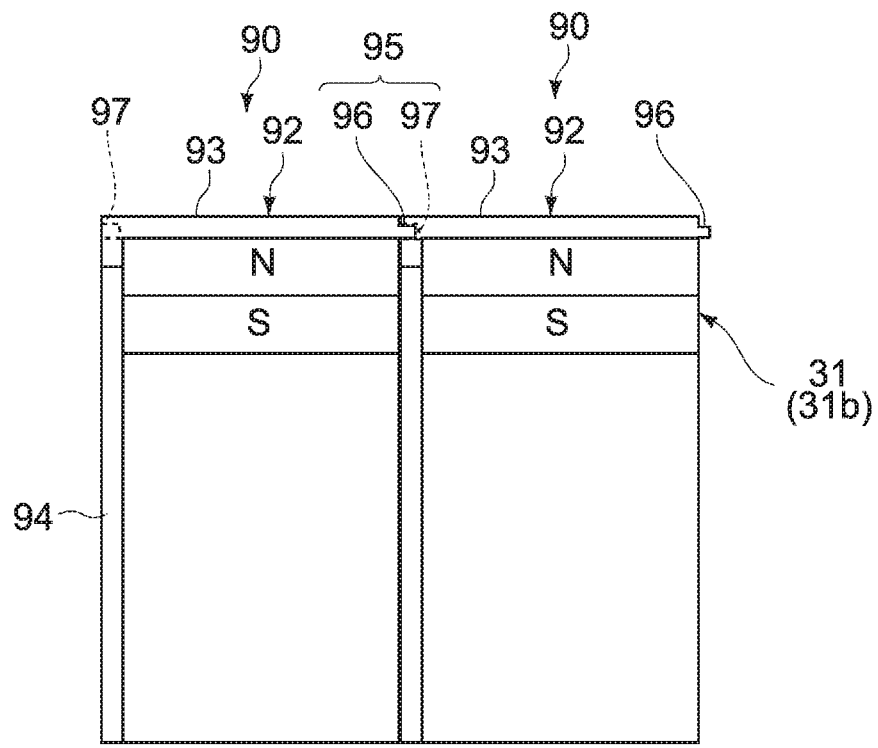
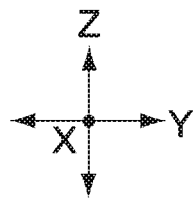
FIG.25

ORIENTATION DEVICE, PRODUCTION METHOD FOR MAGNETIC RECORDING MEDIUM, AND MAGNETIC RECORDING MEDIUM

TECHNICAL FIELD

The present technology relates to technologies such as an orientation device that orients particles of magnetic powder contained in a magnetic coating film.

BACKGROUND ART

In recent years, magnetic recording media have been widely used for various purposes such as storage of electronic data items. Generally, the magnetic recording media include a film-like base, a non-magnetic layer formed on the base, and a magnetic layer formed on the non-magnetic layer.

The magnetic layer is formed, for example, as follows. First, the magnetic coating film, which contains the particles of the magnetic powder and is in a wet condition, is formed on the non-magnetic layer. Then, while this magnetic coating film remains in the wet condition (under a state in which the particles of the magnetic powder are movable to some extent), a magnetic field is applied to the magnetic coating film. With this, individual ones of the particles of the magnetic powder are arrayed in one direction. Next, under the state in which the individual ones of the particles of the magnetic powder have been arrayed in the one direction, the magnetic coating film is dried and cured. In this way, the magnetic layer is formed.

The process of arraying the individual ones of the particles of the magnetic powder in the one direction (arraying axes of easy magnetization in the one direction) by applying the magnetic field is generally called an orientation process. Hitherto, a longitudinal orientation process of orienting the particles of the magnetic powder in a longitudinal direction in an in-plane direction of the magnetic coating film has been adopted. Meanwhile, in recent years, in order to satisfy requests for recording data items at high density, magnetic recording media of a vertical orientation type have been spotlighted. In the magnetic recording media of this vertical orientation type, a vertical orientation process of orienting the particles of the magnetic powder in a vertical direction that is vertical to the magnetic coating film is executed.

As magnets to be used in the longitudinal orientation process, generally, electromagnets have been used. Meanwhile, as magnets to be used in the vertical orientation process, generally, permanent magnets are used in many case (refer, for example, to Patent Literature 1 and Patent Literature 2 below).

The permanent magnets of each of the orientation devices disclosed in Patent Literatures 1 and 2 are provided in a plurality of pairs such that opposite poles face each other across a transport path. Then, at a time when a support on which the magnetic coating film has been formed is transported through the transport path, the magnetic coating film is subjected to the vertical orientation by the permanent magnets.

CITATION LIST

Patent Literature

Patent Literature 1: Japanese Patent Application Laid-open No. 2011-138565

Patent Literature 2: Japanese Patent Application Laid-open No. 2011-138566

DISCLOSURE OF INVENTION

Technical Problem

In order that the particles of the magnetic powder in the magnetic coating film are sufficiently vertically oriented, strength of the magnetic field in the transport path needs to be increased. However, the technologies disclosed in Patent Literatures 1 and 2 have problems such as difficulties in increasing this strength of the magnetic field.

In view of the circumstances as described above, the present technology has been made to achieve an object to provide technologies such as an orientation device capable of increasing strength of a magnetic field in a transport path.

Solution to Problem

An orientation device according to the present technology includes a transport path, a permanent magnet portion, and a yoke portion.

The transport path allows a base on which a magnetic coating film containing magnetic powder has been formed to pass through the transport path along a transport direction.

The permanent magnet portion includes
  a plurality of first permanent magnets, and
  a plurality of second permanent magnets that is opposed
    to the plurality of first permanent magnets across the
    transport path in a vertical direction that is vertical to
    the transport direction in a manner that opposite poles
    face each other, the permanent magnet portion vertically orienting particles of the magnetic powder by
    applying a magnetic field to the magnetic coating film
    on the base that passes through the transport path.

The yoke portion
  is made of a soft magnetic material, and
  connects
    to poles on a side opposite to the transport path side of
      the plurality of first permanent magnets, and
    to poles on a side opposite to the transport path side of
      the plurality of second permanent magnets.

In the orientation device,
  a vertical component of the magnetic field in the transport path may be 1.0 time or more as large as a coercive force of the magnetic coating film.

In the orientation device,
  the yoke portion may include
  a first yoke portion that supports the plurality of first permanent magnets from the side opposite to the transport path side of the plurality of first permanent magnets,
  a second yoke portion that supports the plurality of second permanent magnets from the side opposite to the transport path side of the plurality of second permanent magnets, and
  third yoke portions that couple the first yoke portion and the second yoke portion to each other.

In the orientation device,
  a relationship Bmag×Wm<Byoke×2T may be satisfied, where
  T is a smallest thickness of
    a thickness in the vertical direction of the first yoke portion,
    a thickness in the vertical direction of the second yoke portion, and a thickness in a width direction of each of the third yoke portions, the width direction being a direction orthogonal to the transport direction and the vertical direction, Bmag is a remanent magnetic-flux density of the plurality of first permanent magnets and the plurality of second permanent magnets, Wm is a width of each of the plurality of first permanent magnets and the plurality of second permanent magnets, and Byoke is a saturation magnetic-flux density of the yoke portion.

The orientation device may further include a drying portion that dries the magnetic-layer coating film under a state in which the particles of the magnetic powder in the magnetic-layer coating film have been vertically oriented by the magnetic field applied from the permanent magnet portion.

In the orientation device, the drying portion may include a plurality of blowing ports that allows airflow for drying the magnetic coating film to be blown into the transport path.

In the orientation device, the orientation device may include, in the transport path, a first area in which the plurality of blowing ports is not provided in the transport direction, and a second area in which the plurality of blowing ports is provided in the transport direction.

In the orientation device, the first area may be a part area on an upstream side in the transport direction, and the second area may be a part area on a downstream side out of the part area on the upstream side.

In the orientation device, the plurality of first permanent magnets may include ones of the plurality of first permanent magnets, the ones of the plurality of first permanent magnets being located in the second area, the plurality of second permanent magnets may include ones of the plurality of second permanent magnets, the ones of the plurality of second permanent magnets being located in the second area, both the ones of the plurality of first permanent magnets and the ones of the plurality of second permanent magnets may each be arranged at a predetermined gap in the transport direction, and the plurality of blowing ports may be provided at positions corresponding to the gap.

In the orientation device, the drying portion may further include a plurality of suction ports for allowing the airflow in the transport path to be sucked and discharged to an outside of the transport path.

In the orientation device, the plurality of blowing ports may be provided to allow the airflow to be blown in the vertical direction, and the plurality of suction ports may be provided to allow the airflow to be sucked in a width direction orthogonal to the transport direction and the vertical direction.

In the orientation device, each of the plurality of suction ports may be provided at an intermediate position in the transport direction between corresponding two of the plurality of blowing ports.

In the orientation device, the orientation device may include a plurality of units that is thin in the transport direction and arrayed in the transport direction, and each of the plurality of units may include corresponding one of the plurality of first permanent magnets, corresponding one of the plurality of second permanent magnets, and a yoke unit portion that constitutes a part of the yoke portion.

The orientation device may further include a magnet fixing plate for fixing the corresponding one of the plurality of first permanent magnet and the corresponding one of the plurality of second permanent magnets to the yoke unit portion, the magnet fixing plate being interposed between ones of the plurality of units, the ones of the plurality of units being adjacent to each other in the transport direction.

In the orientation device, a thickness of the magnet fixing plate may be 2 mm or more and 5 mm or less.

In the orientation device, the magnet fixing plate may include a magnetic portion, and a non-magnetic portion.

In the orientation device, parts of the magnet fixing plate, the parts corresponding to surfaces vertical to the transport direction of the corresponding one of the plurality of first permanent magnets and of the corresponding one of the plurality of second permanent magnets, may each be the non-magnetic portion.

In the orientation device, the yoke unit may include a first yoke-unit portion that supports the corresponding one of the plurality of first permanent magnets from the side opposite to the transport path side of the plurality of first permanent magnets, a second yoke-unit portion that supports the corresponding one of the plurality of second permanent magnets from the side opposite to the transport path side of the plurality of second permanent magnets, and third yoke-unit portions that couple the first yoke-unit portion and the second yoke-unit portion to each other, and parts of the magnet fixing plate, the parts corresponding to the third yoke-unit portions, may each be the magnetic portion.

A production method for a magnetic recording medium according to the present technology includes, in a transport path in an orientation device:

allowing a base on which a magnetic coating film containing magnetic powder has been formed to pass through the transport path along a transport direction; and causing a permanent magnet portion to apply a magnetic field to the magnetic coating film on the base that passes through the transport path, thereby vertically orienting particles of the magnetic powder, the orientation device including:

the transport path that is formed along the transport direction, the permanent magnet portion that includes a plurality of first permanent magnets, and a plurality of second permanent magnets that is opposed to the plurality of first permanent magnets across the transport path in a vertical direction that is vertical to the transport direction in a manner that opposite poles face each other, and a yoke portion
that is made of a soft magnetic material, and
that connects
to poles on a side opposite to the transport path side of the plurality of first permanent magnets, and
to poles on a side opposite to the transport path side of the plurality of second permanent magnets.

A magnetic recording medium according to the present technology is produced, in a transport path in an orientation device, by:

allowing a base on which a magnetic coating film containing magnetic powder has been formed to pass through the transport path along a transport direction; and causing a permanent magnet portion to apply a magnetic field to the magnetic coating film on the base that passes through the transport path, thereby vertically orienting particles of the magnetic powder, the orientation device including:

the transport path that is formed along the transport direction, the permanent magnet portion that includes
a plurality of first permanent magnets, and
a plurality of second permanent magnets that is opposed to the plurality of first permanent magnets across the transport path in a vertical direction that is vertical to the transport direction in a manner that opposite poles face each other, and a yoke portion
that is made of a soft magnetic material, and
that connects
to poles on a side opposite to the transport path side of the plurality of first permanent magnets, and
to poles on a side opposite to the transport path side of the plurality of second permanent magnets.

Advantageous Effects of Invention

As described above, according to the present technology, the technologies such as the orientation device capable of increasing the strength of the magnetic field in the transport path can be provided.

BRIEF DESCRIPTION OF DRAWINGS

FIG. 9 An image depicting a state before particles of magnetic powder are vertically oriented, and a state after the particles of the magnetic powder have been vertically oriented.

FIG. 15 A table showing Examples and Comparative Examples in which the thickness of the yoke portion is varied.

FIG. 17 A table showing Examples and Comparative Examples in each of which the height Hw of the transport path is 24 mm.

FIG. 18 A table showing Examples and Comparative Examples in which a distance X is varied.

FIG. 25 A view illustrating a state in which a fitting portion is provided to an L-shaped second fixing member.

MODE(S) FOR CARRYING OUT THE INVENTION

Now, an embodiment of the present technology is described with reference to the drawings.

<Configuration of Magnetic Recording Medium 1>

Figure 1:
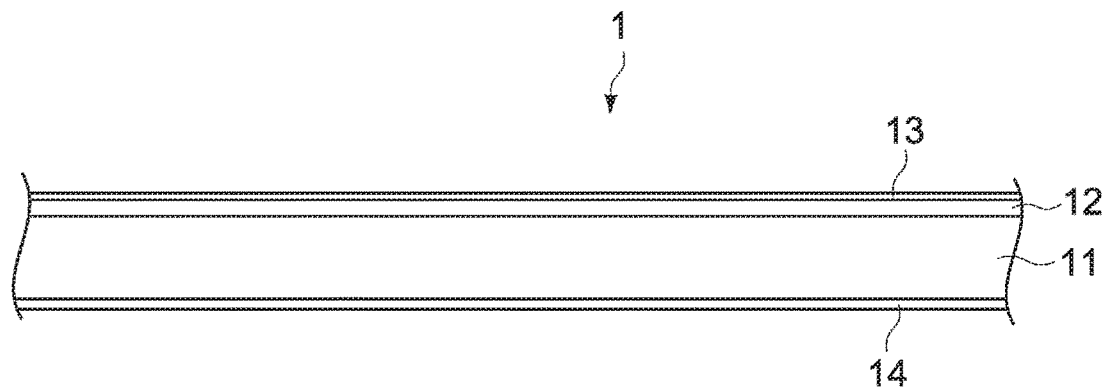
FIG. 1 A side view of a magnetic recording medium.

First, a configuration of a magnetic recording medium 1 is described. FIG. 1 is a side view of the magnetic recording medium 1.

As illustrated in FIG. 1, the magnetic recording medium 1 is formed into a tape shape that is long in its longitudinal direction.

The magnetic recording medium 1 is configured to be capable of recording signals at a shortest recording wavelength of, for example, 96 nm or less. This shortest recording wavelength may be set to 75 nm or less, or to 60 nm or less. Alternatively, the shortest recording wavelength may be set to 50 nm or less. This magnetic recording medium 1 is advantageously used in a recording apparatus (not shown) including a ring-type head as a magnetic head that records the signals.

As illustrated in FIG. 1, the magnetic recording medium 1 includes a base 11, a non-magnetic layer 12 provided on one main surface of the base 11, a magnetic layer 13 provided on the non-magnetic layer 12, and a backing layer 14 provided on another main surface of the base 11. Note that, the backing layer 14 need not necessarily be provided, that is, this backing layer 14 may be omitted.

[Base 11]

The base 11 is a non-magnetic support that supports the non-magnetic layer 12 and the magnetic layer 13. The base 11 has a long film shape. An upper limit value of an average thickness of the base 11 is set, for example, to 4.2 µm or less. Note that, the upper limit value of the average thickness of the base 11 may be set to 3.8 µm or less, or to 3.4 µm or less.

When the upper limit value of the average thickness of the base 11 is 4.2 µm or less, a recording capacity of a single cartridge can be increased higher than that of a general magnetic-recording medium 1. Note that, the cartridge is a case capable of housing therein the rolled magnetic-recording medium 1 in a rotatable manner. This cartridge conforms, for example, to the LTO (Linear Tape Open) standard.

The average thickness of the base 11 is calculated as follows. First, the magnetic recording medium 1 with a width of ½ inches is prepared, and this magnetic recording medium 1 is cut out into a length of 250 mm. In this way, a sample is prepared. Then, layers other than the base 11 of the sample (that is, the non-magnetic layer 12, the magnetic layer 13, and the backing layer 14) are removed by a solvent such as MEK (methyl ethyl ketone) or a dilute hydrochloric acid.

Next, a laser holographic gauge produced by Mitsutoyo Corporation is used as a measurement apparatus to measure a thickness of the sample (base 11) at five or more positions. Values measured thereat are simply averaged (arithmetically averaged). In this way, the average thickness of the base 11 is calculated. Note that, the positions of the measurement are selected at random in the sample.

The base 11 contains, for example, at least one of polyesters, polyolefins, cellulose derivatives, vinyl-based resins, or other polymeric resins. When the base 11 contains two or more of these materials, these two or more of the materials may be mixed with each other, copolymerized with each other, or laminated on each other.

Examples of the polyesters include at least one of PET (polyethylene terephthalate), PEN (polyethylene naphthalate), PBT (polybutylene terephthalate), PBN (polybutylene naphthalate), PCT (polycyclohexylenedimethylene terephthalate), PEB (polyethylene-p-oxybenzoate), or polyethylene bisphenoxycarboxylate.

Examples of the polyolefins include at least one of PE (polyethylene) or PP (polypropylene). Examples of the cellulose derivatives include at least one of cellulose diacetate, cellulose triacetate, CAB (cellulose acetate butyrate), or CAP (cellulose acetate propionate). Examples of the vinyl-based resins include at least one of PVC (polyvinyl chloride) or PVDC (polyvinylidene chloride).

Examples of the other polymeric resins include at least one of PA (polyamide or nylon), aromatic PA (aromatic polyamide or aramid), PI (polyimide), aromatic PI (aromatic polyimide), PAI (polyamideimide), aromatic PAI (aromatic polyamideimide), PBO (polybenzoxazole such as ZYLON (trademark)), polyether, PEK (polyether ketone), polyether ester, PES (polyether sulfone), PEI (polyetherimide), PSF (polysulfone), PPS (polyphenylene sulfide), PC (polycarbonate), PAR (polyarylate), or PU (polyurethane).

[Magnetic Layer 13]

The magnetic layer 13 is a recording layer for recording servo signals and data signals. The magnetic layer 13 contains magnetic powder, a binder, conductive particles, and the like. When necessary, the magnetic layer 13 may further contain additives such as a lubricant, a polishing agent, and an anticorrosive. The magnetic layer 13 has a surface with a large number of pore portions. These large number of pore portions retain the lubricant. The large number of pore portions are provided, for example, in a direction vertical to the surface of the magnetic layer 13.

A thickness of the magnetic layer 13 is set, for example, to 35 nm or more and 90 nm or less. By setting the thickness of the magnetic layer 13 to 35 nm or more and 90 nm or less in such a way, electromagnetic conversion characteristics can be increased.

The thickness of the magnetic layer 13 can be calculated, for example, as follows. First, a test sample is prepared by thinly and vertically machining the magnetic recording medium 1 with respect to its main surfaces. Then, a cross-section of this test sample is observed under the following conditions under a transmission electron microscope (TEM).

Apparatus: TEM (H-9000NAR produced by Hitachi, Ltd.)

Acceleration voltage: 300 kV

Magnification: 100,000 times

Next, with use of an obtained TEM image, the thickness of the magnetic layer 13 is measured at least at ten or more positions in the longitudinal direction of the magnetic recording medium 1. After that, values measured thereat are simply averaged (arithmetically averaged). In this way, the thickness of the magnetic layer 13 is calculated. Note that, the positions of the measurement are selected at random in the test sample.

(Magnetic Powder)

The magnetic powder contains powder of nanoparticles containing ε-iron oxide (hereinafter, abbreviated as "ε-iron oxide particles"). The ε-iron oxide particles are capable of generating a high coercive force even in the form of fine particles. The ε-iron oxide contained in the ε-iron oxide particles is oriented in a thickness direction of the magnetic recording medium 1 (vertical direction).

The ε-iron oxide particles each have a spherical shape, a substantially spherical shape, a cubic shape, or a substantially cubic shape. Since the ε-iron oxide particles each have such shapes, when the ε-iron oxide particles are used as the magnetic powder, a contact area of each of the particles in the thickness direction of the magnetic recording medium 1 can be reduced smaller than that at a time when hexagonal-plate-like barium-ferrite particles are used as the magnetic powder. With this, aggregation of the particles can be suppressed. Thus, dispersibility of the particles of the magnetic powder can be increased, and a more satisfactory SNR (Signal-to-Noise Ratio) can be achieved.

The ε-iron oxide particles each have a core-shell type structure. Specifically, the ε-iron oxide particles each have a core portion and a double-layer-structure shell portion provided around this core portion. The double-layer-structure shell portion includes a first shell portion provided around the core portion, and a second shell portion provided around the first shell portion.

The core portion contains the ε-iron oxide. The ε-iron oxide contained in the core portion is, for example, made of an ε-$Fe_2O_3$ crystal as a main phase, or a single-phase ε-$Fe_2O_3$.

The first shell portion covers at least a part of a periphery of the core portion. The first shell portion may partially cover the periphery of the core portion, or may cover an entirety of the periphery of the core portion. When an entirety of a surface of the core portion is covered with the first shell portion, exchange coupling between the core portion and the first shell portion can be sufficiently performed. With this, magnetic characteristics can be increased.

The first shell portion, which is what is called a soft magnetic layer, contains, for example, a soft magnetic body such as an α-Fe, Ni—Fe alloy, or an Fe—Si—Al alloy. The α-Fe may be obtained by reducing the ε-iron oxide contained in the core portion 21.

The second shell portion is an oxide film as an anti-oxidizing layer. The second shell portion contains α-iron oxide, aluminum oxide, or silicon oxide. The α-iron oxide contains, for example, at least one iron oxide of $Fe_3O_4$, $Fe_2O_3$, or FeO. When the first shell portion contains the α-Fe (soft magnetic body), the α-iron oxide may be obtained by oxidizing the α-Fe contained in the first shell portion 22a. When the ε-iron oxide particles each have the first shell portion as described above, a value of a coercive force Hc of the core portion of its own can be maintained to be high for securing thermal stability, and at the same time, a coercive force Hc of an entirety of each of the ε-iron oxide particles (core-shell particles) can be adjusted to a coercive force Hc suited to recording.

In addition, when the ε-iron oxide particles each have the second shell portion as described above, in a step of producing the magnetic recording medium 1 and before this step, the ε-iron oxide particles can be suppressed from being exposed to the atmosphere. With this, degradation in characteristics of the ε-iron oxide particles due to rusting or the like of surfaces of the particles can be suppressed. Therefore, degradation in characteristics of the magnetic recording medium 1 can be suppressed.

An average particle diameter (average maximum-particle diameter) of the particles of the magnetic powder is set, for example, to 22 nm or less. Alternatively, the average particle diameter is set, for example, to 8 nm or more, or to 12 nm or more.

An average aspect ratio of the particles of the magnetic powder is set, for example, to 1 or more and 2.5 or less. This average aspect ratio may be set to 1 or more and 2.1 or less, or to 1 or more and 1.8 or less. When the average aspect ratio of the particles of the magnetic powder falls within the range of 1 or more and 2.5 or less, the aggregation of the particles of the magnetic powder can be suppressed. In addition, in a step of forming the magnetic layer 13, resistance to be applied to the particles of the magnetic powder at a time of vertically orienting the particles of the magnetic powder can be suppressed. Thus, vertical orientation properties of the particles of the magnetic powder can be increased.

The average particle diameter and the average aspect ratio of the particles of the magnetic powder are calculated as follows. First, a flake is prepared by processing the magnetic recording medium 1 to be a measurement target by, for example, an FIB (Focused Ion Beam) technique, and then a cross-section of the flake is observed under the TEM. Then, fifty ε-iron oxide particles in the taken TEM image are selected at random, and a major axis length DL and a minor axis length DS of each of the ε-iron oxide particles are measured.

Note that, the major axis length DL refers to a maximum one of distances between pairs of parallel lines drawn at every angle to be externally tangential to a contour of each of the ε-iron oxide particles (what is called maximum Feret's diameter). Meanwhile, the minor axis length DS refers to a maximum one of lengths of corresponding one of the ε-iron oxide particles, which are in a direction orthogonal to the major axis of the corresponding one of the ε-iron oxide particles.

In the case described herein, the ε-iron oxide particles each have the double-layer-structure shell portion. However, the ε-iron oxide particles may each have a single-layer-structure shell portion. In this case, the shell portion has a configuration similar to that of the first shell portion. Note that, from a viewpoint of suppressing the degradation in characteristics of the ε-iron oxide particles, as described above, it is further advantageous that the ε-iron oxide particles each have the double-layer-structure shell portion.

In the case described hereinabove, the ε-iron oxide particles each have the core-shell structure. Meanwhile, the ε-iron oxide particles may each contain an additive instead of the core-shell structure, or may each have both the core-shell structure and the additive.

In this case, a part of Fe in each of the ε-iron oxide particles is replaced by the additive. Also when the ε-iron oxide particles each contain the additive, the coercive force Hc of the entirety of each of the ε-iron oxide particles can be adjusted to the coercive force Hc suited to recording. Thus, ease of recording can be increased. Typically, metal elements other than iron are used as the additive. The additive may be a trivalent metal element, or may be at least one of Al, Ga, or In.

Specifically, the ε-iron oxide containing the additive is an ε-$Fe_{2-x}M_xO_3$ crystal (note that, "M" is the metal element other than iron: such as at least one of Al, Ga, or In, and "x" is, for example, 0<x<1).

The magnetic powder may contain powder of nanoparticles containing hexagonal ferrite (hereinafter, abbreviated as "hexagonal ferrite particles"). The hexagonal ferrite particles each have, for example, a hexagonal plate shape or a substantially-hexagonal plate shape.

The hexagonal ferrite contains, for example, at least one of Ba, Sr, Pb, or Ca. Specifically, the hexagonal ferrite may, for example, be barium ferrite or strontium ferrite. The barium ferrite may further contain, in addition to Ba, at least one of Sr, Pb, or Ca. The strontium ferrite may further contain Ba, Pb, or Ca, in addition to Sr.

More specifically, the hexagonal ferrite has an average composition represented by a general formula of $MFe_{12}O_{19}$, where "M" is a metal of at least one of, for example, Ba, Sr, Pb, or Ca. "M" may be a combination of Ba and one or more metals selected from a group consisting of Sr, Pb, and Ca. Alternatively, "M" may be a combination of Sr and one or more metals selected from a group consisting of Ba, Pb, and Ca. In the general formula, a part of Fe may be replaced by the other metal elements.

When the magnetic powder contains the powder of the nanoparticles of the hexagonal ferrite, the average particle diameter of the particles of the magnetic powder is set, for example, to 50 nm or less. The average particle diameter of the particles of the magnetic powder may be 10 nm or more and 40 nm or less, or may be 15 nm or more and 30 nm or less. An average aspect ratio of the particles of the magnetic powder at the time when the magnetic powder contains the powder of the hexagonal ferrite particles falls within the same ranges as those mentioned above.

Note that, the average aspect ratio of the particles of the magnetic powder is calculated as follows. First, a flake is prepared by processing the magnetic recording medium 1 to be the measurement target by, for example, the FIB technique, and then a cross-section of the flake is observed under the TEM. Then, fifty particles of the magnetic powder, which are oriented at an angle of 75 degrees or more with respect to a horizontal direction in the taken TEM image, are selected at random, and a maximum plate thickness DA of each of the particles of the magnetic powder is measured. Next, the measured maximum-plate thicknesses DA of the fifty particles of the magnetic powder are simply averaged (arithmetically averaged). In this way, an average maximum-plate thickness DAave is calculated.

After that, the surface of the magnetic layer 13 of the magnetic recording medium 1 is observed under the TEM. Then, fifty particles of the magnetic powder in the taken TEM image are selected at random, and a maximum plate diameter DB of each of the particles of the magnetic powder is measured. Note that, the maximum plate diameter DB refers to a maximum one of distances between pairs of parallel lines drawn at every angle to be externally tangential to a contour of each of the particles of the magnetic powder (what is called maximum Feret's diameter).

Next, the measured maximum-plate diameters DB of the fifty particles of the magnetic powder are simply averaged (arithmetically averaged). In this way, an average maximum-plate thickness DBave is calculated. After that, an average aspect ratio (DBave/DAave) of the particles of the magnetic powder is calculated from the average maximum-plate thickness DAave and the average maximum-plate thickness DBave.

The magnetic powder may contain powder of nanoparticles containing Co-containing spinel ferrite (hereinafter, abbreviated as "cobalt ferrite particles"). The cobalt ferrite particles each typically have a uniaxial anisotropy. The cobalt ferrite particles each have, for example, a cubic shape or a substantially cubic shape. The Co-containing spinel ferrite may further contain, in addition to Co, at least one of Ni, Mn, Al, Cu, or Zn.

The Co-containing spinel ferrite has, for example, an average composition represented by the following formula (1).

$$Co_xM_yFe_2O_z \tag{1}$$

(Note that, in the formula (1), "M" is a metal of, for example, at least one of Ni, Mn, Al, Cu, or Zn. "x" is a value within a range of $0.4 \leq x \leq 1.0$. "y" is a value within a range of $0 \leq y \leq 0.3$. Note that, "x" and "y" satisfy a relationship $(x+y) \leq 1.0$. "z" is a value within a range of $3 \leq z \leq 4$. A part of Fe may be replaced by the other metal elements.)

When the magnetic powder contains the powder of the cobalt ferrite particles, the average particle diameter of the particles of the magnetic powder is, for example, 25 nm or less, or 23 nm or less. An average aspect ratio of the particles of the magnetic powder at the time when the magnetic powder contains the powder of the cobalt ferrite particles falls within the same ranges as those mentioned above. Further, the average aspect ratio of the particles of the magnetic powder is calculated in the same way as described above.

(Binder)

As the binder, for example, a resin having a structure obtained by a crosslinking reaction of a polyurethane-based resin, a vinyl-chloride-based resin, or the like is used. Other resins may be blended with the binder as appropriate in accordance, for example, with physical properties required of the magnetic recording medium 1. Generally, the resin to be blended may be of any type as long as it is a resin that is generally used in the magnetic recording medium 1 of an application type.

As examples of the binder, there may be mentioned polyvinyl chloride, polyvinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, vinyl chloride-acrylonitrile copolymers, acrylic acid ester-acrylonitrile copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resins, polyvinyl butyrals, cellulose derivatives (cellulose acetate butyrate, cellulose diacetate, cellulose triacetate, cellulose propionate, and nitrocellulose), styrene butadiene copolymers, polyester resins, amino resins, synthetic rubbers, and the like.

Further, as examples of a thermosetting resin or a reactive resin, there may be mentioned, phenolic resins, epoxy resins, urea resins, melamine resins, alkyd resins, silicone resins, polyamine resins, urea-formaldehyde resins, and the like.

Still further, for the purpose of increasing the dispersibility of the particles of the magnetic powder, polar functional groups such as —$SO_3M$, —$OSO_3M$, —COOM, and P=O $(OM)_2$ may be introduced into each of the above-mentioned binders. Note that, "M" in the formulae is a hydrogen atom, or an alkali metal such as lithium, potassium, or sodium.

Yet further, as the polar functional groups, there may be mentioned side-chain-type polar functional groups having a terminal group of —$NR1R2$ or —$NR1R2R3^+X^-$, and main-chain-type polar functional groups having >$NR1R2^+X^-$. Note that, in the formulae, R1, R2, and R3 are a hydrogen atom or a hydrocarbon group, and $X^-$ is a halogen element ion of fluorine, chlorine, bromine, iodine, or the like, or an inorganic or an organic ion. In addition, as other examples of the polar functional groups, there may be mentioned —OH, —SH, —CN, and an epoxy group.

(Lubricant)

The lubricant contains, for example, a compound represented by the following general formula (1), and a compound represented by the following general formula (2). When the lubricant contains these compounds, a dynamic friction coefficient of the surface of the magnetic layer 13 can be especially reduced. With this, travelling performance of the magnetic recording medium 1 can be further increased.

$$CH_3(CH_2)_nCOOH \tag{1}$$

(Note that, in the general formula (1), "n" is an integer number selected from the range of 14 or more and 22 or less.)

$$CH_3(CH_2)_pCOO(CH_2)_qCH_3 \tag{2}$$

(Note that, in the general formula (2), "p" is an integer number selected from the range of 14 or more and 22 or less, and "q" is an integer number selected from a range of 2 or more and 5 or less.)

(Additive)

The magnetic layer 13 may further contain, as non-magnetic reinforcing particles, aluminum oxide (α-, β-, or γ-alumina), chromium oxide, silicon oxide, diamond, garnet, emery, boron nitride, titanium carbide, silicon carbide, titanium carbide, titanium oxide (rutile-type or anatase-type titanium oxide), and the like.

[Non-Magnetic Layer 12]

The non-magnetic layer 12 contains non-magnetic powder and the binder. The non-magnetic layer 12 may contain, when necessary, the additives such as electric particles, the lubricant, a curing agent, and the anticorrosive.

A thickness of the non-magnetic layer 12 is set, for example, to 0.6 μm or more and 2.0 μm or less, or to 0.8 μm or more and 1.4 μm or less. The thickness of the non-magnetic layer 12 can be calculated by a method similar to the method of calculating the thickness of the magnetic layer 13 (such as TEM). Note that, a magnification of the TEM image is adjusted as appropriate in accordance with the thickness of the non-magnetic layer 12.

(Non-Magnetic Powder)

The non-magnetic powder contains at least one of, for example, particles of inorganic powder or particles of organic powder. In addition, the non-magnetic powder may contain carbon materials such as carbon black. Note that, as the non-magnetic powder, a material of one kind may be used alone, or materials of two or more kinds may be used in combination. Examples of the particles of the inorganic powder include those of metals, metal oxides, metal carbonates, metal sulfates, metal nitrides, metal carbides, metal sulfides, and the like. As examples of a shape of each particle of the non-magnetic powder, there may be mentioned various shapes such as a needle shape, a spherical shape, a cubic shape, and a plate shape.

(Binder)

The binders are the same as the above-mentioned ones for the magnetic layer 13.

[Backing Layer 14]

The backing layer 14 contains the non-magnetic powder and the binder. The backing layer 14 may contain, when necessary, the additives such as the lubricant, the curing agent, and an antistatic agent. As the non-magnetic powder and the binder, the same materials as the above-mentioned ones for the non-magnetic layer 12 are used.

(Non-Magnetic Powder)

An average particle diameter of the particles of the non-magnetic powder is set, for example, to 10 nm or more and 150 nm or less, or to 15 nm or more and 110 nm or less. The average particle diameter of the particles of the non-magnetic powder is calculated in the same way as that for the above-described average particle diameter D of the particles of the magnetic powder. The non-magnetic powder may contain particles of the non-magnetic powder having a particle diameter distribution of two or more.

An upper limit value of an average thickness of the backing layer 14 is set, for example, to 0.6 μm or less. By setting the upper limit value of the average thickness of the backing layer 14 to 0.6 μm or less, even when the magnetic recording medium 1 has an average thickness of 5.6 μm, the thicknesses of the non-magnetic layer 12 and the base 11 can be maintained to be large. Thus, travelling stability of the magnetic recording medium 1 in the recording apparatus can be maintained. A lower limit value of the average thickness of the backing layer 14 is set, for example, to 0.2 μm or more.

The average thickness of the backing layer 14 is calculated as follows. First, the magnetic recording medium 1 with the width of ½ inches is prepared, and this magnetic recording medium 1 is cut out into the length of 250 mm. In this way, a sample is prepared. Next, the laser holographic gauge produced by Mitsutoyo Corporation is used as the measurement apparatus to measure the thickness of the sample at five or more positions. Values measured thereat are simply averaged (arithmetically averaged). In this way, an average thickness $t_T$ [μm] of the magnetic recording medium 1 is calculated. Note that, the positions of the measurement are selected at random in the sample.

After that, the backing layer 14 of the sample is removed by the solvent such as the MEK (methyl ethyl ketone) or the dilute hydrochloric acid. Then, the above-mentioned laser holographic gauge is used again to measure the thickness of the sample at five or more positions, and values measured thereat are simply averaged (arithmetically averaged). In this way, an average thickness $t_B$ [μm] of the magnetic recording medium 1 from which the backing layer 14 has been removed is calculated. Note that, the positions of the measurement are selected at random in the sample. Next, an average thickness $t_b$ [μm] of the backing layer 14 is calculated by the following equation.

$$t_b [\mu m] = t_T [\mu m] - t_B [\mu m]$$

The backing layer 14 has a surface provided with a large number of protruding portions. The large number of protruding portions are provided to form the large number of pore portions in the surface of the magnetic layer 13 under a state in which the magnetic recording medium 1 has been rolled up. The large number of pore portions are formed, for example, of the large number of non-magnetic particles protruded from the surface of the backing layer 14.

In the case described herein, the large number of pore portions are formed in the surface of the magnetic layer 13 by transferring the large number of protruding portions provided on the surface of the backing layer 14 into the surface of the magnetic layer 13. However, a method of forming the large number of pore portions is not limited thereto. For example, the large number of pore portions in the surface of the magnetic layer 13 may be formed by altering, for example, a type of a solvent contained in a magnetic-layer coating material and a drying condition of the magnetic-layer coating material.

[Average Thickness of Magnetic Recording Medium 1]

An upper limit value of the average thickness (average overall thickness) of the magnetic recording medium 1 is set, for example, to 5.6 μm or less. This average thickness may be set to 5.0 μm or less, or to 4.4 μm or less. When the average thickness $t_T$ of the magnetic recording medium 1 is 5.6 μm or less, a recording capacity of a cartridge 21 can be increased higher than that of the general magnetic-recording medium 1. A lower limit value of the average thickness of the magnetic recording medium 1, which is not particularly limited, is, for example, 3.5 μm or more.

The average thickness of the magnetic recording medium 1 is calculated by the above-described procedure of the calculation of the average thickness of the backing layer 14.

[Coercive Force Hc]

An upper limit value of the coercive force Hc in the longitudinal direction of the magnetic recording medium 1 is set, for example, to 2,000 Oe or less. The upper limit value of the coercive force Hc may be set to 1,900 Oe or less, or to 1,800 Oe or less.

A lower limit value of the coercive force Hc measured in the longitudinal direction of the magnetic recording medium 1 is set, for example, to 1,000 Oe or more. In this case, demagnetization due to flux leakage from the recording head can be pressed.

The coercive force Hc is calculated, for example, as follows. First, a measurement sample is cut out of the long magnetic-recording medium 1, and, with use of a vibrating sample magnetometer (VSM), an M-H loop of an entirety of the measurement sample is measured in a longitudinal direction of the measurement sample (travelling direction of the magnetic recording medium 1). Then, coatings (such as the non-magnetic layer 12, the magnetic layer 13, and the backing layer 14) are removed with use of acetone, ethanol, or the like to leave only the base 11 as a sample for background correction.

Next, with use of the VSM, an M-H loop of the base 11 is measured in the longitudinal direction of the base 11 (travelling direction of the magnetic recording medium 1). After that, the M-H loop of the base 11 is subtracted from the M-H loop of the entirety of the measurement sample. With this, an M-H loop after the background correction is obtained. Then, the coercive force Hc is calculated from the obtained M-H loop. Note that, all of these M-H loops are measured at 25° C. Further, "demagnetizing field correction" at the times of measuring the M-H loops in the longitudinal direction of the magnetic recording medium 1 is not performed.

[Squareness Ratio]

A squareness ratio S1 in the vertical direction (thickness direction) of the magnetic recording medium 1 is set, for example, to 65% or more. This squareness ratio S1 may be set to 70% or more, or to 75% or more. When the squareness ratio S1 is 65% or more, the vertical orientation properties of the particles of the magnetic powder is sufficiently high. With this, the SNR can be further increased.

The squareness ratio S1 is calculated, for example, as follows. First, a measurement sample is cut out of the long magnetic-recording medium 1, and, with use of the VSM, an M-H loop of the entirety of the measurement sample, which corresponds to the thickness direction of the magnetic recording medium 1, is measured. Then, the coatings (such as non-magnetic layer 12, magnetic layer 13, and backing layer 14) are swept away with use of acetone, ethanol, or the like to leave only the base 11 as the sample for the background correction.

Next, with use of the VSM, an M-H loop of the base 11, which corresponds to the thickness direction of the base 11, is measured. After that, the M-H loop of the base 11 is subtracted from the M-H loop of the entirety of the measurement sample. With this, an M-H loop after the background correction is obtained. The squareness ratio S1(%) is calculated by substituting a saturation magnetization Ms (emu) and a remanent magnetization Mr (emu) of each of the obtained M-H loops into the following equation. Note that, all of these M-H loops are measured at 25° C. Further, "demagnetizing field correction" at the times of measuring the M-H loops in the vertical direction of the magnetic recording medium 1 is not performed.

Squareness Ratio $S1(\%)=(Mr/Ms)\times 100$

A squareness ratio S2 in the longitudinal direction (travelling direction) of the magnetic recording medium 1 is set, for example, to 35% or less. This squareness ratio S2 may be set to 30% or less, or to 25% or less. When the squareness ratio S2 is 35% or less, the vertical orientation properties of the particles of the magnetic powder is sufficiently high. With this, the SNR can be further increased.

The squareness ratio S2 is calculated in the same way as that for the squareness ratio S1 except that the M-H loops are measured in the longitudinal direction of the magnetic recording medium 1 and the base 11.

[Dynamic Friction Coefficient]

Herein, in the data recording apparatus (not shown), a dynamic friction coefficient of the surface of the magnetic layer 13 and the magnetic head under a state in which tension of 1.2 N has been applied to the magnetic recording medium 1 is denoted by $\mu_A$. In addition, a dynamic friction coefficient of the surface of the magnetic layer 13 and the magnetic head under a state in which tension of 0.4 N has been applied to the magnetic recording medium 1 is denoted by $\mu_B$. In this case, a ratio of these dynamic friction coefficients $\mu_A$ and $\mu_B$ ($\mu_B/\mu_A$) is set, for example, to 1.0 or more and 2.0 or less. In this case, variation in friction coefficient due to tension fluctuation during travel of the magnetic recording medium 1 can be reduced. Thus, the travel of the magnetic recording medium 1 can be stabilized.

Further, in the data recording apparatus, a value of fifth travel of a dynamic friction coefficient of the surface of the magnetic layer 13 and the magnetic head under a state in which tension of 0.6 N has been applied to the magnetic recording medium 1 is denoted by $\mu_5$. Still further, a value of thousandth travel of the dynamic friction coefficient is denoted by $\mu_{10000}$. In this case, a ratio of these values $\mu_5$ and $\mu_{1000}$ ($\mu_{1000}/\mu_5$) is set, for example, to 1.0 or more and 2.0 or less. Alternatively, this ratio ($\mu_{1000}/\mu_5$) is set to 1.0 or more and 1.5 or less. When the ratio ($\mu_{1000}/\mu_5$) is 1.0 or more and 2.0 or less, variation in friction coefficient due to numerous travel can be reduced. Thus, the travel of the magnetic recording medium 1 can be stabilized.

<Production Apparatus 100>

[Overall Configuration of Production Apparatus 100 and Configuration of Each Section]

Figure 2:
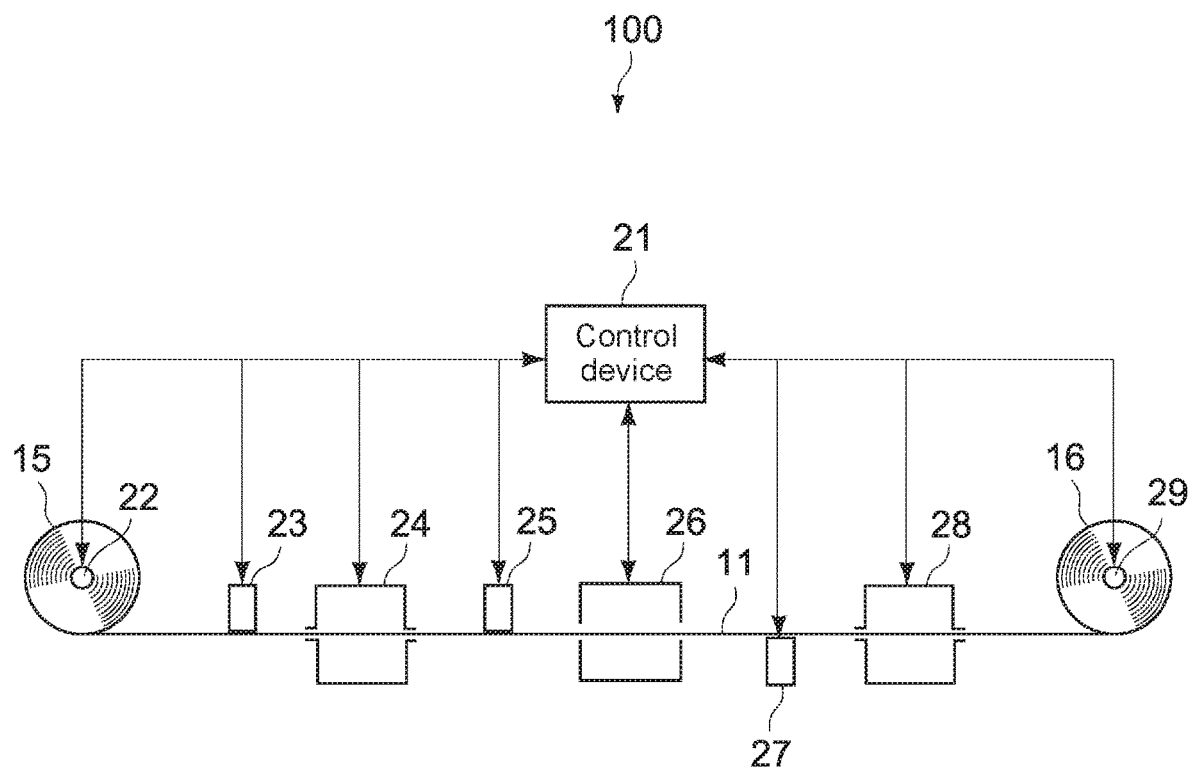
FIG. 2 A view illustrating a production apparatus for the magnetic recording medium.

FIG. 2 is a schematic view illustrating a production apparatus 100 for the magnetic recording medium 1. The magnetic recording medium 1 is produced basically by, for example, an application step, a calendering step, and a cutting step. This production apparatus 100 is an apparatus that is used in the application step.

As illustrated in FIG. 2, the production apparatus 100 includes a control device 21 that controls an entirety of the production apparatus 100. Further, the production apparatus 100 sequentially includes a feed roller 22, a first application device 23, a first drying device 24, a second application device 25, an orientation device 26, a third application device 27, and a second drying device 28, and a take-up roller 29 from an upstream side in a transport direction of the base 11. Note that, although not shown, the production apparatus 100 includes a plurality of guide rollers that guides the transport of the base 11.

The control device 21, which is a computer such as a PC (Personal Computer) or the like, comprehensively controls all the other devices in the production apparatus 100. This control device 21 includes, for example, a control unit, a storage unit, a communication unit, and the like. The control unit, which includes, for example, a CPU (Central Processing Unit) and the like, executes various processes in accordance with programs stored in the storage unit.

The storage unit includes a nonvolatile memory that records various data items and the various programs, and a volatile memory that is used as a work area of the control unit. The various programs may be read out of portable recording media such as an optical disk and a semiconductor memory, or may be downloaded from a server apparatus on a network. The communication unit is configured to be capable of mutually communicating to all the other devices in the production apparatus 100, and, for example, to the server apparatus.

The feed roller 22 supports, in a rotatable manner, a roll body 15 formed by rolling the base 11 therearound. This feed roller 22 is enabled to gradually feeding the base 11 by being driven to rotate the roll body 15.

The first application device 23 is configured to be capable of applying, at a certain film thickness, a non-magnetic-layer coating material (wet condition) containing the non-magnetic powder to the one main surface (upper surface) of the base 11. By applying the non-magnetic-layer coating material onto the base 11, a non-magnetic coating film in the wet condition is formed on the base 11.

The first drying device 24 is configured to be capable of drying the non-magnetic coating film formed on the base 11. The first drying device 24 is enabled to blow, vertical to an in-plane direction from upper-and-lower sides, hot-air currents (airflow) to the base 11 on which the non-magnetic coating film has been formed. By blowing the hot-air currents to the non-magnetic coating film, the non-magnetic coating film is dried and cured. Note that, by drying and curing the non-magnetic coating film, the non-magnetic coating film transforms into the non-magnetic layer 12.

The second application device 25 is configured to be capable of applying, at a certain film thickness with respect to the base 11 on which the non-magnetic layer 12 has been formed, the magnetic-layer coating material (wet condition) containing the magnetic powder onto the non-magnetic layer 12. By applying the magnetic-layer coating material onto the non-magnetic layer 12 (onto base 11), a magnetic coating film in the wet condition is formed on the non-magnetic layer 12.

The orientation device 26 vertically orients the particles of the magnetic powder in the magnetic coating film formed on the non-magnetic layer 12 (on base 11) (orients axes of easy magnetization of the particles of the magnetic powder in the vertical direction). Further, the orientation device 26 dries and cures the magnetic coating film under the state in which the particles of the magnetic powder have been vertically oriented. By drying and curing the magnetic coating film, the magnetic coating film transforms into the magnetic layer 13. Note that, a specific configuration of the orientation device 26 is described in detail below.

The third application device 27 is configured to be capable of applying, at a certain film thickness, a backing-layer coating material (wet condition) to the other main surface of the base 11. By applying the backing-layer coating material onto the base 11, a backing-layer coating film in the wet condition is formed on the base 11.

The second drying device 28 is configured to be capable of drying the backing-layer coating film formed on the base 11. The second drying device 28 is enabled to blow, vertical to the in-plane direction from the upper-and-lower sides, the hot-air currents (airflow) to the base 11 on which the backing-layer coating film has been formed. By blowing the hot-air currents to the backing-layer coating film, the backing-layer coating film is dried and cured. Note that, by drying and curing the backing-layer coating film, the backing-layer coating film transforms into the backing layer 14.

The take-up roller 29 is configured to be capable of taking up the base 11 on which the non-magnetic layer 12, the magnetic layer 13, and the backing layer 14 have been formed, that is, the magnetic recording medium 1. By rolling up the magnetic recording medium 1 with the take-up roller 29, a roll body 16 of the magnetic recording medium 1 is formed.

Note that, the roll body 16 of the magnetic recording medium 1, which is formed by the take-up roller 29, is shifted to the subsequent calendering step in which the surface of the magnetic layer 13 is smoothed by a calendering process. The magnetic recording medium 1 that has been subjected to the calendering process is rolled up. Then, in this state, a heating process is executed on the magnetic recording medium 1 (from a viewpoint of satisfactory transfer properties, typically, at 55° C. or more and 75° C. or less, and for 15 hours or more and 40 hours or less). With this, the large number of protruding portions on the surface of the backing layer 14 are transferred into the surface of the magnetic layer 13. In this way, the large number of pore portions are formed in the surface of the magnetic layer 13.

Next, the rolled-up magnetic recording medium 1 is shifted to the cutting step, and cut into a predetermined width (for example, the width of ½ inches). In this way, the magnetic recording medium 1 as intended (such as magnetic recording medium 1 to be housed in the cartridge) is obtained.

Note that, the magnetic-layer coating material that is used in the second application device 25 is prepared by kneading and dispersing the magnetic powder, the binder, the lubricant, and the like into a solvent. Further, the non-magnetic-layer coating material that is used in the first application device 23 is prepared by kneading and dispersing the non-magnetic powder, the binder, the lubricant, and the like into the solvent. Still further, the backing-layer coating material that is used in the third application device 27 is prepared by kneading and dispersing the binder, the non-magnetic powder, and the like into the solvent. For the preparation of the magnetic-layer coating material, the non-magnetic layer coating material, and the backing-layer coating material, for example, the following solvents, kneading apparatuses, and dispersion apparatuses can be used.

As examples of the solvents that are used for the preparation of the coating materials, there may be mentioned ketone-based solvents such as acetone, methyl ethyl ketone, methyl isobutyl ketone, and cyclohexanone; alcohol-based solvents such as methanol, ethanol, and propanol; ester-based solvents such as methyl acetate, ethyl acetate, butyl acetate, propyl acetate, ethyl lactate, and ethylene glycol acetate; ether-based solvents such as diethylene glycol dimethyl ether, 2-ethoxyethanol, tetrahydrofuran, and dioxane; aromatic hydrocarbon-based solvents such as benzene, toluene, and xylene; halogenated hydrocarbon-based solvents such as methylene chloride, ethylene chloride, carbon tetrachloride, chloroform, and chlorobenzene; and the like. These may be used alone, or may be used in combination as appropriate.

As examples of the kneading apparatuses that are used for the preparation of the coating materials, there may be mentioned kneading apparatuses such as a continuous biaxial kneader, a continuous biaxial kneader capable of dilution in multiple steps, a kneader, a pressurizing kneader, and a roll kneader. As examples of the dispersion apparatuses that are used for the preparation of the coating materials, there may be mentioned dispersion apparatuses such as a roll mill, a ball mill, a horizontal sand mill, a vertical sand mill, a spike mill, a pin mill, a tower mill, a pearl mill (such as "DCP Mill" produced by Maschinenfabrik Gustav Eirich GmbH & Co. KG, and the like), a homogenizer, and an ultrasonic disperser.

[Orientation Device 26]

Figure 3:
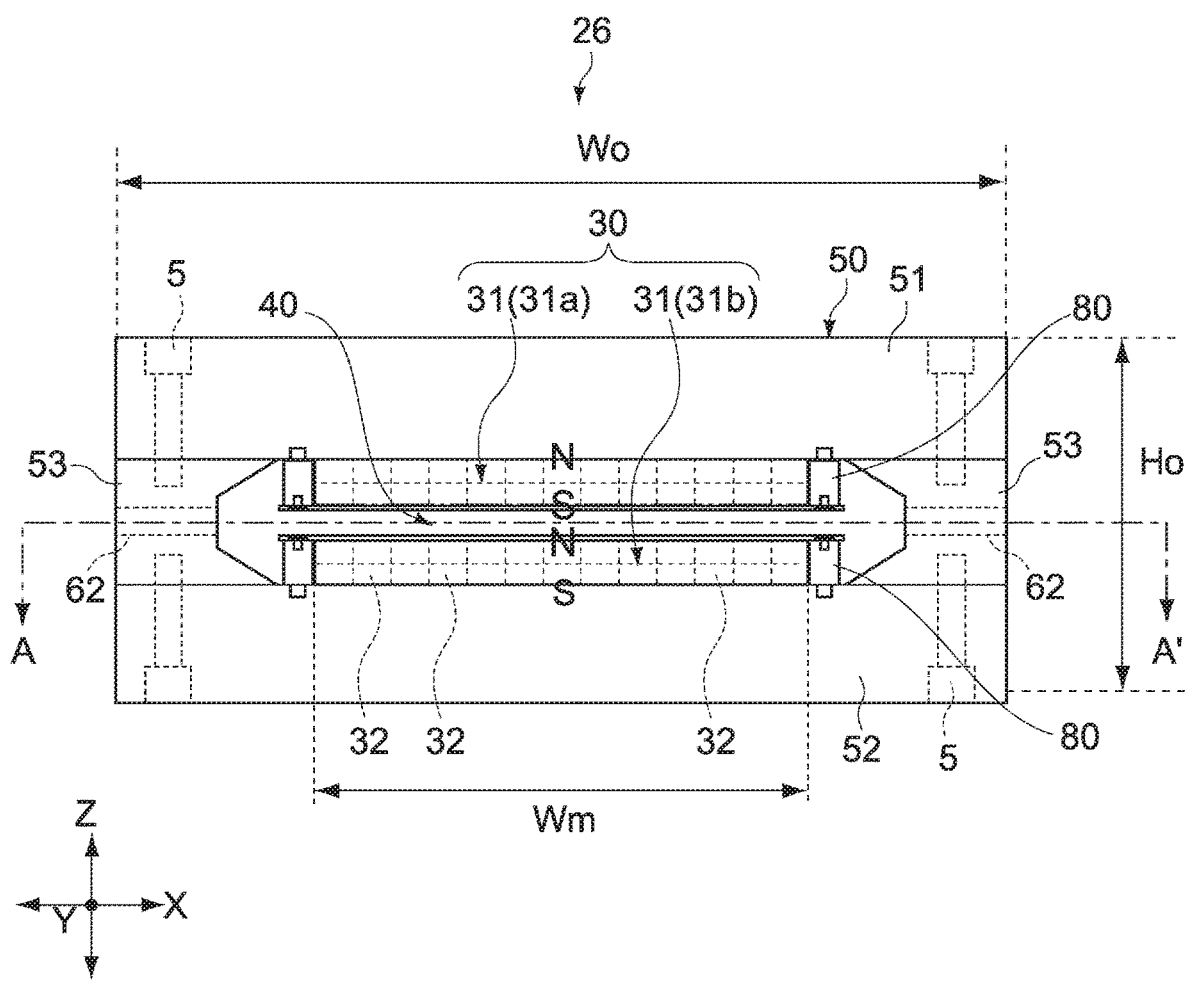
FIG. 3 A view in which an orientation device is viewed in a transport direction.
Figure 4:
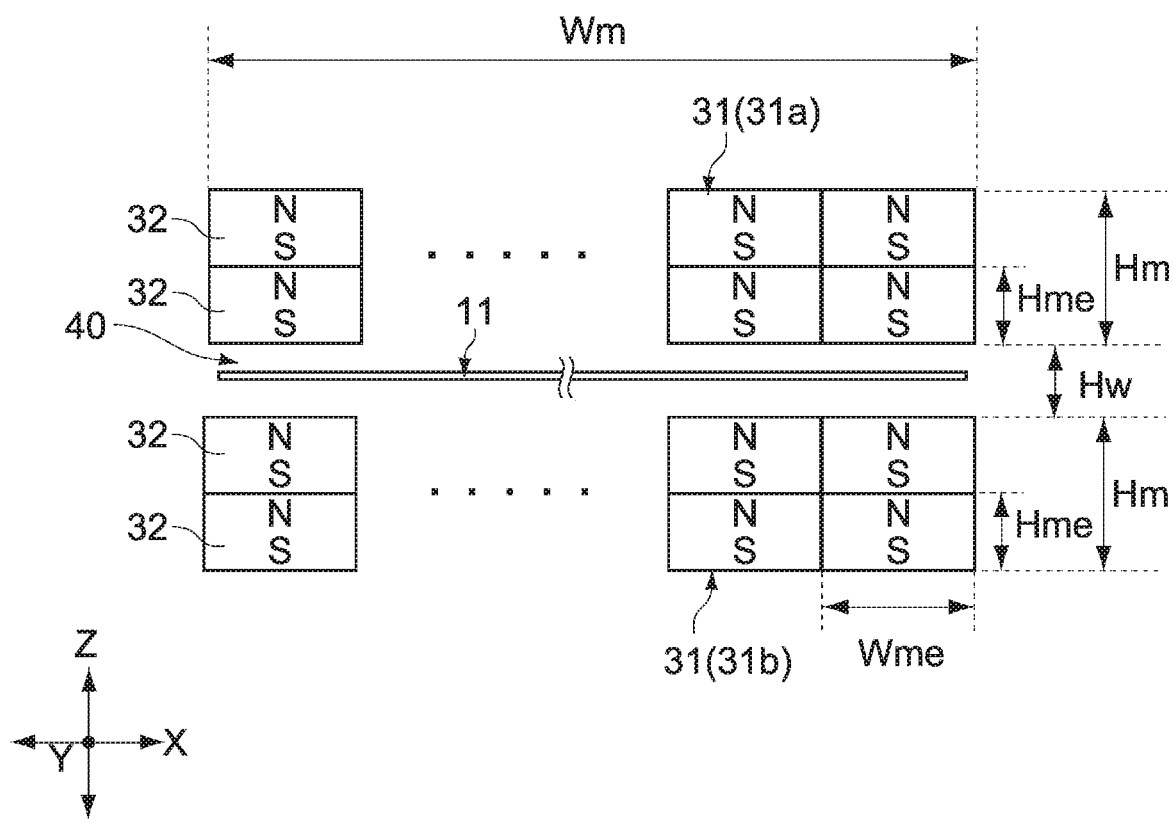
FIG. 4 An enlarged view in which permanent magnets of the orientation device are viewed in the transport direction.
Figure 5:
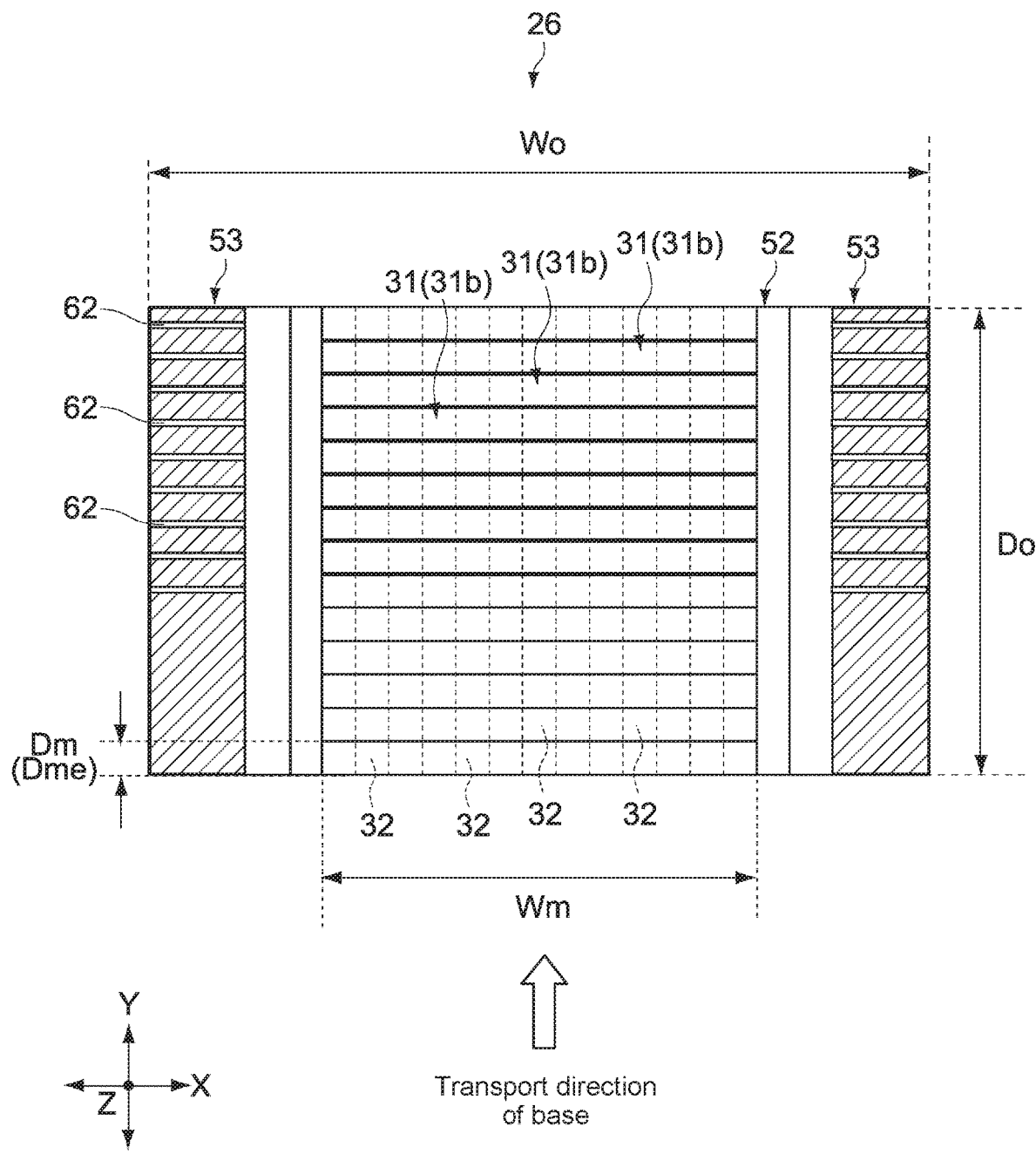
FIG. 5 A cross-sectional view taken along A-A' shown in FIG. 3.
Figure 6:
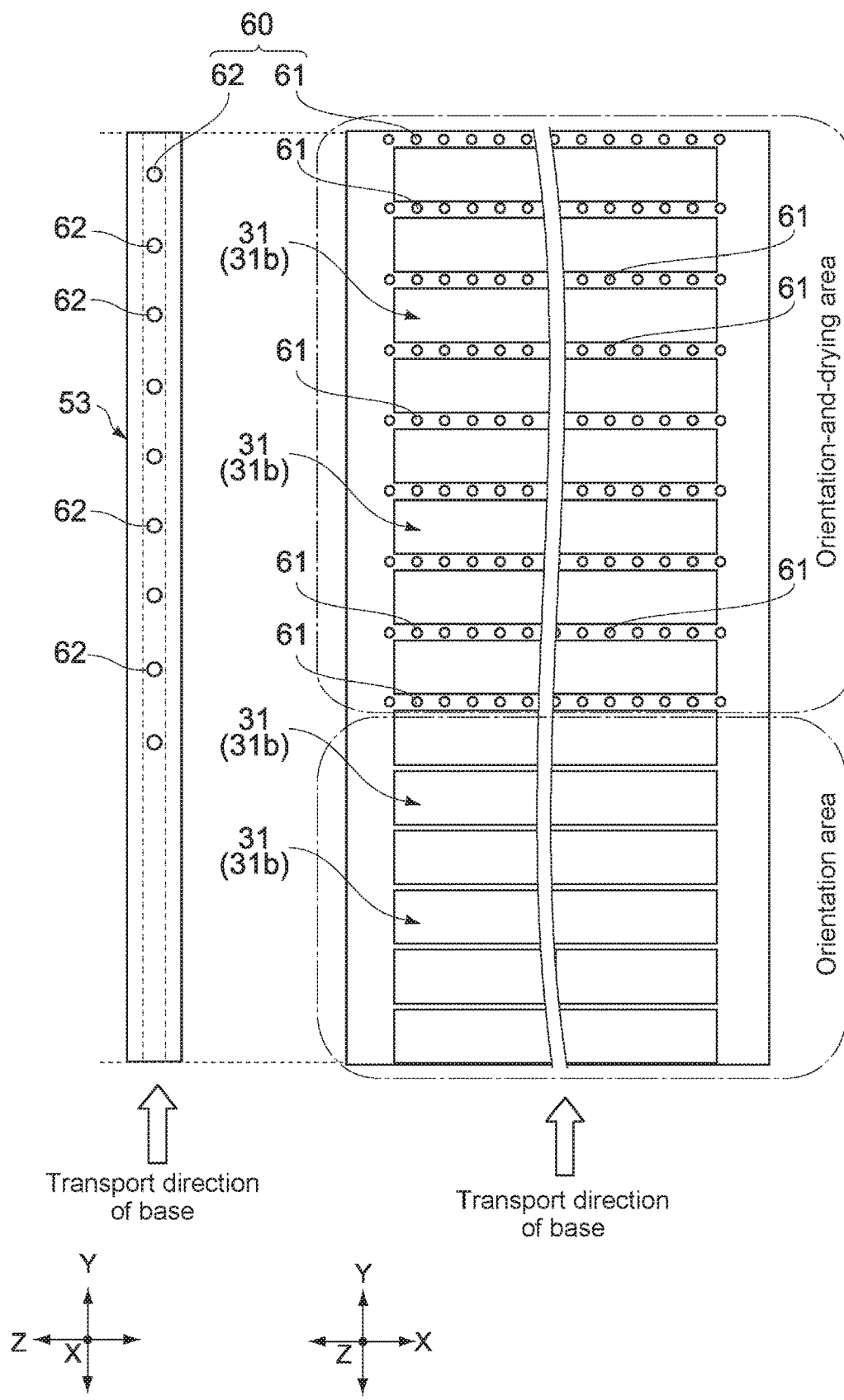
FIG. 6 A view illustrating a drying portion of the orientation device.

FIG. 3 is a view in which the orientation device 26 is viewed in the transport direction. FIG. 4 is an enlarged view in which permanent magnets 31 of the orientation device 26 are viewed in the transport direction. FIG. 5 is a cross-sectional view taken along A-A' shown in FIG. 3. FIG. 6 is a view illustrating a drying portion 60 of the orientation device 26.

A right-hand part of FIG. 6 illustrates the orientation device 26 as viewed downward from an inside of a transport path 40, and a left-hand part of FIG. 6 illustrates the orientation device 26 as viewed leftward from the inside of the transport path 40. Note that, in FIG. 5 and FIG. 6, magnet fixing plates 80 described below are not shown.

In the description of the orientation device 26, a direction in which the base 11 is transported is referred to as the transport direction (Y-axis direction). Further, a direction that is orthogonal to the transport direction, and orthogonal to the in-plane direction of the base 11 to be transported is referred to as the vertical direction (Z-axis direction). Still further, a direction orthogonal to the transport direction and the vertical direction is referred to as a width direction (X-axis direction).

In addition, in the description of the orientation device 26, terms "front" and "rear" are used respectively as terms representing a direction of the upstream side and a direction of a downstream side in the transport direction. Further, the terms "right" and "left" are used respectively as terms representing directions as viewed from the upstream side in the transport direction.

In this embodiment, an entire width Wo (width direction: X-axis direction) of the orientation device 26 is set to approximately 1,000 mm. In addition, in this embodiment, an entire height Ho (vertical direction: Z-axis direction) of the orientation device 26 is set to approximately 400 mm, and an entire depth Do (transport direction: Y-axis direction) of the orientation device 26 is set to approximately 800 mm.

Note that, herein, for ease of understanding of the present technology, specific values are set for the orientation device 26, a size of each member of the orientation device 26, and the number of these members, and the like Meanwhile, these values are merely examples, and hence may be changed as appropriate.

As illustrated in FIG. 3 to FIG. 6, the orientation device 26 includes the transport path 40, a permanent magnet portion 30, a yoke portion 50, and the drying portion 60.

(Transport Path 40)

The transport path 40 is provided along the transport direction (Y-axis direction) through the orientation device 26. This transport path 40 allows the base 11 on which the magnetic coating film containing the magnetic powder has been formed to pass along the transport direction.

A width (width direction: X-axis direction) of the transport path 40, which is set to a size slightly larger than the width of the base 11 on which the magnetic coating film has been formed, is set, for example, to approximately 700 mm. Further, a height Hw (vertical direction: Z-axis direction) of the transport path 40 is set, for example, to approximately 24 mm (this height Hw is equal to a distance Hw in the vertical direction between poles facing each other of a first permanent magnet 31a and a second permanent magnet 31b described below). Still further, a depth (transport direction: Y-axis direction) of the transport path 40, which is equal to the entire depth of the orientation device 26, is set, for example, to approximately 800 mm.

(Permanent Magnet Portion 30)

The first permanent magnet 31a and the second permanent magnet 31b of the permanent magnet portion 30 respectively include a plurality of first permanent magnets 31a and a plurality of second permanent magnets 31b. The plurality of first permanent magnets 31a and the plurality of second permanent magnets 31b are opposed to each other in the vertical direction (Z-axis direction) across the transport path 40 in a manner that opposite poles face each other. This permanent magnet portion 30 applies a magnetic field to the magnetic coating film on the base 11 that passes through the transport path 40 so as to vertically orient the particles of the magnetic powder in the magnetic coating film.

Note that, herein, unless it is necessary to make specific distinctions between the first permanent magnets 31a and the second permanent magnets 31b, these magnets are simply referred to as the permanent magnets 31.

The plurality of first permanent magnets 31a is arranged on an upper side in the vertical direction with respect to the transport path 40 (magnetic-coating-film side of the base 11). Meanwhile, the plurality of second permanent magnets 31b is arranged on a lower side in the vertical direction with respect to the transport path 40 (side of the base 11, which is opposite to the magnetic-coating-film side).

The first permanent magnet 31a and the second permanent magnet 31b are each arranged such that their magnetization direction are oriented in the vertical direction. Further, in the first permanent magnet 31a, the transport-path-40 side is an S-pole, and a side opposite to the transport-path-40 side is an N-pole. Meanwhile, in the second permanent magnet 31b, the transport-path-40 side is the N-pole, and a side opposite to the transport-path-40 side is the S-pole. A pair of the first permanent magnet 31a and the second permanent magnet 31b facing each other are formed in plane symmetry with respect to an X-Y plane (horizontal plane).

In this embodiment, the clearance Hw in the vertical direction between the poles facing each other of the first permanent magnet 31a and the second permanent magnet 31b (height Hw of the transport path 40: refer to FIG. 4) is set to approximately 24 mm.

In this embodiment, a width Wm (width direction: X-axis direction) of each of the first permanent magnet 31a and the second permanent magnet 31b is set to approximately 650 mm. Note that, this width Wm is set to a size substantially the same as the width of the base 11, or to the size slightly larger than the width of the base 11.

Further, in this embodiment, a height Hm (vertical direction: Z-axis direction) of each of the first permanent magnet 31a and the second permanent magnet 31b is set to approximately 50 mm. Still further, in this embodiment, a depth Do (transport direction: Y-axis direction) of each of the first permanent magnet 31a and the second permanent magnet 31b is set to approximately 50 mm.

Note that, as understood from the description, the first permanent magnet 31a and the second permanent magnet 31b each have a shape that is long in the width direction (X-axis direction) and short in the vertical direction (Z-axis direction) and the transport direction (Y-axis direction). In this embodiment, the permanent magnet portion 30 includes the plurality of first permanent magnets 31a and the plurality of second permanent magnets 31b, each of which is long in the width direction, and which are arrayed at a predetermined interval along the transport direction In this embodiment, the number of the first permanent magnets 31a and the number of the second permanent magnets 31b are each set to fourteen (that is, fourteen rows in the transport direction). In other words, the permanent magnet portion 30 includes a total of twenty-eight, that is, two-by-fourteen permanent magnets 31.

Note that, herein, at the time of specifically distinguishing individual ones of the permanent magnets 31 from each other in the transport direction, these individual ones are sequentially referred to as a first-row permanent magnet 31, a second-row permanent magnet 31, . . . , and a fourteenth-row permanent magnet 31 from the upstream side in the transport direction.

The first permanent magnet 31a and the second permanent magnet 31b each include a plurality of permanent magnet elements 32. In this embodiment, the permanent magnets 31 each include two permanent magnet elements 32 that are laminated in the vertical direction in the manner that opposite poles face each other, and that are arrayed linearly along the width direction in thirteen pairs without gaps therebetween. In other words, in this embodiment, the permanent magnets 31 each include a total of twenty-six (=2×13) permanent magnet elements 32 in the two stages in the vertical direction (Z-axis direction) and in the thirteen columns in the width direction (X-axis direction).

In this embodiment, a width Wme (width direction: X-axis direction) of each of the permanent magnet elements 32 is set to approximately 50 mm, and a height Hme (vertical direction: Z-axis direction) of each of the permanent magnet elements 32 is set to approximately 25 mm. In addition, in this embodiment, a depth Dme (transport direction: Y-axis direction) of each of the permanent magnet elements 32 is set to approximately 50 mm.

Note that, the width Wm of each of the first permanent magnet 31a and the second permanent magnet 31b is approximately thirteen times as large as the width Wme of each of the permanent magnet elements 32 (50 mm×13=650 mm). Further, the height Hm of each of the first permanent magnet 31a and the second permanent magnet 31b is approximately twice as large as the height Hme of each of the permanent magnet elements 32 (25 mm×2=50 mm). In addition, the depth Dm of each of the first permanent magnet 31a and the second permanent magnet 31b is equal to the depth Dme of each of the permanent magnet elements 32 (Dm=Dme).

In the case described herein, the permanent magnet elements 32 are laminated in the two stages in the vertical direction. However, the permanent magnet elements 32 may be in a single stage in the vertical direction (for example, the permanent magnet elements 32 each having a height set to 50 mm may be in a single stage).

(Yoke Portion 50)

The yoke portion 50 is made of a soft magnetic material. This yoke portion 50 is connected to the poles on the side opposite to the transport-path-40 side of the plurality of first permanent magnets 31a (N-poles), and to the poles on the side opposite to the transport-path-40 side of the plurality of second permanent magnets 31b (S-poles).

In this way, the yoke portion 50 forms a magnetic circuit cooperatively with the plurality of first permanent magnets 31a and the plurality of second permanent magnets 31b. This yoke portion 50 has a function of what is called a return yoke that forms a loop of the magnetic field generated by the permanent magnets 31.

A width (width direction: X-axis direction), a height (vertical direction: Z-axis direction), and a depth (transport direction: Y-axis direction) of the yoke portion 50, which are equal to the width Wo, the height Ho, and the depth Do of the entirety of the orientation device 26, are set, for example, respectively to approximately 1,000 mm, approximately 400 mm, and approximately 800 mm.

As examples of the soft magnetic material to be used as that of the yoke portion 50, there may be mentioned iron, ferrosilicon, permalloy, sendust, permendur, electromagnetic stainless steel, an amorphous magnetic alloy, a nanocrystalline magnetic alloy, and the like. Note that, the material to be used as that of the yoke portion 50 may be a soft magnetic material of any type.

The yoke portion 50 includes a first yoke portion 51, a second yoke portion 52, and a pair of third yoke portions 53. The first yoke portion 51 supports the plurality of first permanent magnets 31a from the side opposite to the transport-path-40 side. The second yoke portion 52 supports the plurality of second permanent magnets 31b from the side opposite to the transport-path-40 side. The pair of third yoke portions 53 are interposed between the first yoke portion 51 and the second yoke portion 52, and couple these yoke portions 51 and 52 to each other.

The first yoke portion 51 and the second yoke portion 52 each have a rectangular parallelepiped shape that is small in thickness (vertical direction: Z-axis direction). The pair of third yoke portions 53 each have a rectangular parallelepiped shape in which a surface on the transport-path-40 side in the width direction (X-axis direction) is recessed. This recess has a shape recessed deepest at its central part in the vertical direction (Z-axis direction). Note that, the pair of third yoke portions 53 may each be formed into a simple rectangular-parallelepiped shape.

Of the pair of third yoke portions, one of the third yoke portions 53 is interposed between a bottom surface of the first yoke portion 51 and a top surface of the second yoke portion 52 on one end side in the width direction of the first yoke portion 51 and the second yoke portion 52. Further, of the pair of third yoke portions, another one of the third yoke portions 53 is interposed between the bottom surface of the first yoke portion 51 and the top surface of the second yoke portion 52 on another end side in the width direction of the first yoke portion 51 and the second yoke portion 52.

The first yoke portion 51 and the third yoke portions 53 are connected and fixed to each other with, for example, connecting portions such as bolts 5. Similarly, the second yoke portion 52 and the third yoke portions 53 are connected and fixed to each other with, for example, the connecting portions such as the bolts 5.

(Drying Portion 60)

The drying portion 60 (in particular, refer to FIG. 6) dries and cures the magnetic coating film under the state in which the particles of the magnetic powder in the magnetic coating film have been vertically oriented by the magnetic field applied from the permanent magnet portion 30. The drying portion 60 includes a plurality of blowing ports 61 that allows the hot-air currents (airflow) for drying the magnetic coating film to be blown into the transport path 40, and a plurality of suction ports 62 for allowing the hot-air currents (airflow) in the transport path 40 to be sucked and discharged to an outside of the transport path 40.

Figure 19:
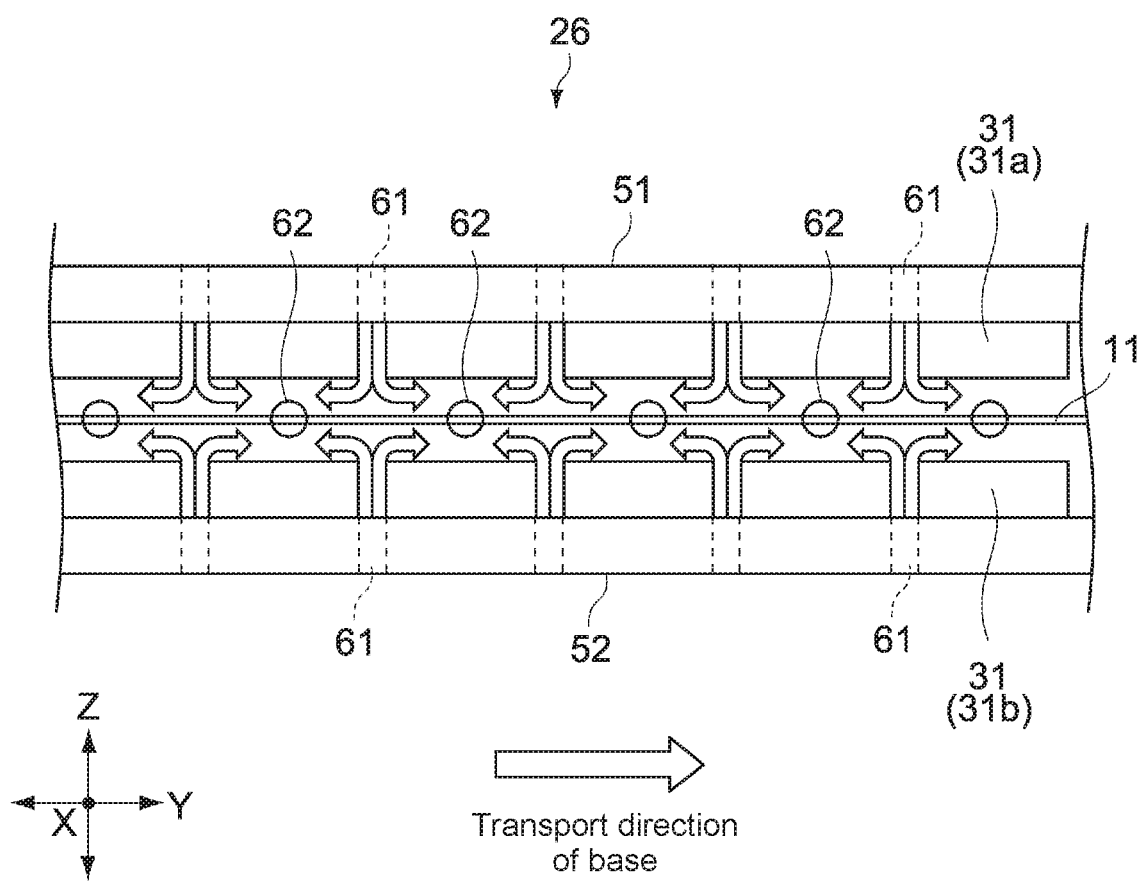
FIG. 19 A view illustrating a state in which hot-air currents are blown through blowing ports.

The plurality of blowing ports 61, which is provided in the vertical direction (Z-axis direction) through the first yoke portion 51 and the second yoke portion 52, is provided to allow the hot-air currents to be blown in the vertical direction (refer also to FIG. 19). The plurality of blowing ports 61 is connected to a device such as a compressor or a pump (not shown). By driving this device, the hot-air currents are forcibly blown into the transport path 40 through the plurality of blowing ports 61.

The blowing ports 61 provided through the first yoke portion 51 allow the hot-air currents to be blown downward in the vertical direction so as to blow the hot-air currents vertically toward the magnetic-coating-film side of the base 11. Meanwhile, the blowing ports 61 provided through the second yoke portion 52 allow the hot-air currents to be blown upward in the vertical direction so as to blow the hot-air currents vertically toward the side opposite to the magnetic-coating-film side of the base 11.

The plurality of blowing ports 61 is arranged at a predetermined interval in the transport direction. Specifically, the plurality of blowing ports 61 is provided in regions between the ones of the permanent magnets 31, which are adjacent to each other in the transport direction. Further, in each of the regions between the ones of the permanent magnets 31, which are adjacent to each other, the plurality of blowing ports 61 is arranged at a predetermined interval along the width direction.

Note that, in this embodiment, the plurality of blowing ports 61 is not provided in all the regions between the ones of the permanent magnets 31, which are adjacent to each other in the transport direction. Specifically, the plurality of blowing ports 61 is provided in a region between a sixth-row permanent magnet 31 and a seventh-row permanent magnet 31, a region between the seventh-row permanent magnet 31 and an eighth-row permanent magnet 31, . . . , a region between a thirteenth-row permanent magnet 31 and the fourteenth-row (last-row) permanent magnet 31, and a region on the rear side with respect to the fourteenth-row permanent magnet 31.

Meanwhile, the plurality of blowing ports 61 is not provided in a region between the first-row permanent magnet 31 and the second-row permanent magnet 31, a region between the second-row permanent magnet 31 and a third-row permanent magnet 31, . . . , and a region between a fifth-row permanent magnet 31 and a sixth-row permanent magnet 31.

In other words, in this embodiment, the orientation device 26 includes, in the transport path 40, an orientation area (first area) in which the plurality of blowing ports 61 (drying portion 60) is not provided in the transport direction (Y-axis direction), and an orientation-and-drying area (second area) in which the plurality of blowing ports 61 (drying portion 60) is provided in the transport direction.

The orientation area, which is a part area on the upstream side in the transport direction in the transport path 40, is an area in which the particles of the magnetic powder in the magnetic coating film on the base 11 that has entered the transport path 40 are sufficiently vertically oriented by the permanent magnet portion 30. Meanwhile, the orientation-and-drying area is an area on the downstream side out of the part area on the upstream side. This orientation-and-drying area is an area in which the particles of the magnetic powder, which have been sufficiently vertically oriented in the orientation area, are maintained in the sufficiently vertically oriented state by the permanent magnet portion 30, and at the same time, the magnetic coating film is dried and cured by the drying portion 60.

In other words, in this embodiment, an orientation process is executed in two phases of the orientation area and the orientation-and-drying area.

FIG. 9 depicts a state before the particles of the magnetic powder are vertically oriented, and a state after the particles of the magnetic powder have been vertically oriented. Under a state in which the magnetic field generated by the permanent magnets 31 has not been applied to the particles of the magnetic powder in the magnetic coating film, as depicted in a left-hand part of FIG. 9, the particles of the magnetic powder have random orientations. Meanwhile, once the magnetic field generated by the permanent magnets 31 is applied to the particles of the magnetic powder in the magnetic coating film, as depicted in a right-hand part of FIG. 9, postures of the particles of the magnetic powder vary (the particles of the magnetic powder are movable because the magnetic coating film has been maintained in the wet condition by the solvent). With this, the particles of the magnetic powder are uniformly oriented in the vertical direction, and hence the axes of easy magnetization are oriented in the vertical direction.

In the orientation area, as depicted in the right-hand part of FIG. 9, the particles of the magnetic powder are sufficiently vertically oriented. Then, in the orientation-and-drying area, the state in which the particles of the magnetic powder have been vertically oriented is maintained, and at the same time, the magnetic coating film is dried and cured.

In this embodiment, the orientation area is defined as an area corresponding to the first-row permanent magnet 31 to the sixth-row permanent magnet 31. Meanwhile, the orientation-and-drying area is defined as an area corresponding to the seventh-row permanent magnet 31 to the fourteenth-row permanent magnet 31.

In this embodiment, the orientation area is defined as an area corresponding to the permanent magnets 31 in the six rows, and the orientation-and-drying area is defined as an area corresponding to the permanent magnets 31 in the eight rows. In other words, a ratio of the orientation area and the orientation-and-drying area is set to 6:8 on the basis of the number of rows of the permanent magnets 31. Meanwhile, this ratio is not limited to 6:8, and may be changed as appropriate (note that, typically, the value of the orientation-and-drying area is larger than the value of the orientation area).

Note that, in this embodiment, since the blowing ports 61 are provided, an interval between two of the permanent magnets 31 in the sixth row to the fourteenth row, which are adjacent to each other, is larger than an interval between two of the permanent magnets 31 in the first row to the sixth row, which are adjacent to each other.

The plurality of suction ports 62, which is provided in the width direction (X-axis direction) through the third yoke portions 53, is provided to allow the hot-air currents (airflow) to be sucked in the width direction. The plurality of suction ports 62 is connected to the device such as a compressor or a pump (not shown). By driving this device, the hot-air currents in the transport path 40 are forcibly discharged to the outside of the transport path 40 through the plurality of suction ports 62.

The plurality of suction ports 62 is arranged at a predetermined interval in the transport direction (Y-axis direction). Positions in the transport direction of the plurality of suction ports 62 are set in relation to positions of the plurality of blowing ports 61 in the transport direction. Specifically, in this embodiment, the suction ports 62 are each provided at an intermediate position between corresponding two of the blowing ports 61 in the transport direction. By arranging the suction ports 62 at such positions, the hot-air currents in the transport path 40 can be efficiently discharged to the outside of the orientation device 26.

Further, height positions in the vertical direction (Z-axis direction) of the plurality of suction ports 62 are set in relation to a height position in the vertical direction of the base 11 that is transported through the transport path 40. Specifically, in this embodiment, the height positions of the suction ports 62 are set to a height equal to that of the height position of the base 11 that is transported through the transport path 40. By arranging the suction ports 62 at such positions, the hot-air currents in the transport path 40 can be efficiently discharged to the outside of the orientation device 26.

(Units 70 and Magnet Fixing Plates 80)

Figure 7:
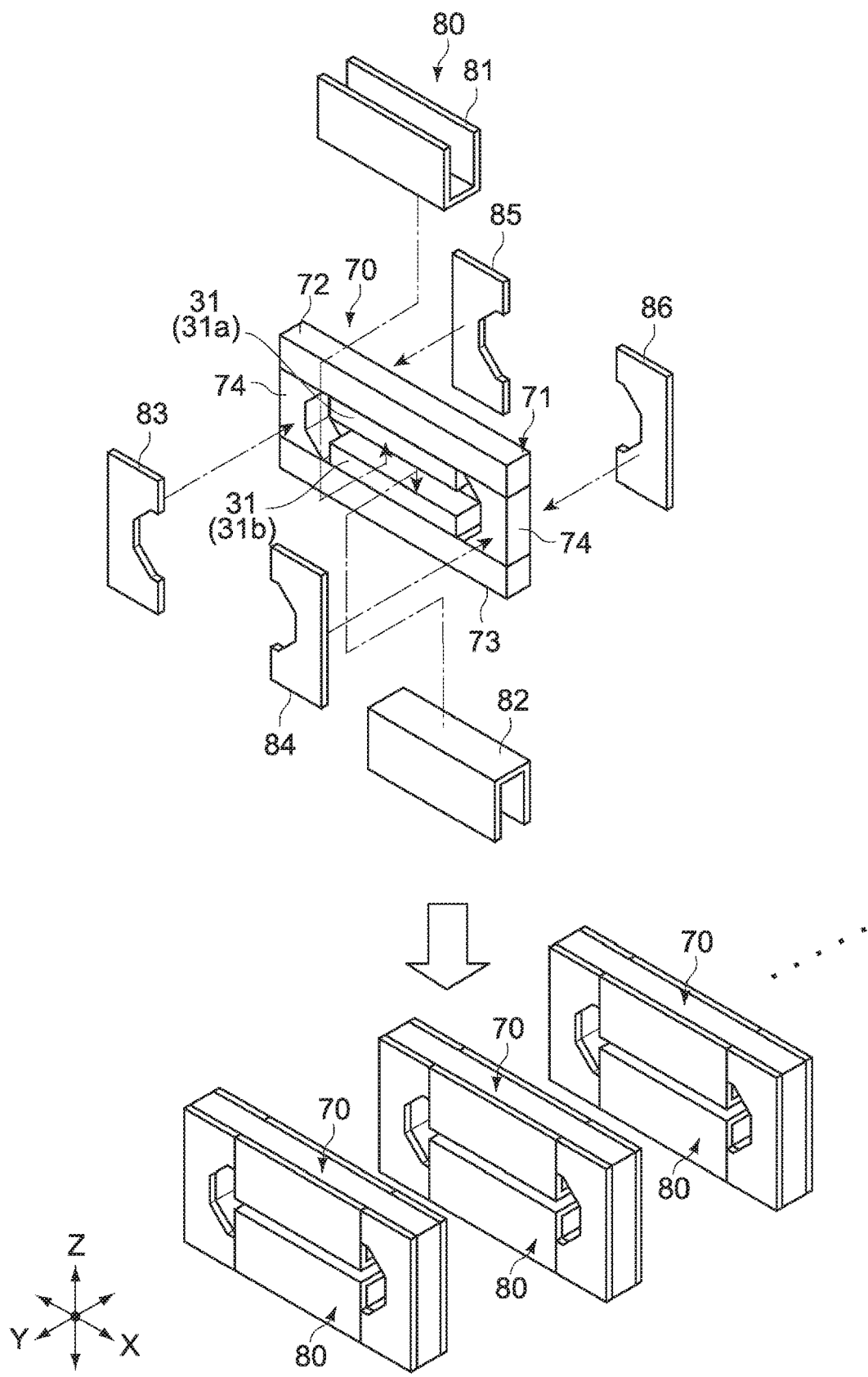
FIG. 7 A perspective view illustrating units of the orientation device.

Herein, the orientation device 26 includes a plurality of units 70 that is thin in the transport direction and arrayed along the transport direction. FIG. 7 is a perspective view illustrating the units 70. An upper part of FIG. 7 illustrates a state at a time when the magnet fixing plate 80 is attached to the unit 70, and a lower part of FIG. 7 illustrates a state after the magnet fixing plate 80 has been attached to the unit 70.

As illustrated in FIG. 7, the unit 70 includes one of the first permanent magnets 31a, and one of the second permanent magnets 31b, and a yoke unit portion 71 that constitutes a part of the yoke portion 50.

The yoke unit portion 71 connects to the pole on the side opposite to the transport-path-40 side of the first permanent magnet 31a (N-pole), and to the pole on the side opposite to the transport-path-40 side of the second permanent magnet 31b (S-pole) so as to form the magnetic circuit cooperatively with the first permanent magnet 31a portion 30 and the second permanent magnet 31b.

A depth (transport direction: Y-axis direction) of the yoke unit portion 71, which is set approximately equal to the depth Dm (transport direction) of each of the first permanent magnet 31a and the second permanent magnet 31b, is set, for example, to approximately 50 mm. Note that, a width (width direction: X-axis direction) and a height (vertical direction: Z-axis direction) of the yoke unit portion 71, which are equal to the width and the height of the yoke portion 50, are set, for example, respectively to approximately 1,000 mm and approximately 400 mm.

The yoke unit portion 71 includes a first yoke-unit portion 72 constituting a part of the first yoke portion 51, a second yoke-unit portion 73 constituting a part of the second yoke portion 52, and a pair of third yoke-unit portions 74 constituting a part of the pair of third yoke portions 53.

The first yoke-unit portion 72 supports the first permanent magnet 31a from the side opposite to the transport-path-40 side. The second yoke-unit portion 73 supports the second permanent magnet 31b from the side opposite to the transport-path-40 side. The pair of third yoke-unit portions 74 couple the first yoke-unit portion 72 and the second yoke-unit portion 73 to each other.

The magnet fixing plate 80 is a member for fixing the first permanent magnet 31 and the second permanent magnet 31b to the yoke unit portion 71. A thickness of the magnet fixing plate 80 is set typically to 2 mm or more and 5 mm or less.

The magnet fixing plate 80 includes a first fixing member 81 for fixing the first permanent magnet 31a to the first yoke-unit portion 72, and a second fixing member 82 for fixing the second permanent magnet 31b to the second yoke portion 52. In addition, the magnet fixing plate 80 includes a third fixing member 83 and a fourth fixing member 84 that are provided on a front surface side of the yoke unit portion 71, and a fifth fixing member 85 and a sixth fixing member 86 that are provided on a rear surface side of the yoke unit portion 71.

The first fixing member 81 and the second fixing member 82 are each formed into a U-shape as viewed in the width direction. The first fixing member 81 and the second fixing member 82 have the same configuration except that their orientations at the time of being attached to the yoke unit portion 71 are different from each other.

A width (width direction: X-axis direction) of the first fixing member 81 is set approximately equal to the width Wm of the first permanent magnet 31a. In addition, a height (vertical direction: Z-axis direction) of the first fixing member 81 is set approximately equal to a value obtained by adding the height Hm of the first permanent magnet 31a to a thickness (vertical direction) of the first yoke-unit portion 72. Similarly, a width (width direction: X-axis direction) of the second fixing member 82 is set approximately equal to the width Wm of the second permanent magnet 31b. In addition, a height (vertical direction: Z-axis direction) of the second fixing member 82 is set approximately equal to a value obtained by adding the height Hm of the second permanent magnet 31b to a thickness (vertical direction) of the second yoke-unit portion 73.

The first fixing member 81 is attached to the unit 70 in a manner of being held in close contact with and covering a part of a front surface of the first yoke-unit portion 72, entireties of a front surface, a bottom surface, and a rear surface of the first permanent magnet 31a, and a part of a rear surface of the first yoke-unit portion 72. The second fixing member 82 is attached to the unit 70 in a manner of being held in close contact with and covering a part of a front surface of the second yoke-unit portion 73, entireties of a front surface, a top surface, and a rear surface of the second permanent magnet 31b, and a part of a rear surface of the second yoke-unit portion 73.

The first fixing member 81 and the second fixing member 82 are each made of a non-magnetic material (in other words, the first fixing member 81 and the second fixing member 82 are each a non-magnetic portion). By forming the first fixing member 81 and the second fixing member 82 with the non-magnetic material in such a way, the ones of the permanent magnets 31, which are adjacent to each other in the transport direction, can be prevented from bridging.

Note that, in the magnet fixing plate 80, as long as at least the parts that cover the front surfaces and the rear surfaces of the permanent magnets 31 are made of the non-magnetic material, the ones of the permanent magnets 31, which are adjacent to each other in the transport direction, can be prevented from bridging.

The third to the sixth fixing members 83, 84, 85, and 86 each have a function to close gaps between the units 70, which are formed by attaching the first fixing member 81 and the second fixing member 82 to the unit 70. The third to the sixth fixing members 83, 84, 85, and 86 have the same configuration except that their attachment orientations with respect to the yoke unit portion 71 are different from each other.

Shapes of the third to the sixth fixing members 83, 84, 85, and 86 are set such that regions that cannot be covered with the first fixing member 81 and the second fixing member 82 on the front surface and the rear surface of the yoke unit portion 71 can be covered.

The third fixing member 83 is attached to the unit 70 so as to cover an entirety of a front surface of a left-hand one of the third yoke-unit portions 74, and regions of the front surfaces of the first yoke-unit portion 72 and the second yoke-unit portion 73, which are not covered with the first fixing member 81 and the second fixing member 82.

The fourth fixing member 84 is attached to the unit 70 so as to cover an entirety of a front surface of a right-hand one of the third yoke-unit portions 74, and other regions of the front surfaces of the first yoke-unit portion 72 and the second yoke-unit portion 73, which are not covered with the first fixing member 81 and the second fixing member 82.

The fifth fixing member 85 is attached to the unit 70 so as to cover an entirety of a rear surface of the left-hand one of the third yoke-unit portions 74, and regions of the rear surfaces of the first yoke-unit portion 72 and the second yoke-unit portion 73, which are not covered with the first fixing member 81 and the second fixing member 82.

The sixth fixing member 86 is attached to the unit 70 so as to cover an entirety of a rear surface of the right-hand one of the third yoke-unit portions 74, and other regions of the rear surfaces of the first yoke-unit portion 72 and the second yoke-unit portion 73, which are not covered with the first fixing member 81 and the second fixing member 82.

The third to the sixth fixing members 83, 84, 85, and 86 are each made of a (soft) magnetic material (in other words, the third to the sixth fixing members are each a magnetic portion). By forming the third to the sixth fixing members 83, 84, 85, and 86 with the (soft) magnetic material in such a way, magnetic flux can be prevented from being saturated in the third yoke-unit portions 74 (third yoke portions 53).

Note that, in the magnet fixing plate 80, as long as at least the parts corresponding to the third yoke-unit portions 74 are made of the (soft) magnetic material, the magnetic flux can be prevented from being saturated in the third yoke-unit portions 74 (third yoke portions 53).

As illustrated in a lower part of FIG. 7, after the magnet fixing plate 80 has been attached to the unit 70, the plurality of units 70 to each of which the magnet fixing plate 80 has been attached is arrayed and connected to each other along the transport direction. In this way, the orientation device 26 is assembled.

Figure 8:
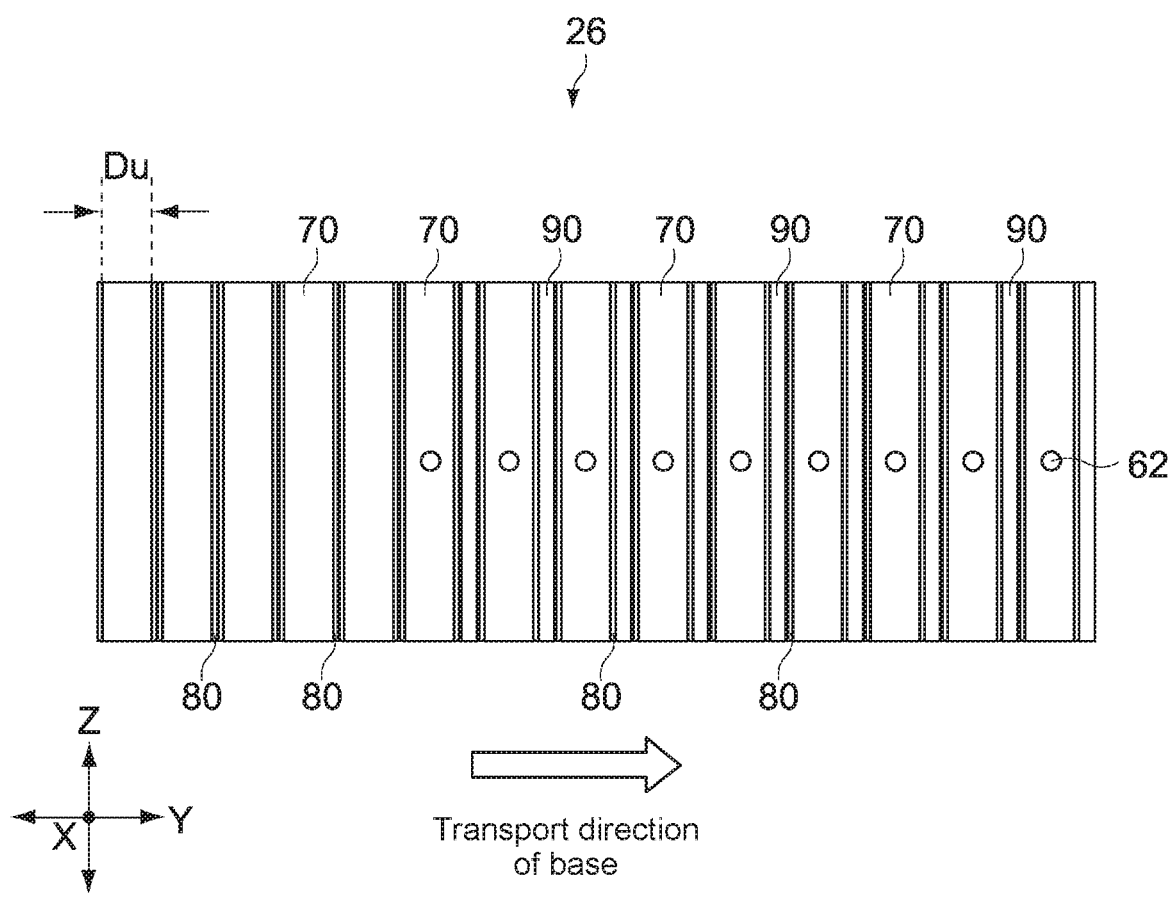
FIG. 8 A side view of the orientation device.

FIG. 8 is a side view of the orientation device 26. As illustrated in FIG. 8, the magnet fixing plates 80 are interposed between ones of the units 70, which are adjacent to each other in the transport direction.

Herein, in order to distinguish respective ones of the units 70 from each other, the units 70 are sequentially referred to as a first-row unit 70, a second-row unit 70, . . . , and a fourteenth-row unit 70 from the upstream side in the transport direction. The first-row to the fourteenth-row units 70 respectively include the first-row to the fourteenth-row permanent magnets 31.

First, focusing on the first-row unit 70 to the sixth-row unit 70, between each pair of these units 70, which are adjacent to each other, corresponding two of the magnet fixing plates 80 (magnet fixing plate 80 of upstream one of the units 70 and magnet fixing plate 80 of downstream one of the units 70) are interposed. Note that, as described above, the thickness of each of the magnet fixing plates 80 is set to 2 mm or more and 5 mm or less. Thus, an interval between each of the pairs of the first-row to the sixth-row units 70, which are adjacent to each other (interval between each pair of the first-row to the sixth-row permanent magnets 31, which are adjacent to each other in the transport direction), is set to 4 mm or more and 10 mm or less.

Next, focusing on the sixth-row unit 70 to the fourteenth-row unit 70, between each pair of these units 70, which are adjacent to each other, not only the corresponding two of the magnet fixing plates 80, but also a drying unit 90 is interposed. This drying unit 90 is a member through which the blowing ports 61 of the drying portion 60 are provided. The drying unit 90 is made, for example, of the (soft) magnetic material.

A depth (transport direction: Y-axis direction) of the drying unit 90 is set to approximately 10 mm. Thus, an interval between each of the pairs of the sixth-row to the fourteenth-row units 70, which are adjacent to each other (interval between each pair of the sixth-row to the fourteenth-row permanent magnets 31, which are adjacent to each other in the transport direction), is set to 14 mm or more and 20 mm or less.

Note that, through each of the sixth-row to the fourteenth-row units 70, the suction port 62 of the drying portion 60 is provided along the width direction (X-axis direction).

(Magnetic Circuit)

Figure 10:
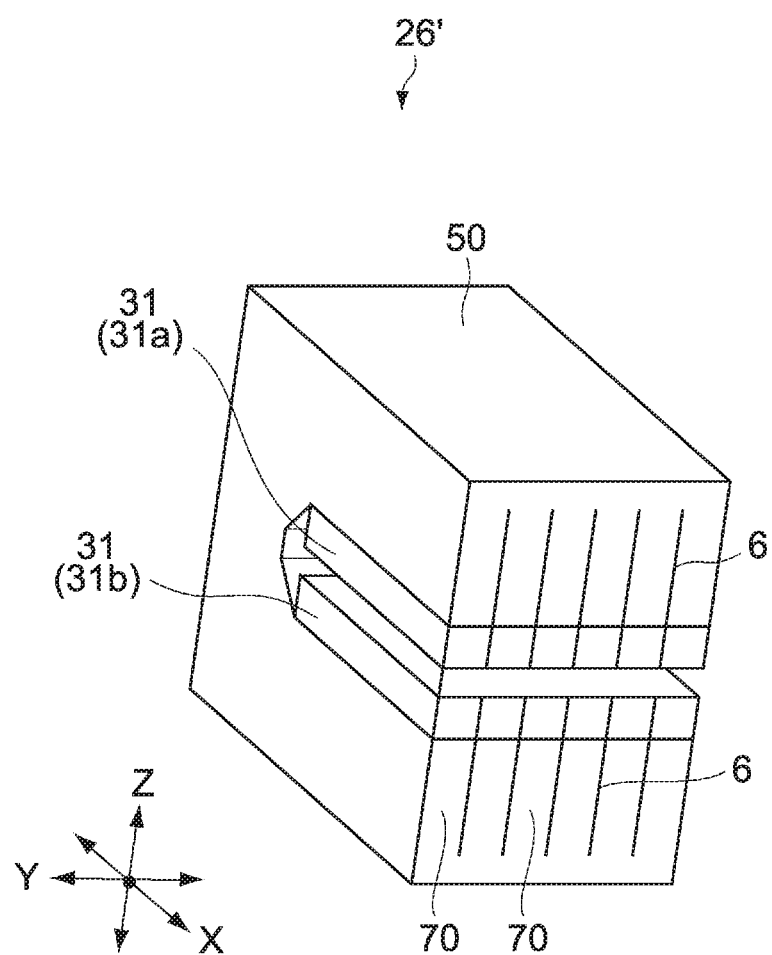
FIG. 10 A view illustrating a calculation model used for calculating magnetic flux in a magnetic circuit.

Next, the magnetic circuit to be formed of the yoke portion 50 and the permanent magnets 31 is described. FIG. 10 is a view illustrating a calculation model 26' used for calculating the magnetic flux in the magnetic circuit. In this calculation, Maxwell 3D produced by ANSOFT CORPORATION was used as software.

The magnetic circuit to be formed of the yoke portion 50 and the permanent magnets 31 is right-left symmetric with respect to the orientation device 26. Thus, a model corresponding to a left-hand half of the orientation device 26 was used as the calculation model 26'.

Use of NdFeB magnets (neodymium magnets) as the permanent magnets 31 was assumed, and a remanent saturation magnetic-flux density of the permanent magnets 31 was set to 1.23 T. Each (in one row) of the permanent magnets 31 included the plurality of permanent magnet elements 32, which measured 50 mm×50 mm×50 mm (width×height×depth), and which was arrayed linearly in the width direction. Further, the clearance Hw in the vertical direction between the poles facing each other of the first permanent magnet 31a and the second permanent magnet 31b (height Hw of the transport path 40: refer to FIG. 4) was set to 24 mm.

Still further, use of SS400 (JIS (Japanese Industrial Standard): rolled steel for general structures), which is made of iron, as the material of the yoke portion 50 was assumed, a remanent saturation magnetic-flux density of the yoke portion 50 was set to 1.7 T, and a magnetic permeability of the yoke portion 50 was set to 2,000.

Yet further, spacers 6 simulating the magnet fixing plates 80 and the drying units 90 were arranged between ones of the units 70, which are adjacent to each other in the transport direction.

Figure 11:
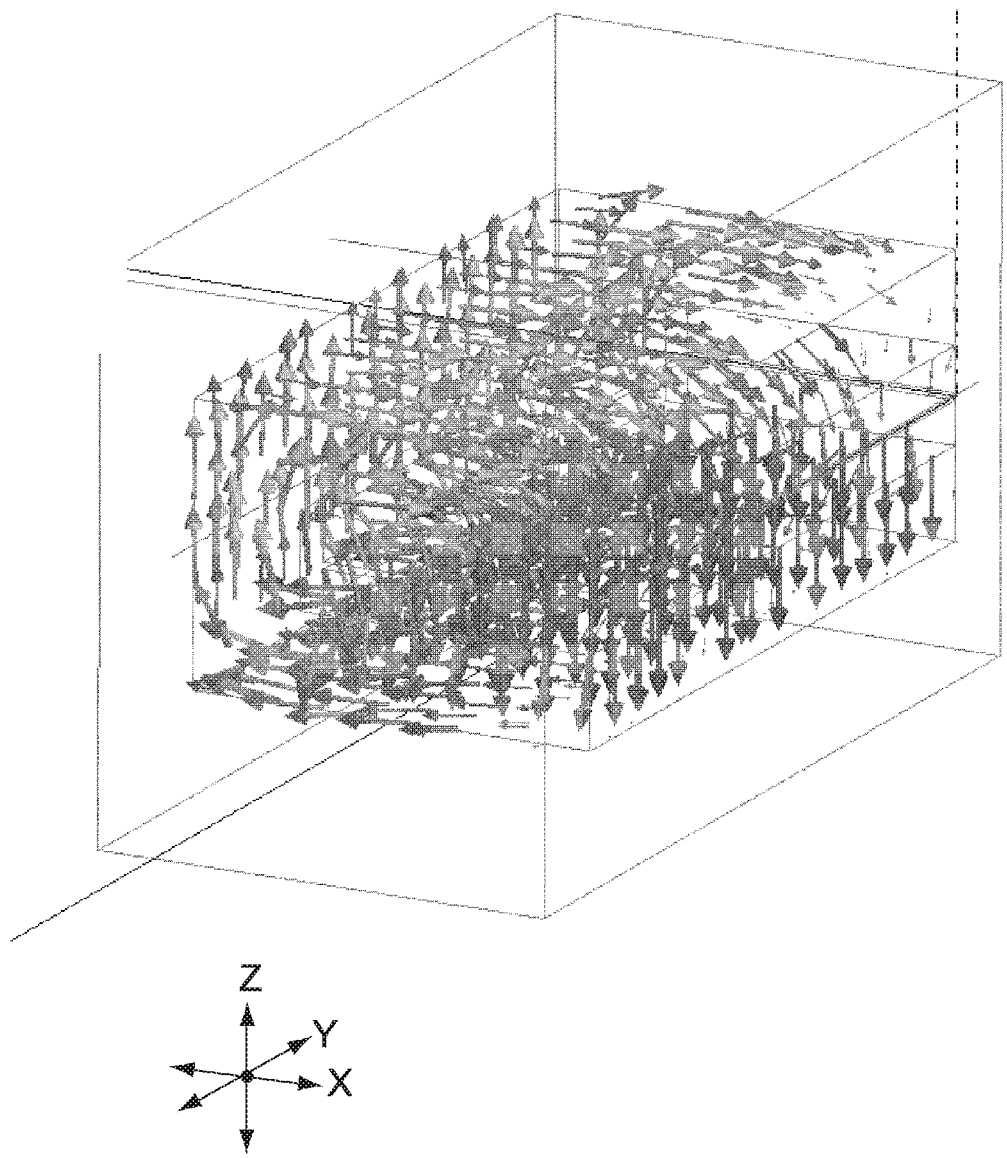
FIG. 11 An image depicting a magnetic circuit obtained from the calculation model illustrated in FIG. 10.

FIG. 11 is an image depicting a magnetic circuit obtained from the calculation model 26' illustrated in FIG. 10. In FIG. 11, directions of arrows represent a direction of the magnetic field, and lengths of the arrows represent strength of the magnetic field. As depicted in FIG. 11, the magnetic field generated by the permanent magnets 31 loops via the yoke portion 50 to form the magnetic circuit.

In this embodiment, the material (soft magnetic material) used as the material of the yoke portion 50 has a high magnetic permeability, and hence the magnetic flux penetrates the yoke portion 50. Thus, strength of the magnetic field in the transport path 40 can be increased in the vertical direction. With this, the particles of the magnetic powder in the magnetic coating film on the base 11 that passes through the transport path 40 can be adequately vertically oriented.

(Strength of Magnetic Field in Transport Path 40)

Next, the strength of the magnetic field in the transport path 40 (between the first permanent magnet and the second permanent magnet facing each other) is described. In order that the particles of the magnetic powder are adequately vertically oriented, the strength of the magnetic field (vertical component) in the transport path 40 needs to be set to a certain value or more. The inventors of the present technology carried out an experiment for calculating this value.

First, as the orientation device 26 used in this experiment, a device capable of varying the distance in the vertical direction between the first permanent magnet 31a and the second permanent magnet 31b was prepared. This device is capable of varying the strength of the magnetic field (vertical component) in the transport path 40 by varying the distance between the first permanent magnet 31a and the second permanent magnet 31b.

The NdFeB magnets (neodymium magnets) were used as the permanent magnets 31. In addition, polyethylene terephthalate with a thickness of 6 μm was used as the base 11, and a magnetic coating film containing barium ferrite particles was applied onto this base 11. The coercive force of the magnetic powder (coercive force of the magnetic coating film) was set to 3,000 Oe, and a transport rate of the base 11 was set to 1 m/s.

The measurement sample was cut out of the base 11 present in the transport path 40 under a state in which the transport of the base 11 has been stopped. Then, a magnetization curve in the vertical direction of this measurement sample was measured with the vibrating sample magnetometer. Note that, the demagnetizing field correction was performed on the measured magnetization curve.

Figures 12, 13:
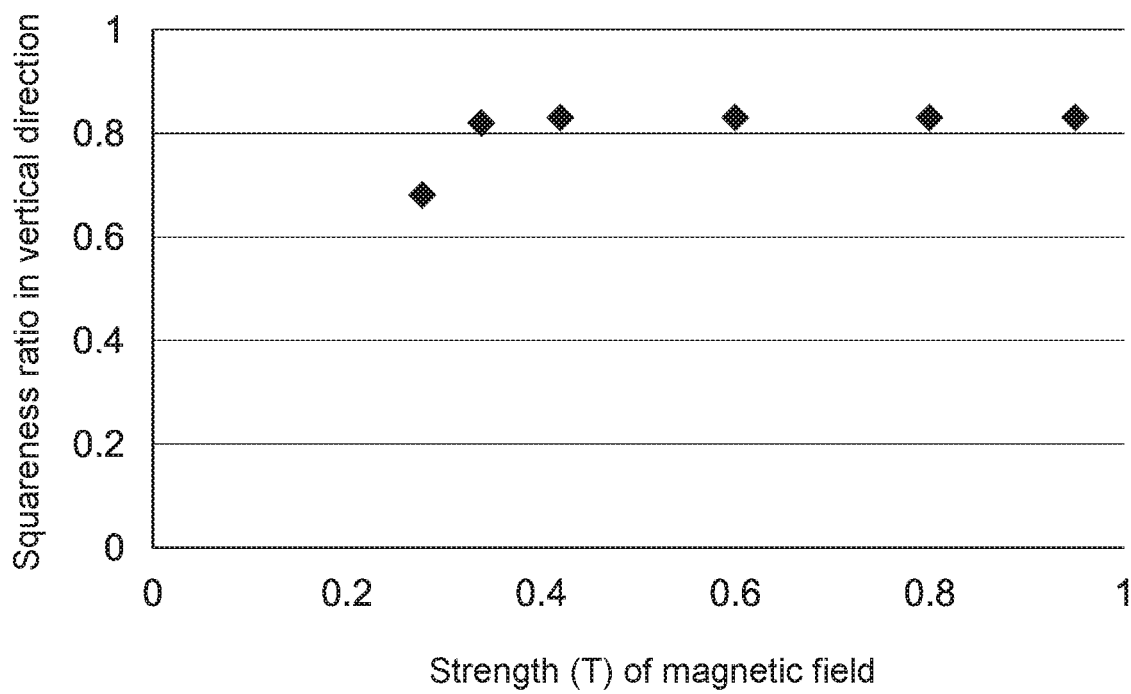
FIG. 12 A graph showing a relationship between strength of a magnetic field (vertical component) in a transport path and a squareness ratio in a vertical direction of a measurement sample.
FIG. 13 A table showing specific numerical values, etc., obtained through an experiment.

FIG. 12 is a graph showing a relationship between the strength of the magnetic field (vertical component) in the transport path 40 and a squareness ratio in the vertical direction of the measurement sample. FIG. 13 is a table showing specific numerical values, etc., obtained through the experiment.

As shown in FIG. 12 and FIG. 13, in Comparative Example 1, the strength of the magnetic field in the transport path 40 is as low as 2.8 T, and the squareness ratio in the vertical direction of the measurement sample is as low as 0.68. In other words, in Comparative Example 1, the strength of the magnetic field is low, and hence the particles of the magnetic powder in the magnetic coating film are not sufficiently vertically oriented.

In Comparative Example 1, a ratio of the strength of the magnetic field with respect to the coercive force of the magnetic powder (strength of magnetic field/coercive force of magnetic powder) is set to 0.9. In other words, when the strength of the magnetic field in the transport path 40 is 0.9 times as high as the coercive force of the magnetic powder, the particles of the magnetic powder in the magnetic coating film cannot be sufficiently vertically oriented.

Meanwhile, as in Example 1 to Example 5, as the strength of the magnetic field in the transport path 40 is increased from 0.31 T gradually to 0.42 T, 0.6 T, 0.8 T, and 0.95, the squareness ratio in the vertical direction of the measurement sample varies from 0.82 respectively to 0.83, 0.83, 0.83, and 0.83.

From this result, it is conceivable that, when the strength of the magnetic field has reached the certain value as a result of gradual increase of the strength of the magnetic field in the transport path 40, the squareness ratio in the vertical direction of the measurement sample is saturated (0.83).

In Example 1, a value of the squareness ratio in the vertical direction of the measurement sample is 0.82, which is sufficiently close to a value of the saturation (0.83). Thus, the particles of the magnetic powder in the magnetic coating film are sufficiently vertically oriented. In other words, when the strength of the magnetic field (vertical component) in the transport path 40 is 1.0 time or more as high as the coercive force of the magnetic powder (=strength of magnetic field/coercive force of magnetic powder), the particles of the magnetic powder in the magnetic coating film can be sufficiently vertically oriented.

Further, in Examples 2 to 5, the values of the squareness ratio in the vertical direction of the measurement sample are each 0.83, that is, the saturation has occurred. In other words, the particles of the magnetic powder in the magnetic coating film are sufficiently vertically oriented. Thus, when the strength of the magnetic field in the transport path 40 is 1.4 times or more, 2.0 times or more, 2.7 times or more, and 3.2 times or more as high as the coercive force of the magnetic powder, the particles of the magnetic powder in the magnetic coating film can be further sufficiently vertically oriented.

(Thickness of Yoke Portion 50, Etc.)

Figure 14:
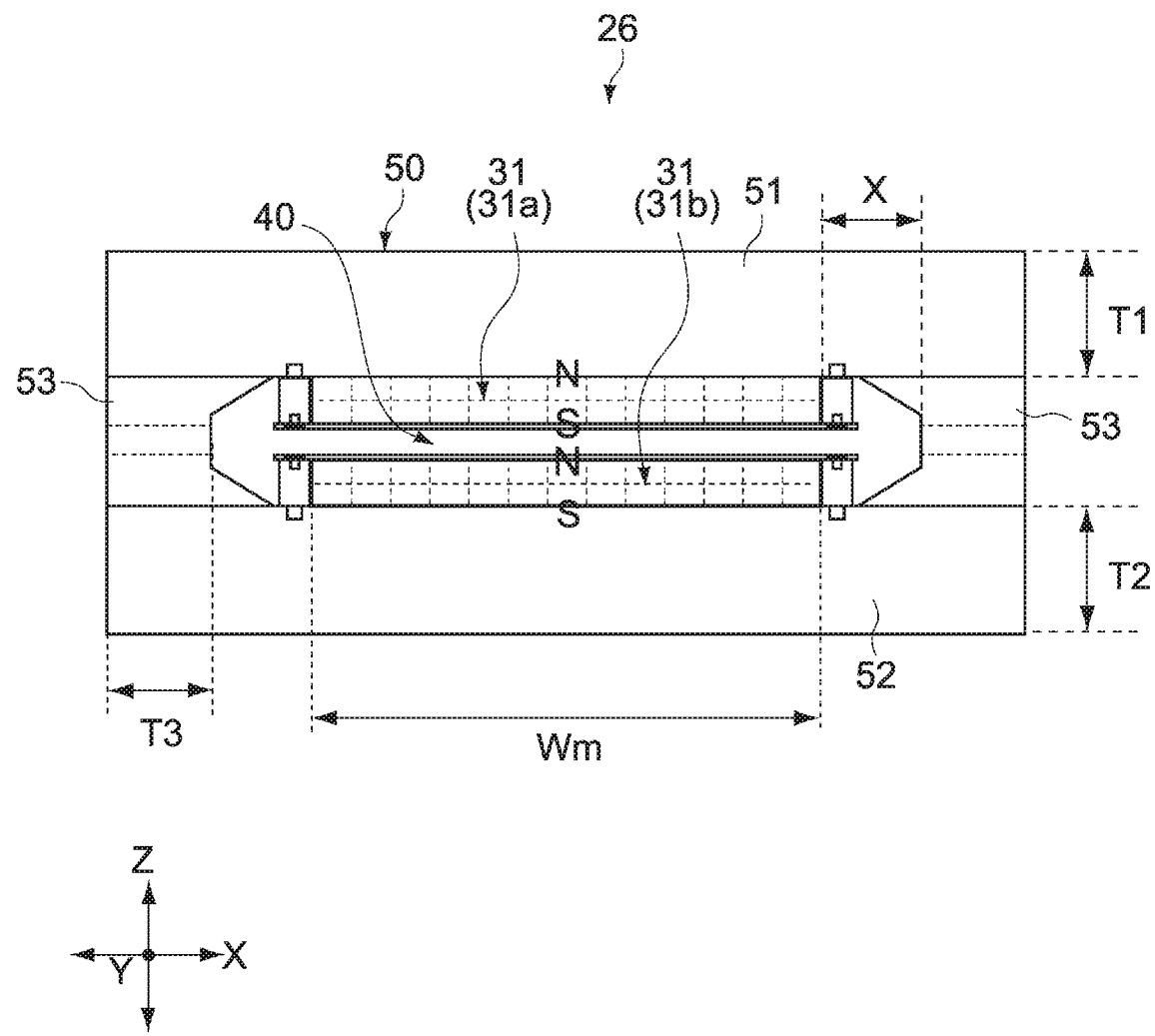
FIG. 14 An explanatory view for illustrating thicknesses in a yoke portion.

Next, thicknesses in the yoke portion 50 are described. FIG. 14 is an explanatory view for illustrating the thicknesses in the yoke portion 50.

As illustrated in FIG. 14, a thickness in the vertical direction (Z-axis direction) of the first yoke portion 51 (first yoke-unit portion 72) is denoted by T1, and a thickness in the vertical direction of the second yoke portion 52 (third yoke-unit portions 74) is denoted by T2. In addition, a thickness (of thinnest part) in the width direction (X-axis direction) of each of the third yoke portions 53 (third yoke-unit portions 74) is denoted by T3. Note that, although the thickness T1 of the first yoke portion 51 and the thickness T2 of the second yoke portion 52 are equal to each other in this embodiment, these thicknesses may be set unequal to each other.

In this context, as described above, the magnetic flux generated by the permanent magnets 31 penetrates the yoke portion 50. Thus, unless the thicknesses T1, T2, and T3 in the yoke portion 50 are adequately set, there is a risk that the magnetic field is saturated in the yoke, and that the magnetic field leaks to the outside of the yoke portion 50.

As a result, there is a risk that the strength of the magnetic field in the transport path 40 (between first permanent magnets 31a and second permanent magnets 31b) decreases. Further, there is a risk that the magnetic field to leak to the outside of the orientation device 26 has an adverse effect on peripheral devices (such as adverse effect on lubrication performance of bearings). Still further, the magnetic field to leak to the outside of the orientation device 26 has an influence on safety (such as attraction of work tools to the orientation device 26, and the like).

As a countermeasure, the thicknesses T1, T2, and T3 in the yoke portion 50 need to be increased as long as the magnetic field is not saturated in the yoke.

Specifically, a smallest thickness of the thickness T1 of the first yoke portion 51, the thickness T2 of the second yoke portion 52, and the thickness T3 of each of the three yoke portions 50 is denoted by T. Further, the remanent magnetic-flux density of the permanent magnets 31 is denoted by Bmag, and the saturation magnetic-flux density of the yoke portion 50 is denoted by Byoke. Still further, the permanent magnets 31 each have the width Wm (width direction: X-axis direction), and the units 70 each have a depth Du (transport direction: Y-axis direction) (refer to FIG. 8).

Note that, although the thickness T3 of each of the third yoke portions 53 is smallest of the thicknesses T1, T2, and T3 in this embodiment, the thickness T1 of the first yoke portion 51 or the thickness T2 of the second yoke portion 52 may be set smallest.

Magnetic flux Φmag to be generated by the permanent magnets 31 is expressed by the following equation (1).

$$\Phi mag = Bmag \times Du \times Wm \quad (1)$$

Meanwhile, maximum passing-magnetic flux Φyoke in the yoke portion 50 is expressed by the following equation (2).

$$\Phi yoke = Byoke \times Du \times T \quad (2)$$

The yoke portion 50 is right-left symmetric, and hence the magnetic circuit is formed in right-left symmetry (refer to FIG. 11). Therefore, a condition that the magnetic flux Φmag to be generated by the permanent magnets 31 does not leak to the outside is expressed by the following inequality (3).

$$\Phi mag < 2\Phi yoke \quad (3)-$$

By substituting the equations (1) and (2) into the inequality (3), $$B_{mag} \times D_u \times W_m < 2 \times B_{yoke} \times D_u \times T$$

$$B_{mag} \times W_m < B_{yoke} \times 2T \quad (4)$$

are established.

Thus, the thickness T is set such that the relationship Bmag×Wm<Byoke×2T is satisfied. By satisfying such a relationship, the strength of the magnetic field in the transport path 40 can be prevented from decreasing, and in addition, the magnetic field can be prevented from leaking to the outside of the orientation device 26.

FIG. 15 is a table showing Examples and Comparative Examples in which the thickness T of the yoke portion 50 is varied.

In Example 6, the NdFeB magnets (neodymium magnets) were used as the permanent magnets 31, and the width Wm of each of the permanent magnets 31 was set to 150 mm. Further, SS400 having the saturation magnetic-flux density Byoke of 1.7 was used as the material of the yoke portion 50. Still further, the smallest thickness T of the thicknesses T1, T2, and T3 in the yoke portion 50 was set to 55 mm. Yet further, a minimum strength of the magnetic field (vertical direction) in the transport path 40 (between first permanent magnet 31a and second permanent magnet 31b) was 0.8 T, and the coercive force of the magnetic powder was set to 3,000 Oe.

In Example 6, the strength of the magnetic field in the transport path 40 (between first permanent magnet 31a and second permanent magnet 31b) is set 1.0 time or more as high as the coercive force of the magnetic powder. In addition, the relationship Bmag×Wm<Byoke×2T is satisfied, and hence strength of a leakage magnetic field from the yoke portion 50 was as low as 9 Oe.

In Comparative Example 2, the smallest thickness T of the thicknesses T1, T2, and T3 in the yoke portion 50 was set to 40 mm, which is smaller than that in Example 6. Other conditions are the same as those of Example 6. In Comparative Example 2, since the thickness T is set smaller than that in Example 6, the relationship Bmag×Wm<Byoke×2T is not satisfied.

Thus, in Comparative Example 2, the minimum strength of the magnetic field in the transport path 40 is 0.72 T, which is less than the value in Example 6 (0.8 T). In Comparative Example 2, although the strength of the magnetic field between the first permanent magnet 31a and the second permanent magnet 31b is set 1.0 time or more as high as the coercive force of the magnetic powder, the strength of the leakage magnetic field from the yoke portion 50 was as high as 1,050 Oe.

In Comparative Example 3, the smallest thickness T of the thicknesses T1, T2, and T3 in the yoke portion 50 was set to 20 mm, which is much smaller than that in Comparative Example 2. Other conditions are the same as those of Example 6. Also in Comparative Example 3, the relationship Bmag×Wm<Byoke×2T is not satisfied.

Thus, in Comparative Example 3, the minimum strength of the magnetic field in the transport path 40 is 0.7 T, which is less even than the value in Comparative Example 2 (0.72 T). In Comparative Example 2, although the strength of the magnetic field in the transport path 40 is set 1.0 time or more as high as the coercive force of the magnetic powder, the strength of the leakage magnetic field from the yoke portion 50 was as much higher as 2,080 Oe.

In Example 7, permalloy having a saturation magnetic-flux density Byoke of 1.0 was used as the material of the yoke portion 50. Further, the smallest thickness T of the thicknesses T1, T2, and T3 in the yoke portion 50 was set to 90 mm. Still further, the minimum strength of the magnetic field (vertical direction) in the transport path 40 was 0.8 T. Other conditions are the same as those of Example 6.

In Example 7, the strength of the magnetic field in the transport path 40 is set 1.0 time or more as high as the coercive force of the magnetic powder. In addition, the relationship Bmag×Wm<Byoke×2T is satisfied, and hence the strength of the leakage magnetic field from the yoke portion 50 was as low as 10 Oe.

Note that, when permalloy is used as the material of the yoke portion 50 as in Example 7, the thickness T needs to be set larger than those at the times when SS400 is used as the material of the yoke portion 50 as in Example 6. This is because the saturation magnetic-flux density Byoke (1.0) of permalloy is lower than the saturation magnetic-flux density Byoke (1.7) of SS400.

In Comparative Examples 4 and 5, the smallest thicknesses T of the thicknesses T1, T2, and T3 in the yoke portion 50 were set respectively to 75 and 40 mm, each of which was smaller than that in Example 7. Other conditions are the same as those of Example 7. In Comparative Examples 4 and 5, since the thicknesses T are each set smaller than that in Example 7, the relationship Bmag×Wm<Byoke×2T is not satisfied.

Thus, in Comparative Examples 4 and 5, the minimum strengths of the magnetic field in the transport path 40 are respectively 0.6 T and 0.5 T, each of which is less than the value in Example 7 (0.8 T). In Comparative Examples 4 and 5, although the strengths of the magnetic field in the transport path 40 are each set 1.0 time or more as high as the coercive force of the magnetic powder, the strengths of the leakage magnetic field from the yoke portion 50 were as high as 1,150 Oe and 2,130 Oe, respectively.

In Example 8, the width Wm of each of the permanent magnets 31 was set to 650 mm, and the smallest thickness T of the thicknesses T1, T2, and T3 in the yoke portion 50 was set to 240 mm. In addition, the minimum strength of the magnetic field (vertical direction) in the transport path 40 was 0.8 T. Other conditions are the same as those of Example 6.

In Example 8, the strength of the magnetic field in the transport path 40 is set 1.0 time or more as high as the coercive force of the magnetic powder. In addition, the relationship Bmag×Wm<Byoke×2T is satisfied, and hence the strength of the leakage magnetic field from the yoke portion 50 was as low as 6 Oe.

In Comparative Examples 6 and 7, the smallest thicknesses T of the thicknesses T1, T2, and T3 in the yoke portion 50 were set respectively to 200 mm and 150 mm, each of which was smaller than that in Example 8. Other conditions are the same as those of Example 8. In Comparative Examples 6 and 7, since the thicknesses T are each set smaller than that in Example 8, the relationship Bmag×Wm<Byoke×2T is not satisfied.

Thus, in Comparative Examples 6 and 7, the minimum strengths of the magnetic field in the transport path 40 are respectively 0.7 T and 0.6 T, each of which is less than the value in Example 8 (0.8 T). In Comparative Examples 6 and 7, although the strengths of the magnetic field in the transport path 40 are each set 1.0 time or more as high as the coercive force of the magnetic powder, the strengths of the leakage magnetic field from the yoke portion 50 were as high as 1,180 Oe and 2,150 Oe, respectively.

In Example 9, the width Wm of each of the permanent magnets 31 was set to 650 mm, and the permalloy having the saturation magnetic-flux density Byoke of 1.0 was used as the material of the yoke portion 50. Further, the smallest thickness T of the thicknesses T1, T2, and T3 in the yoke portion 50 was set to 400 mm. Still further, the minimum strength of the magnetic field (vertical direction) in the transport path 40 was 0.8 T. Other conditions are the same as those of Example 6.

In Example 9, the minimum strength of the magnetic field in the transport path 40 is set 1.0 time or more as high as the coercive force of the magnetic powder. In addition, the relationship Bmag×Wm<Byoke×2T is satisfied, and hence the strength of the leakage magnetic field from the yoke portion 50 was as low as 5 Oe.

In Comparative Examples 8 and 9, the smallest thicknesses T of the thicknesses T1, T2, and T3 in the yoke portion 50 were set respectively to 350 mm and 255 mm, each of which was smaller than that in Example 8. Other conditions are the same as those of Example 9. In Comparative Examples 8 and 9, since the thicknesses T are each set smaller than that in Example 9, the relationship Bmag×Wm<Byoke×2T is not satisfied.

Thus, in Comparative Examples 8 and 9, the minimum strengths of the magnetic field in the transport path 40 are respectively 0.6 T and 0.5 T, each of which is less than the value in Example 9 (0.8 T). In Comparative Examples 8 and 9, although the minimum strengths of the magnetic field in the transport path 40 are each set 1.0 time or more as high as the coercive force of the magnetic powder, the strengths of the leakage magnetic field from the yoke portion 50 were as high as 1,100 Oe and 2,230 Oe, respectively.

Figure 16:
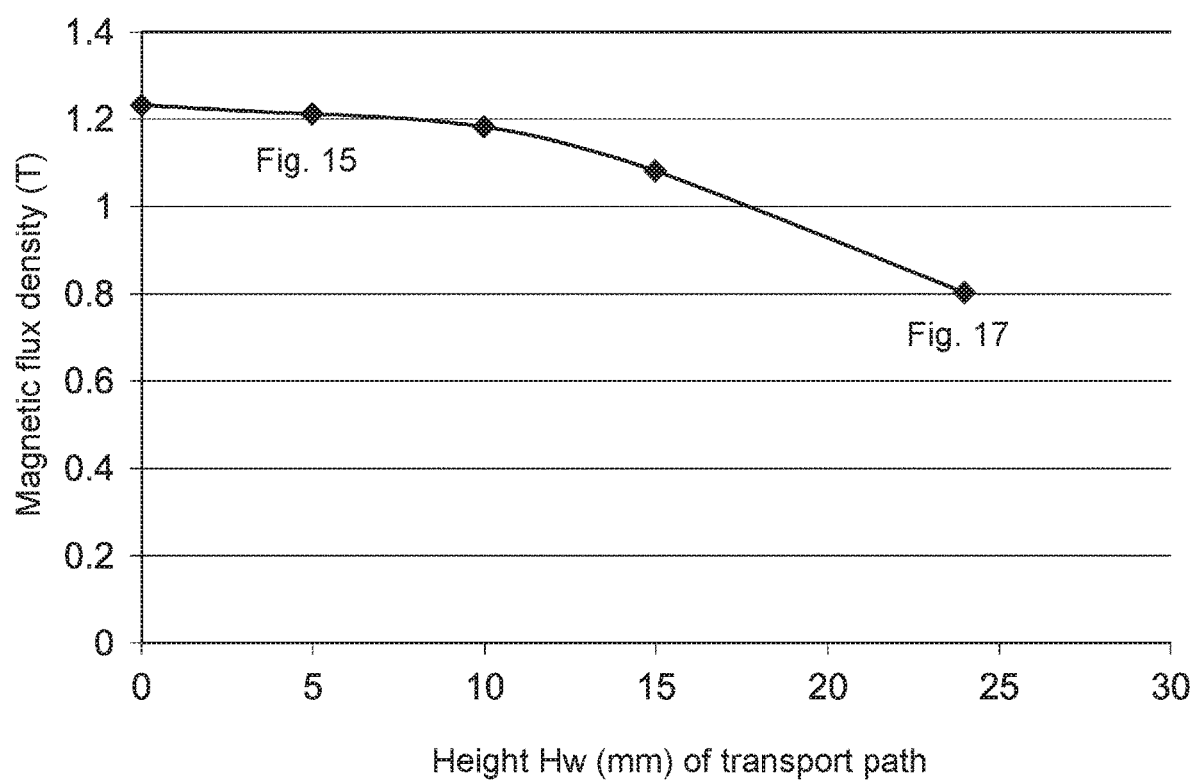
FIG. 16 A graph showing a relationship between a height Hw of the transport path and a magnetic flux density in the transport path at a time when the thickness of the yoke portion is extremely increased (300 mm).

FIG. 16 is a graph showing a relationship between the height Hw of the transport path 40 and a magnetic flux density in the transport path 40 at a time when the thickness of the yoke portion 50 is extremely increased (300 mm).

As shown in FIG. 16, when the height Hw of the transport path 40 is increased (refer to FIG. 4), a magnetic flux density at a center position (vertical direction) of the transport path gradually decreases.

As shown in FIG. 16, when the height Hw of the transport path 40 is 24 mm, the magnetic flux density at the center position (vertical direction) of the transport path is 0.8 T.

FIG. 17 is a table showing Examples and Comparative Examples in each of which the height Hw of the transport path 40 is 24 mm. Note that, the height Hw of the transport path 40 in FIG. 15 described above is set to 5 mm.

In this context, the interval Hw of the transport path 40 in FIG. 17 is set to 24 mm such that, for example, the base 11 is transported through an enough space. As a result, the magnetic flux density at the center position (vertical direction) of the transport path at the time when the thickness T of the yoke portion 50 was sufficiently increased was 0.8 T (8,000 Oe).

When the height Hw of the transport path 40 is varied, a value of Bmag (remanent magnetic-flux density Bmag of the permanent magnets 31) in the inequality Bmag×Wm<Byoke×2T varies by influence of demagnetizing field. In other words, there can be a case where the magnetic flux density in the yoke portion 50 has not reached the saturation magnetic-flux density Byoke even when the remanent magnetic-flux density Bmag of the permanent magnets 31 is 1.23 T. This is because, when the height Hw of the transport path 40 is increased, the magnetic flux that should advance in the vertical direction in the transport path 40 advances toward the third-yoke-portion-53 sides, and enters the third yoke portions 53.

In Example 10, the NdFeB magnets (neodymium magnets) were used as the permanent magnets 31, and the width Wm of each of the permanent magnets 31 was set to 150 mm. Further, the SS400 having the saturation magnetic-flux density Byoke of 1.7 was used as the material of the yoke portion 50. Still further, the smallest thickness T of the thicknesses T1, T2, and T3 in the yoke portion 50 was set to 40 mm. Yet further, the minimum strength of the magnetic field (vertical direction) in the transport path 40 was 0.8 T, and the coercive force of the magnetic powder was set to 3,000 Oe.

In Example 10, the minimum strength of the magnetic field in the transport path 40 is set 1.0 time or more as high as the coercive force of the magnetic powder. In addition, the relationship Bmag×Wm<Byoke×2T is satisfied, and hence the strength of the leakage magnetic field from the yoke portion 50 was as low as 10 Oe.

In Comparative Examples 10 and 11, the smallest thicknesses T of the thicknesses T1, T2, and T3 in the yoke portion 50 were set respectively to 30 mm and 20 mm, each of which was smaller than that in Example 10. Other conditions are the same as those of Example 10. In Comparative Examples 10 and 11, since the thicknesses T are each set smaller than that in Example 10, the relationship Bmag×Wm<Byoke×2T is not satisfied.

Thus, in Comparative Examples 10 and 11, the minimum strengths of the magnetic field in the transport path 40 are respectively 0.72 T and 0.6 T, each of which is less than the value in Example 10 (0.8 T). In Comparative Examples 10 and 11, although the minimum strengths of the magnetic field in the transport path 40 are each set 1.0 time or more as high as the coercive force of the magnetic powder, the strengths of the leakage magnetic field from the yoke portion 50 were as high as 1,120 and 2,180 Oe, respectively.

In Example 11, the width Wm of each of the permanent magnets 31 was set to 650 mm, and the smallest thickness T of the thicknesses T1, T2, and T3 in the yoke portion 50 was set to 160 mm. In addition, the minimum strength of the magnetic field (vertical direction) in the transport path 40 was 0.8 T. Other conditions are the same as those of Example 10.

In Example 11, the minimum strength of the magnetic field in the transport path 40 is set 1.0 time or more as high as the coercive force of the magnetic powder. In addition, the relationship Bmag×Wm<Byoke×2T is satisfied, and hence the strength of the leakage magnetic field from the yoke portion 50 was as low as 10 Oe.

In Comparative Examples 12 and 13, the smallest thicknesses T of the thicknesses T1, T2, and T3 in the yoke portion 50 were set respectively to 120 mm and 100 mm, each of which was smaller than that in Example 11. Other conditions are the same as those of Example 11. In Comparative Examples 12 and 13, since the thicknesses T are each set smaller than that in Example 11, the relationship Bmag×Wm<Byoke×2T is not satisfied.

Thus, in Comparative Examples 12 and 13, the minimum strengths of the magnetic field in the transport path 40 are respectively 0.6 T and 0.5 T, each of which is less than the value in Example 11 (0.8 T). In Comparative Examples 12 and 13, although the minimum strengths of the magnetic field in the transport path 40 are each set 1.0 time or more as high as the coercive force of the magnetic powder, the strengths of the leakage magnetic field from the yoke portion 50 were as high as 1,080 Oe and 2,020 Oe, respectively.

In this context, the height Hw of the transport path 40 in FIG. 17 is set large such that the base 11 is transported through an enough space, or maintenance, cleaning, and the like are performed. Meanwhile, even in such a case where the height Hw of the transport path 40 is increased, as described in Example 10 and Example 11, the minimum strength of the magnetic field in the transport path 40 can be set 1.0 time or more as high as the coercive force of the magnetic powder, and the thickness T of the yoke portion 50 can be reduced to some extent.

(How to Prevent Magnetic Flux from Advancing Directly toward Third Yoke Portions 53)

Now, referring back to FIG. 14, a distance in the width direction (X-axis direction) between the permanent magnets 31 and the third yoke portions 53 is denoted by X. Note that, this distance X is a distance in the width direction near the poles on the transport path side of the permanent magnets 31 in the vertical direction (Z-axis direction).

When this distance X is excessively small, the magnetic flux that should advance in the vertical direction in the transport path 40 may advance toward the third-yoke-portion-53 sides, and enter the third yoke portions 53. Thus, this distance X needs to be set as a certain distance or shorter.

FIG. 18 is a table showing Examples and Comparative Examples in which the distance X is varied.

In all Examples and Comparative Examples in FIG. 18, the NdFeB magnets (neodymium magnets) were used as the permanent magnets 31, and the coercive force of the magnetic powder was set to 3,000 Oe.

In Comparative Example 14 and Examples 12 to 14, the heights Hm of the permanent magnets 31 are set uniformly to 25 mm. Meanwhile, in Comparative Example 14 and Examples 12 to 13, the distances X and values of "distance X/height Hm" (ratios of the distances X with respect to the heights Hm of the permanent magnets 31) are unequal to each other.

Specifically, in Comparative Example 14 and Examples 12 to 14, the distances X were set respectively to 4 mm, 5 mm, 10 mm, and 25 mm. Further, in Comparative Example 14 and Examples 12 to 14, the values of "distance X/height Hm" were set respectively to 0.16, 0.2, 0.4, and 1.0.

In Comparative Example 14, since the distance X and the value of "distance X/height Hm" are small, the minimum strength of the magnetic field in the transport path 40 is as low as 0.28 T (magnetic flux directly enters the third yoke portions 53). Meanwhile, in Examples 12 to 14, since the distances X and the values of "distance X/height Hm" are large, sufficient values of the minimum strengths of the magnetic field in the transport path of 0.31, 0.75, and 0.75 are obtained, respectively.

In Comparative Example 15 and 16 and Examples 15 to 17, the heights Hm of the permanent magnets 31 are each set to 50 mm, which is larger than those in Comparative Example 14 and Examples 12 to 14. In Comparative Example 15 and 16 and Examples 15 to 17, although the heights Hm of the permanent magnets 31 are set equal to each other (50 mm), both the distances X and the values of "distance X/height Hm" are unequal to each other.

Specifically, in Comparative Examples 15 and 16 and Examples 15 to 17, the distances X were set respectively to 4 mm, 8 mm, 10 mm, 25 mm, and 50 mm. In addition, in Comparative Examples 15 and 16 and Examples 15 to 17, the values of "distance X/height Hm" were set respectively to 0.1, 0.16, 0.2, 0.5, and 1.0.

In Comparative Examples 15 and 16, since the distances X and the values of "distance X/height Hm" are small, the minimum strengths of the magnetic field in the transport path 40 are as low as 0.27 T and 0.28 T, respectively (magnetic flux directly enters the third yoke portions 53). Meanwhile, in Examples 15 to 17, since the distances X and the values of "distance X/height Hm" are large, sufficient values of the minimum strengths of the magnetic field in the transport path 40 of 0.31, 0.75, and 0.75 are obtained, respectively.

Note that, as understood from the above description, it is only necessary that the value of "distance X/height Hm" be 0.2 or more. In this case, the magnetic flux that should advance in the vertical direction in the transport path 40 can be adequately prevented from advancing to the third-yoke-portion-53 sides, and from entering the third yoke portions 53. With this, the strength of the magnetic field in the transport path can be prevented from decreasing.

(Positions of Suction Ports 62)

As described above, in this embodiment, all of the suction ports 62 are provided along the width direction, and, in the transport direction, these suction ports 62 are each provided at an intermediate position between corresponding two of the blowing ports 61. First, flow of the hot-air currents (airflow) at the time when the suction ports 62 are provided at such positions is described.

FIG. 19 is a view illustrating a state in which the hot-air currents are blown through the blowing ports 61. As illustrated in FIG. 19, the hot-air current blown out through each of the blowing ports 61 provided through the first yoke portion 51 and the second yoke portion 52 is blown vertically to and dry the base 11, and then branches into two branches. One of the two branches of the hot-air current flows toward the upstream side in the transport direction (Y-axis direction) while further drying the base 11 thereAlong. Meanwhile, another one of the two branches of the hot-air current flows toward the downstream side in the transport direction while further drying the base 11 therealong.

The blowing ports 61 are arranged at the predetermined interval in the transport direction. Thus, of ones of the blowing ports 61, which are adjacent to each other in the transport direction, a hot-air current that is blown out through upstream one of the adjacent ones of the blowing ports 61 and branches to the downstream side in the transport direction, and a hot-air current that is blown out through downstream one of the adjacent ones of the blowing ports 61 and branches to the upstream side in the transport direction impinge on each other at the intermediate position between the upstream one of the adjacent ones of the blowing ports 61 and the downstream one of the adjacent ones of the blowing ports 61 (a center position (transport direction) of corresponding one of the permanent magnets 31).

The suction ports 62 are each provided at the position in the transport direction between corresponding two of the blowing ports 61, that is, at the position where the hot-air currents impinge on each other. Thus, the hot-air currents that impinge on each other at the intermediate position between the corresponding two of the blowing ports 61 are efficiently sucked into the suction port 62, flow in the width direction, and then are discharged to the outside of the orientation device 26.

By efficiently discharging the hot-air currents through the suction ports 62 in such a way, concentration of the solvent evaporated by the drying (solvent in the magnetic coating film) in the transport path 40 can be reduced. With this, evaporation properties of the solvent can be increased, and the drying can be further efficiently performed. As a result, even when an amount of the solvent contained in the magnetic coating film is large, or even when the film thickness of the magnetic coating film is large, the magnetic coating film can be easily dried. In addition, the drying can be performed at low temperature at which shrinkage of the magnetic coating film is small.

Figure 20:
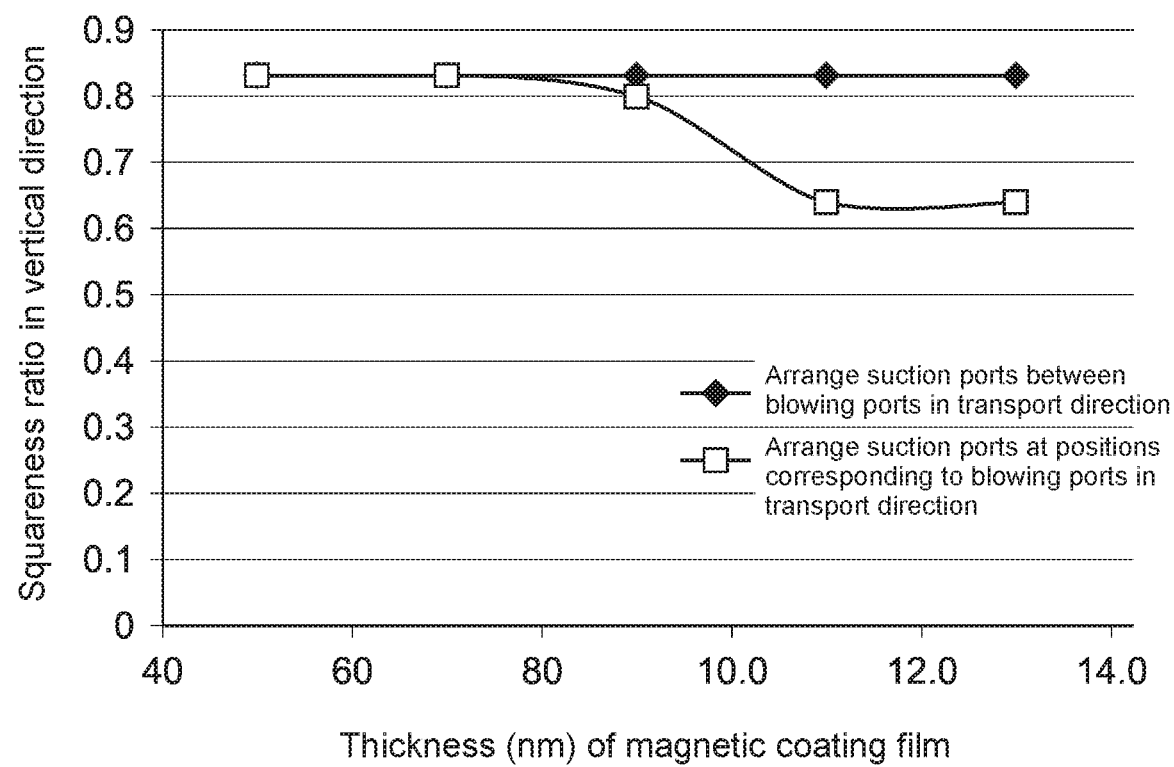
FIG. 20 A graph showing a comparison between a case where a position of each suction port is set as an intermediate position in the transport direction between corresponding two of the blowing ports, and a case where the positions of the suction ports are set as positions corresponding respectively to the blowing ports in the transport direction.

FIG. 20 is a graph showing a comparison between the case where the position of each of the suction ports 62 is set as the intermediate position in the transport direction between corresponding two of the blowing ports 61, and a case where the positions of the suction ports 62 are set as positions corresponding respectively to the blowing ports 61 in the transport direction. In FIG. 20, the abscissa axis represents the thickness of the magnetic coating film, and the ordinate axis represents a squareness ratio (of the magnetic layer 13) in the vertical direction after the magnetic coating film has been dried.

As shown in FIG. 20, in the case where the suction ports 62 are arranged at the positions corresponding respectively to the blowing ports 61 in the transport direction (refer to marks □), when the thickness of the magnetic coating film is increased, the squareness ratio in the vertical direction of the magnetic layer 13 gradually decreases. This is because the hot-air currents cannot be efficiently sucked (or branches of the hot-air currents do not further perform the drying by moving along the base 11) due to inadequacy of the positions of the suction ports 62, and hence the drying is insufficient when the magnetic coating film is thick.

Meanwhile, in the case where the suction ports 62 are each arranged at the intermediate position in the transport direction between corresponding two of the blowing ports 61 (refer to marks ♦), even when the thickness of the magnetic coating film is increased, a value of the squareness ratio in the vertical direction of the magnetic layer 13 does not vary. This is because the hot-air currents can be efficiently sucked (or suction is performed after the branches of the hot-air currents have further performed the drying by moving along the base 11) due to adequacy of the positions of the suction ports 62, and hence the drying can be sufficiently performed even when the magnetic coating film is thick.

The results in FIG. 20 also demonstrate that the drying can be efficiently performed by setting the position of each of the suction ports 62 as the intermediate position in the transport direction between corresponding two of the blowing ports 61.

(Symmetry of Pair of Permanent Magnets 31 Facing Each Other with Respect to X-Y plane)

Incidentally, as described above, in this embodiment, the first permanent magnets 31a and the second permanent magnets 31b facing each other are formed in plane symmetry with respect to the X-Y plane (horizontal plane).

Meanwhile, since the blowing ports 61 are arranged between the pairs of the sixth-row permanent magnet 31 to the fourteenth-row permanent magnet 31, the predetermined interval is secured in the transport direction between the pairs of the sixth-row permanent magnet 31 to the fourteenth-row permanent magnet 31. Thus, there is a risk that, at parts corresponding to the interval in the transport path 40, the strength of the magnetic field to be generated by the permanent magnets 31 decreases.

As a countermeasure, it is conceivable that, if the first permanent magnets 31a and the second permanent magnets 31b are shifted from each other in the transport direction, the strength of the magnetic field to be generated by the permanent magnets 31 can be prevented from decreasing at these parts.

Figure 21:
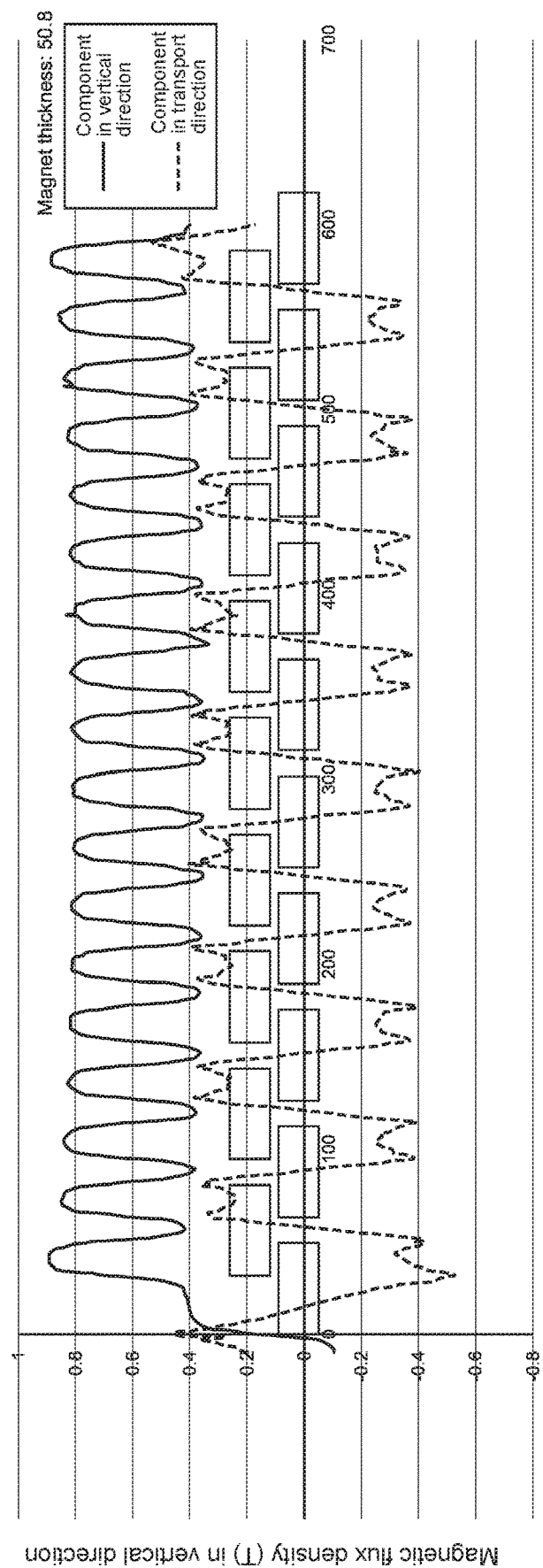
FIG. 21 A graph showing a magnetic flux density in the vertical direction in the transport path at a time when first permanent magnets and second permanent magnets are shifted from each other in the transport direction.

FIG. 21 is a graph showing the magnetic flux density in the vertical direction in the transport path 40 at the time when the first permanent magnets 31a and the second permanent magnets 31b are shifted from each other in the transport direction.

As shown in FIG. 21, when the first permanent magnets 31a and the second permanent magnets 31b are shifted from each other in the transport direction (formed in asymmetry with respect to the X-Y plane), the magnetic field generated in the transport path 40 contains not only the component in the vertical direction, but also a component in the transport direction.

Note that, the component in the vertical direction and the component in the transport direction of the magnetic field were calculated under the same conditions as the conditions of Comparative Example 10 described above (refer to FIG. 17) except that the first permanent magnets 31a and the second permanent magnets 31b are shifted from each other in the transport direction. As a result, the component in the transport direction of the magnetic field was ½ of the component in the vertical direction of the magnetic field.

Thus, the obtained result demonstrated that such an orientation device 26 was an inadequate vertical-orientation device because verticality of the magnetic field was imperfect. As a result, it is found that, in the adequate vertical-orientation device 26, the first permanent magnets 31a and the second permanent magnets 31b facing each other are formed in plane symmetry with respect to the X-Y plane (horizontal plane) such that the magnetic field to be generated contains only the component in the vertical direction.

Meanwhile, when the first permanent magnets 31a and the second permanent magnets 31b facing each other are formed in plane symmetry with respect to the X-Y plane (horizontal plane), problems such as the attenuation of the magnetic field at the parts corresponding to the blowing ports 61 in the transport path 40 remains unsolved. However, if the strength of the magnetic field (vertical component) is 1.0 time or more as high as the coercive force of the magnetic powder at these parts in the transport path 40, this problem can be solved (refer to FIG. 12 and FIG. 13).

(Thickness of Magnet Fixing Plate 80)

In this context, a case where the above-described units 70 are laminated on and in close contact with each other in the transport direction without intermediation of the magnet fixing plates 80 is assumed. In this case, the permanent magnets 31 repel each other, and a repulsive force is generated between the permanent magnets 31 and the yoke unit portions 71 located at a center in the transport direction. Thus, even when the permanent magnets 31 and the yoke unit portions 71 are held in close contact with each other, the permanent magnets 31 separate from the yoke unit portions 71.

Next, a case where dummy magnet-fixing plates (not shown) are interposed between the units 70 is assumed. These dummy magnet-fixing plates are each the same as the above-described magnet fixing plate 80 except that none of the first fixing member 81 and the second fixing member 82 includes the part that covers the permanent magnet 31. None of the dummy magnet-fixing plates fixes the permanent magnets 31 to the yoke unit portion 71.

Figures 22, 23:
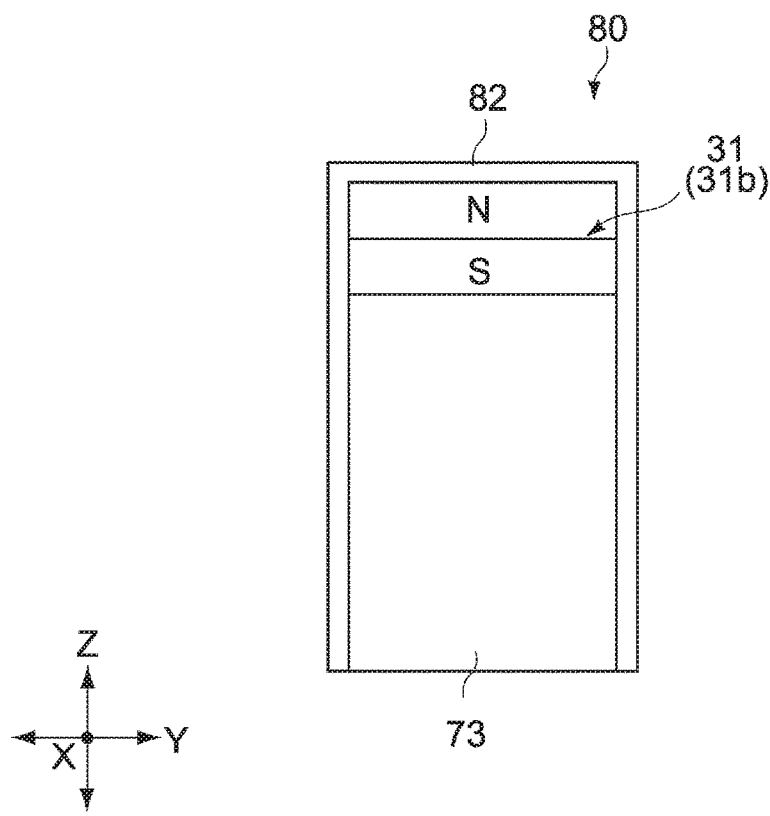
FIG. 22 A table showing Examples and Comparative Examples in which a thickness of a dummy magnet-fixing plate is varied.
FIG. 23 An enlarged view of a magnet fixing plate as viewed in a width direction.

FIG. 22 is a table showing Examples and Comparative Examples in which a thickness of the dummy magnet-fixing plate is varied.

In FIG. 22, by varying the thickness of the dummy magnet-fixing plate, the interval in the transport direction between the units 70 is varied. In all Examples and Comparative Examples in FIG. 22, the NdFeB magnets (neodymium magnets) were used as the permanent magnets 31, and the thickness T (of thinnest part) of the yoke portion 50 was set to 150 mm.

Further, in FIG. 22, a case where the strength of the magnetic field (vertical direction) in the transport path 40 was less than 7,000 Oe was indicated by "x," a case where the strength of the magnetic field was 7,000 Oe or more was indicated by "○," and a case where the strength of the magnetic field was 9,000 Oe or more was indicated by "⊚."

Still further, with regard to an attractive force of the yoke portion 50, a case where the permanent magnets 31 separated from the yoke unit portions 71 was indicated by "x," and a case where the permanent magnets 31 still remained fitted without separating from the yoke unit portions 71 was indicated by "○." Yet further, a case where the permanent magnets 31 were firmly fitted to the yoke unit portions 71 was indicated by "⊚."

In Examples 18 to 20, the thicknesses of the dummy magnet-fixing plate were set respectively to 2 mm, 3 mm, and 5 mm. In these Examples 18 to 20, the strengths of the magnetic field (vertical direction) in the transport path 40 were each set to a certain value or more, and the permanent magnets 31 did not separate from the yoke unit portions 71.

Meanwhile, in Comparative Example 21, the thickness of the dummy magnet-fixing plate is set to 1 mm, and hence the interval in the transport direction between the units 70 is small. In this case, although the strength of the magnetic field (vertical direction) in the transport path 40 is set to the certain value or more, the attractive force between the permanent magnets 31 and the yoke unit portions 71 is low, and the permanent magnets 31 separate from the yoke unit portions 71.

Further, in Comparative Examples 22 and 23, the thicknesses of the dummy magnet-fixing plate are set respectively to 7 mm and 10 mm, and hence the interval in the transport direction between the units 70 is large. In these cases, although the permanent magnets 31 do not separate from the yoke unit portions 71, none of the strengths of the magnetic field (vertical direction) in the transport path 40 reaches the certain value or more.

In other words, by setting the thickness of each of the magnet fixing plates 80 to 2 mm or more and 5 mm or less, the permanent magnets 31 can be prevented from separating from the yoke unit portions 71, and the strength of the magnetic field (vertical direction) in the transport path 40 can be maintained at the certain value or more.

(Shape of Magnet Fixing Plate 80)

Figure 24:
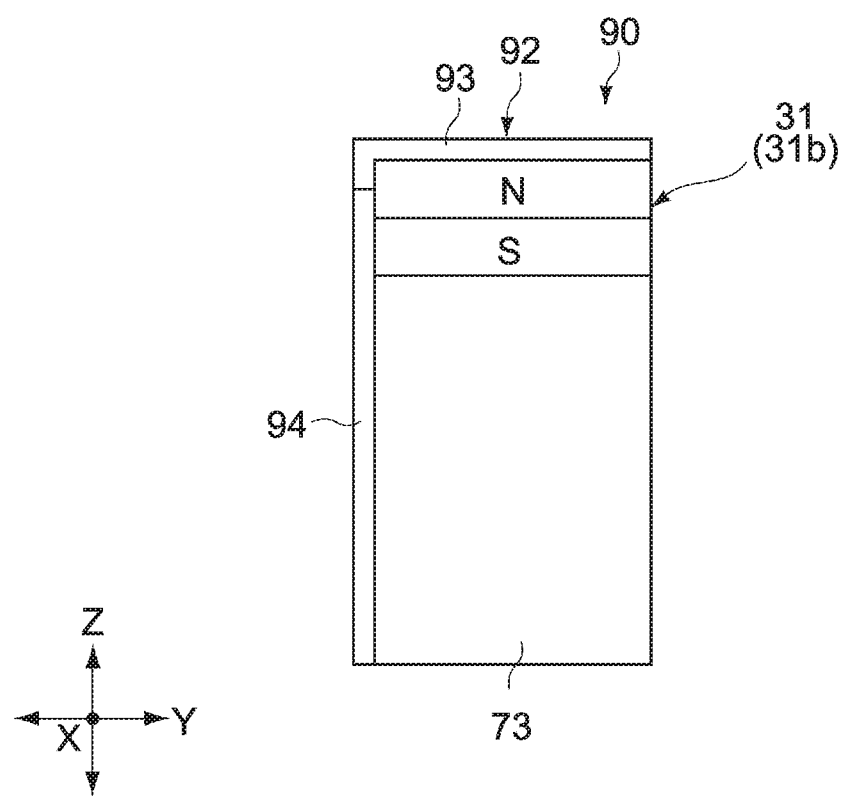
FIG. 24 An enlarged view of another magnet-fixing plate as viewed in the width direction.

FIG. 23 is an enlarged view of the magnet fixing plate 80 as viewed in the width direction. FIG. 24 is an enlarged view of another magnet-fixing plate 90 as viewed in the width direction.

The magnet fixing plate 80 illustrated in FIG. 23 is the same as the magnet fixing plate 80 illustrated in FIG. 7. The magnet fixing plate 90 illustrated in FIG. 24 includes an L-shaped first fixing member (non-magnetic: partially magnetic) and an L-shaped second fixing member 92 (non-magnetic: partially magnetic).

In addition, this magnet fixing plate 90 includes a third fixing member ((soft) magnetic) and a fourth fixing member ((soft) magnetic) that cover the front surface (or rear surface) of the yoke unit portion 71. Meanwhile, this magnet fixing plate 90 does not include a fifth fixing member and a sixth fixing member that cover the rear surface (or front surface) of the yoke unit portion 71.

In the magnet fixing plate 90, the surface on one side in the transport direction of the unit 90 (front surface or rear surface) is not covered with the magnet fixing plate 90. Thus, the distance between the units 70 is equal to the thickness of the magnet fixing plate 80 (note that, in the case illustrated in FIG. 23, the distance between the units 70 is equal to "thickness of magnet fixing plate 80×2" as described above).

In each of the L-shaped first fixing member and the L-shaped second fixing member 92, each of which is basically made of a non-magnetic material, a part 93 that covers the pole on the transport-path-40 side of the permanent magnet 31 is made of a (soft) magnetic material. By covering the pole on the transport-path-40 side of the permanent magnet 31 with the magnetic material in such a way, the magnetic field in the transport path 40 can be prevented from attenuating.

Meanwhile, in each of L-shaped first fixing member and the L-shaped second fixing member 92, a part 94 that covers the front surface (or rear surface) of the permanent magnet 31 is made of the non-magnetic material such that the magnetic field can be prevented from bridging between ones of the permanent magnets 31, which are adjacent to each other in the transport direction.

In the exemplary case described herein, the L-shaped first fixing member and the L-shaped second fixing member 92 are each partially made of the magnetic material. However, an entirety of each of the L-shaped first fixing member and the L-shaped second fixing member 92 may each be made of the non-magnetic material. Also in the U-shaped first fixing member 81 and the U-shaped second fixing member 82 illustrated in FIG. 23, the part that covers the pole on the transport-path-40 side of the permanent magnet 31 may be partially made of the (soft) magnetic material.

The L-shaped first fixing member and the L-shaped second fixing member 92 may each include a fitting portion 95 (the same applies to the U-shaped first fixing member 81 and the U-shaped second fixing member 82). FIG. 25 is a view illustrating a state in which the fitting portion 95 is provided to the L-shaped second fixing member 82.

The fitting portion 95 couples ones of the second fixing members 92 (or first fixing members), which are adjacent to each other in the transport direction. As illustrated in FIG. 25, the fitting portion 95 includes a protrusion portion 96 provided to upstream one of the second fixing members 92 (or first fixing members), and a recess portion 97 provided in a downstream one of the second fixing members 92 (or first fixing members).

The protrusion portion 96 is provided to protrude toward the downstream side in the transport direction, and the recess portion 97 is provided to be recessed toward the downstream side in the transport direction. The protrusion portion 96 and the recess portion 97 are provided at positions corresponding to each other at a height position that is close to the transport path 40 in the vertical direction.

<Effects>

As described hereinabove, in this embodiment, the yoke portion 50 is provided in the orientation device 26. This yoke portion 50, which is made of the soft magnetic material, connects to the poles on the side opposite to the transport-path-40 side of the plurality of first permanent magnets 31a, and to the poles on the side opposite to the transport-path-40 side of the plurality of second permanent magnets 31b. In addition, this yoke portion 50 forms the magnetic circuit cooperatively with the plurality of first permanent magnets 31a portion 30 and the second permanent magnets 31b.

Figure 26:
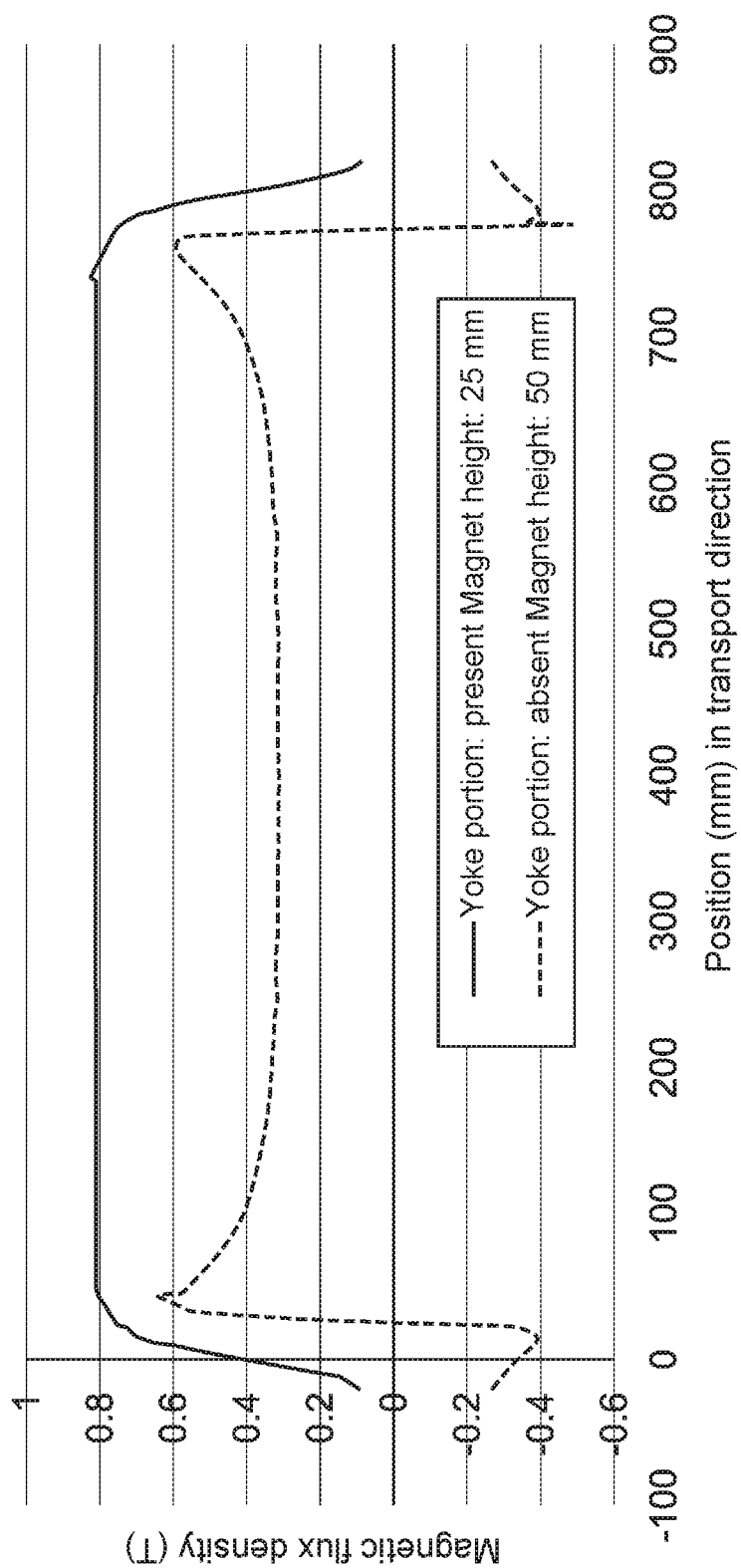
FIG. 26 A graph showing a comparison between a comparative example in which the yoke portion is not provided in the orientation device and an embodiment of the present technology, in which the yoke portion is provided in the orientation device.

FIG. 26 is a graph showing a comparison between a comparative example in which the yoke portion 50 is not provided in the orientation device 26 and this embodiment in which the yoke portion 50 is provided in the orientation device 26. Note that, in this comparative example, the magnet fixing plates 80 and other components are not provided.

As shown in FIG. 26, in the case of the comparative example in which the yoke portion 50 is not provided (refer to a broken line), by the influence of the demagnetizing field, the magnetic field in the transport path 40 attenuates near the center in the transport direction. Thus, in the comparative example, a large magnetic field cannot be generated in the transport path 40 without increasing the height Hm of each of the permanent magnets 31. In addition, in the comparative example, near an inlet and near an outlet of the transport path 40, polarity of the magnetic field is reversed. In the comparative example, this reversal of the polarity of the magnetic field can be prevented by increasing the interval in the transport direction between the permanent magnets 31.

Figure 27:
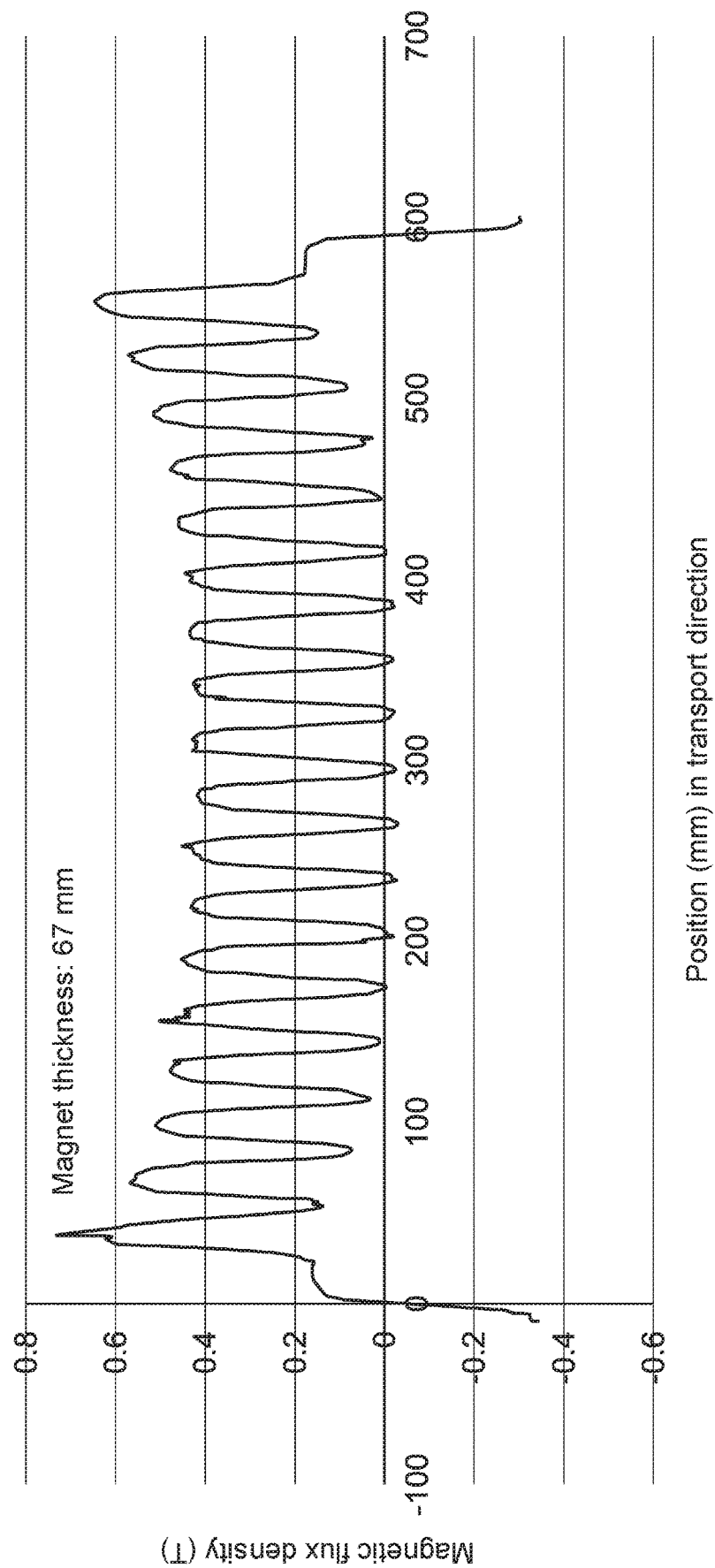
FIG. 27 A graph showing an exemplary case where, in the comparative example in which the yoke portion is not provided in the orientation device, an interval between the permanent magnets is increased.

FIG. 27 is a graph showing an exemplary case where, in the comparative example in which the yoke portion 50 is not provided in the orientation device 26, the interval in the transport direction between the permanent magnets 31 is increased.

As shown in FIG. 27, in the comparative example, when the interval in the transport direction between the permanent magnets 31 is increased, the reversal of the polarity of the magnetic field near the inlet and near the outlet of the transport path 40 is prevented. However, in the comparative example, the magnetic field in the transport path 40 remains attenuated near the center in the transport direction.

Referring back to FIG. 26, in this embodiment in which the yoke portion 50 is provided (refer to a solid line), such a problem that the magnetic field in the transport path 40 attenuates near the center in the transport direction do not occur. Thus, the magnetic field can be generated to be sufficiently high and uniform in the transport direction (also in width direction). In addition, such a strong and uniform magnetic field can be generated even when the height Hm of each of the permanent magnets 31 is small.

Further, in this embodiment in which the yoke portion 50 is provided, the reversal of the polarity of the magnetic field near the inlet and near the outlet of the transport path 40 also can be prevented.

Still further, in the case of the orientation device 26 of the permanent magnet type as in this embodiment, cost can be reduced lower than that of orientation devices of an electromagnet type (electromagnets needed for the vertical orientation are large and significantly expensive). Yet further, in this embodiment, the plurality of permanent magnet elements 32 is are arrayed to form each of the permanent magnets 31 is relatively small, and hence the cost can be further reduced.

Yet further, in this embodiment, the vertical component of the magnetic field in the transport path 40 is set 1.0 time or more as high as the coercive force of the magnetic coating film (magnetic powder). With this, the particles of the magnetic powder in the magnetic coating film can be sufficiently vertically oriented.

Yet further, in this embodiment, the thickness T (of thinnest part) of the yoke portion 50 is set such that the relationship Bmag×Wm<Byoke×2T is satisfied. With this, the strength of the magnetic field in the transport path 40 can be prevented from decreasing, and in addition, the magnetic field can be prevented from leaking to the outside of the orientation device 26.

Yet further, in this embodiment, the magnetic coating film can be efficiently dried by the drying portion 60 that includes the plurality of blowing ports 61 and the plurality of suction ports 62. In particular, in this embodiment, since the suction ports 62 are each arranged at the intermediate position in the transport direction between corresponding two of the blowing ports 61, the drying can be further efficiently performed.

Yet further, in this embodiment, in the transport path 40, the orientation area (first area) in which the plurality of blowing ports 61 is not provided in the transport direction, and the orientation-and-drying area (second area) in which the plurality of blowing ports 61 is provided in the transport direction are set. In addition, the orientation area is set as the part area on the upstream side in the transport direction, and the orientation-and-drying area is set as the part area on the downstream side out of the part area on the upstream side.

With this, after the particles of the magnetic powder have been sufficiently vertically oriented in the orientation area, the magnetic coating film can be dried and cured in the orientation-and-drying area while maintaining the state in which the particles of the magnetic powder have been vertically oriented.

Yet further, in this embodiment, the orientation device 26 includes the plurality of units 70 that is thin in the transport direction, is arrayed in the transport direction, and includes the first permanent magnets 31*a*, the second permanent magnets 31*b*, and the yoke unit portions 71. With this, the orientation device 26 can be easily assembled.

Yet further, in this embodiment, the magnet fixing plate 80 for fixing the first permanent magnet 31*a* and the second permanent magnet 31*b* to the yoke unit portion 71 is provided to each of the units 70. With this, the permanent magnets 31 can be prevented from separating from the yoke unit portion 71.

Yet further, this magnet fixing plate 80 is interposed between the ones of the units 70, which are adjacent to each other in the transport direction. In addition, the thickness of the magnet fixing plate 80 is set to 2 mm or more and 5 mm or less. By setting the thickness of the magnet fixing plate 80 to 2 mm or more and 5 mm or less in such a way such that the interval between the ones of the units 70, which are adjacent to each other in the transport direction, is adjusted, the permanent magnets 31 can be prevented from separating from the yoke unit portion 71, and the strength of the magnetic field (vertical direction) in the transport path 40 can be maintained at the certain value or more.

Yet further, in this embodiment, the parts of the magnet fixing plate 80, which correspond to the front surfaces and the rear surfaces (surfaces vertical to the transport direction) of the first permanent magnet 31*a* and the second permanent magnet 31*b*, are the non-magnetic portions. With this, the ones of the permanent magnets 31, which are adjacent to each other in the transport direction, can be prevented from bridging each other.

Yet further, in this embodiment, the parts of the magnet fixing plate 80, which correspond to the third yoke-unit portions 74, are the magnetic portions. With this, in the third yoke-unit portions 74 (third yoke portions 53), the magnetic flux can be prevented from being saturated.

Yet further, in this embodiment, the value of "distance X/height Hm" is set to 0.2 or more. With this, the magnetic flux that should advance in the vertical direction in the transport path 40 can be adequately prevented from advancing to the third-yoke-portion-53 sides, and from entering the third yoke portions 53. With this, the strength of the magnetic field in the transport path 40 can be prevented from decreasing.

<Various Modifications>

The present technology may also employ the following configurations.

(1) An orientation device, including:
 a transport path that allows a base on which a magnetic coating film containing magnetic powder has been formed to pass through the transport path along a transport direction;
 a permanent magnet portion that includes
  a plurality of first permanent magnets, and
  a plurality of second permanent magnets that is opposed to the plurality of first permanent magnets across the transport path in a vertical direction that is vertical to the transport direction in a manner that opposite poles face each other, the permanent magnet portion vertically orienting particles of the magnetic powder by applying a magnetic field to the magnetic coating film on the base that passes through the transport path; and a yoke portion that is made of a soft magnetic material, and that connects to poles on a side opposite to the transport path side of the plurality of first permanent magnets, and to poles on a side opposite to the transport path side of the plurality of second permanent magnets.

(2) The orientation device according to (1), in which a vertical component of the magnetic field in the transport path is 1.0 time or more as large as a coercive force of the magnetic coating film.

(3) The orientation device according to (1) or (2), in which the yoke portion includes a first yoke portion that supports the plurality of first permanent magnets from the side opposite to the transport path side of the plurality of first permanent magnets, a second yoke portion that supports the plurality of second permanent magnets from the side opposite to the transport path side of the plurality of second permanent magnets, and third yoke portions that couple the first yoke portion and the second yoke portion to each other.

(4) The orientation device according to (3), in which a relationship Bmag×Wm<Byoke×2T is satisfied, where T is a smallest thickness of a thickness in the vertical direction of the first yoke portion, a thickness in the vertical direction of the second yoke portion, and a thickness in a width direction of each of the third yoke portions, the width direction being a direction orthogonal to the transport direction and the vertical direction, Bmag is a remanent magnetic-flux density of the plurality of first permanent magnets and the plurality of second permanent magnets, Wm is a width of each of the plurality of first permanent magnets and the plurality of second permanent magnets, and Byoke is a saturation magnetic-flux density of the yoke portion.

(5) The orientation device according to any one of (1) to (4), further including:

a drying portion that dries the magnetic-layer coating film under a state in which the particles of the magnetic powder in the magnetic-layer coating film have been vertically oriented by the magnetic field applied from the permanent magnet portion.

(6) The orientation device according to (5), in which the drying portion includes a plurality of blowing ports that allows airflow for drying the magnetic coating film to be blown into the transport path.

(7) The orientation device according to (6), in which the orientation device includes, in the transport path, a first area in which the plurality of blowing ports is not provided in the transport direction, and a second area in which the plurality of blowing ports is provided in the transport direction.

(8) The orientation device according to (7), in which the first area is a part area on an upstream side in the transport direction, and the second area is a part area on a downstream side out of the part area on the upstream side.

(9) The orientation device according to (8), in which the plurality of first permanent magnets includes ones of the plurality of first permanent magnets, the ones of the plurality of first permanent magnets being located in the second area, the plurality of second permanent magnets includes ones of the plurality of second permanent magnets, the ones of the plurality of second permanent magnets being located in the second area, both the ones of the plurality of first permanent magnets and the ones of the plurality of second permanent magnets are each arranged at a predetermined gap in the transport direction, and the plurality of blowing ports is provided at positions corresponding to the gap.

(10) The orientation device according to any one of (6) to (9), in which the drying portion further includes a plurality of suction ports for allowing the airflow in the transport path to be sucked and discharged to an outside of the transport path.

(11) The orientation device according to (10), in which the plurality of blowing ports is provided to allow the airflow to be blown in the vertical direction, and the plurality of suction ports is provided to allow the airflow to be sucked in a width direction orthogonal to the transport direction and the vertical direction.

(12) The orientation device according to (11), in which each of the plurality of suction ports is provided at an intermediate position in the transport direction between corresponding two of the plurality of blowing ports.

(13) The orientation device according to any one of (1) to (12), in which the orientation device includes a plurality of units that is thin in the transport direction and arrayed in the transport direction, and each of the plurality of units includes corresponding one of the plurality of first permanent magnets, corresponding one of the plurality of second permanent magnets, and a yoke unit portion that constitutes a part of the yoke portion.

(14) The orientation device according to (13), further including:

a magnet fixing plate for fixing the corresponding one of the plurality of first permanent magnet and the corresponding one of the plurality of second permanent magnets to the yoke unit portion, the magnet fixing plate being interposed between ones of the plurality of units, the ones of the plurality of units being adjacent to each other in the transport direction.

(15) The orientation device according to (14), in which a thickness of the magnet fixing plate is 2 mm or more and 5 mm or less.

(16) The orientation device according to (14) or (15), in which the magnet fixing plate includes a magnetic portion, and a non-magnetic portion.

(17) The orientation device according to (16), in which parts of the magnet fixing plate, the parts corresponding to surfaces vertical to the transport direction of the corresponding one of the plurality of first permanent magnets and of the corresponding one of the plurality of second permanent magnets, are each the non-magnetic portion.

(18) The orientation device according to (16) or (17), in which
the yoke unit includes
a first yoke-unit portion that supports the corresponding one of the plurality of first permanent magnets from the side opposite to the transport path side of the plurality of first permanent magnets,
a second yoke-unit portion that supports the corresponding one of the plurality of second permanent magnets from the side opposite to the transport path side of the plurality of second permanent magnets, and
third yoke-unit portions that couple the first yoke-unit portion and the second yoke-unit portion to each other, and
parts of the magnet fixing plate, the parts corresponding to the third yoke-unit portions, are each the magnetic portion.

(19) A production method for a magnetic recording medium, the production method including, in a transport path in an orientation device:
allowing a base on which a magnetic coating film containing magnetic powder has been formed to pass through the transport path along a transport direction; and
causing a permanent magnet portion to apply a magnetic field to the magnetic coating film on the base that passes through the transport path, thereby vertically orienting particles of the magnetic powder, the orientation device including
the transport path that is formed along the transport direction,
the permanent magnet portion that includes
a plurality of first permanent magnets, and
a plurality of second permanent magnets that is opposed to the plurality of first permanent magnets across the transport path in a vertical direction that is vertical to the transport direction in a manner that opposite poles face each other, and
a yoke portion
that is made of a soft magnetic material, and
that connects
to poles on a side opposite to the transport path side of the plurality of first permanent magnets, and
to poles on a side opposite to the transport path side of the plurality of second permanent magnets.

(20) A magnetic recording medium that is produced, in a transport path in an orientation device, by:
allowing a base on which a magnetic coating film containing magnetic powder has been formed to pass through the transport path along a transport direction; and
causing a permanent magnet portion to apply a magnetic field to the magnetic coating film on the base that passes through the transport path, thereby vertically orienting particles of the magnetic powder, the orientation device including
the transport path that is formed along the transport direction,
the permanent magnet portion that includes
a plurality of first permanent magnets, and
a plurality of second permanent magnets that is opposed to the plurality of first permanent magnets across the transport path in a vertical direction that is vertical to the transport direction in a manner that opposite poles face each other, and
a yoke portion
that is made of a soft magnetic material, and
that connects
to poles on a side opposite to the transport path side of the plurality of first permanent magnets, and
to poles on a side opposite to the transport path side of the plurality of second permanent magnets.

REFERENCE SIGNS LIST 26 orientation device
30 permanent magnet portion
31 permanent magnet
40 transport path
50 yoke portion
60 drying portion
70 unit
80, 90 magnet fixing plate
100 production apparatus

The invention claimed is:
1. An orientation device, comprising:
a transport path that allows a base on which a magnetic coating film containing magnetic powder has been formed to pass through the transport path along a transport direction;
a permanent magnet portion that includes
a plurality of first permanent magnets, and
a plurality of second permanent magnets that is opposed to the plurality of first permanent magnets across the transport path in a vertical direction that is vertical to the transport direction in a manner that opposite poles face each other, the permanent magnet portion vertically orienting particles of the magnetic powder by applying a magnetic field to the magnetic coating film on the base that passes through the transport path; and
a yoke portion
that is made of a soft magnetic material, and
that connects
to poles on a side opposite to the transport path side of the plurality of first permanent magnets, and
to poles on a side opposite to the transport path side of the plurality of second permanent magnets,
wherein the yoke portion includes
a first yoke portion that supports the plurality of first permanent magnets from the side opposite to the transport path side of the plurality of first permanent magnets,
a second yoke portion that supports the plurality of second permanent magnets from the side opposite to the transport path side of the plurality of second permanent magnets, and
third yoke portions that couple the first yoke portion and the second yoke portion to each other, and
wherein a relationship $B_{mag} \times W_m < B_{yoke} \times 2T$ is satisfied, where
T is a smallest thickness of
a thickness in the vertical direction of the first yoke portion,
a thickness in the vertical direction of the second yoke portion, and
a thickness in a width direction of each of the third yoke portions, the width direction being a direction orthogonal to the transport direction and the vertical direction,

Bmag is a remanent magnetic-flux density of the plurality of first permanent magnets and the plurality of second permanent magnets, Wm is a width of each of the plurality of first permanent magnets and the plurality of second permanent magnets, and Byoke is a saturation magnetic-flux density of the yoke portion.

2. The orientation device according to claim 1, wherein a vertical component of the magnetic field in the transport path is 1.0 time or more as large as a coercive force of the magnetic coating film.

3. The orientation device according to claim 1, further comprising:
a drying portion that dries the magnetic-layer coating film under a state in which the particles of the magnetic powder in the magnetic-layer coating film have been vertically oriented by the magnetic field applied from the permanent magnet portion.

4. The orientation device according to claim 3, wherein the drying portion includes a plurality of blowing ports that allows airflow for drying the magnetic coating film to be blown into the transport path.

5. The orientation device according to claim 4, wherein the orientation device includes, in the transport path,
a first area in which the plurality of blowing ports is not provided in the transport direction, and
a second area in which the plurality of blowing ports is provided in the transport direction.

6. The orientation device according to claim 5, wherein the first area is a part area on an upstream side in the transport direction, and
the second area is a part area on a downstream side out of the part area on the upstream side.

7. The orientation device according to claim 6, wherein the plurality of first permanent magnets includes a first permanent magnet portion of two or more of the plurality of first permanent magnets, the first permanent magnet portion being located in the second area,
the plurality of second permanent magnets includes a second permanent magnet portion of two or more of the plurality of second permanent magnets, the second permanent magnet portion being located in the second area,
both the first permanent magnet portion and the second permanent magnet portion are each arranged at a predetermined gap in the transport direction, and
the plurality of blowing ports is provided at positions corresponding to the gap.

8. The orientation device according to claim 4, wherein the drying portion further includes a plurality of suction ports for allowing the airflow in the transport path to be sucked and discharged to an outside of the transport path.

9. The orientation device according to claim 8, wherein the plurality of blowing ports is provided to allow the airflow to be blown in the vertical direction, and
the plurality of suction ports is provided to allow the airflow to be sucked in a width direction orthogonal to the transport direction and the vertical direction.

10. The orientation device according to claim 1, wherein the orientation device includes a plurality of units that is thin in the transport direction and arrayed in the transport direction, and
each of the plurality of units includes
corresponding one of the plurality of first permanent magnets,
corresponding one of the plurality of second permanent magnets, and
a yoke unit portion that constitutes a part of the yoke portion.

11. An orientation device, comprising:
a transport path that allows a base on which a magnetic coating film containing magnetic powder has been formed to pass through the transport path along a transport direction;
a permanent magnet portion that includes
a plurality of first permanent magnets, and
a plurality of second permanent magnets that is opposed to the plurality of first permanent magnets across the transport path in a vertical direction that is vertical to the transport direction in a manner that opposite poles face each other, the permanent magnet portion vertically orienting particles of the magnetic powder by applying a magnetic field to the magnetic coating film on the base that passes through the transport path;
a yoke portion
that is made of a soft magnetic material, and
that connects
to poles on a side opposite to the transport path side of the plurality of first permanent magnets, and
to poles on a side opposite to the transport path side of the plurality of second permanent magnets; and
a drying portion that dries the magnetic-layer coating film under a state in which the particles of the magnetic powder in the magnetic-layer coating film have been vertically oriented by the magnetic field applied from the permanent magnet portion,
wherein the drying portion includes a plurality of blowing ports that allows airflow for drying the magnetic coating film to be blown into the transport path,
wherein the drying portion further includes a plurality of suction ports for allowing the airflow in the transport path to be sucked and discharged to an outside of the transport path,
wherein the plurality of blowing ports is provided to allow the airflow to be blown in the vertical direction, and the plurality of suction ports is provided to allow the airflow to be sucked in a width direction orthogonal to the transport direction and the vertical direction, and
wherein each of the plurality of suction ports is provided at an intermediate position in the transport direction between corresponding two of the plurality of blowing ports.

12. (An orientation device, comprising:
a transport path that allows a base on which a magnetic coating film containing magnetic powder has been formed to pass through the transport path along a transport direction;
a permanent magnet portion that includes
a plurality of first permanent magnets, and
a plurality of second permanent magnets that is opposed to the plurality of first permanent magnets across the transport path in a vertical direction that is vertical to the transport direction in a manner that opposite poles face each other, the permanent magnet portion vertically orienting particles of the magnetic powder by applying a magnetic field to the magnetic coating film on the base that passes through the transport path; and a yoke portion
that is made of a soft magnetic material, and
that connects
to poles on a side opposite to the transport path side of the plurality of first permanent magnets, and
to poles on a side opposite to the transport path side of the plurality of second permanent magnets,
wherein the orientation device includes a plurality of units that is thin in the transport direction and arrayed in the transport direction, and
each of the plurality of units includes
corresponding one of the plurality of first permanent magnets,
corresponding one of the plurality of second permanent magnets, and
a yoke unit portion that constitutes a part of the yoke portion, and
wherein the orientation device includes a magnet fixing plate for fixing the corresponding one of the plurality of first permanent magnet and the corresponding one of the plurality of second permanent magnets to the yoke unit portion, the magnet fixing plate being interposed between ones of the plurality of units, the ones of the plurality of units being adjacent to each other in the transport direction.

13. The orientation device according to claim 12, wherein a thickness of the magnet fixing plate is 2 mm or more and 5 mm or less.

14. The orientation device according to claim 12, wherein the magnet fixing plate includes
a magnetic portion, and
a non-magnetic portion.

15. The orientation device according to claim 14, wherein parts of the magnet fixing plate, the parts corresponding to surfaces vertical to the transport direction of the corresponding one of the plurality of first permanent magnets and of the corresponding one of the plurality of second permanent magnets, are each the non-magnetic portion.

16. The orientation device according to claim 14, wherein the yoke unit includes
a first yoke-unit portion that supports the corresponding one of the plurality of first permanent magnets from the side opposite to the transport path side of the plurality of first permanent magnets,
a second yoke-unit portion that supports the corresponding one of the plurality of second permanent magnets from the side opposite to the transport path side of the plurality of second permanent magnets, and
third yoke-unit portions that couple the first yoke-unit portion and the second yoke-unit portion to each other, and
parts of the magnet fixing plate, the parts corresponding to the third yoke-unit portions, are each the magnetic portion.

17. A production method for a magnetic recording medium, the production method comprising, in a transport path in an orientation device:
allowing a base on which a magnetic coating film containing magnetic powder has been formed to pass through the transport path along a transport direction; and
causing a permanent magnet portion to apply a magnetic field to the magnetic coating film on the base that passes through the transport path, thereby vertically orienting particles of the magnetic powder, the orientation device including
the transport path that is formed along the transport direction,
the permanent magnet portion that includes
a plurality of first permanent magnets, and
a plurality of second permanent magnets that is opposed to the plurality of first permanent magnets across the transport path in a vertical direction that is vertical to the transport direction in a manner that opposite poles face each other, and
a yoke portion
that is made of a soft magnetic material, and
that connects
to poles on a side opposite to the transport path side of the plurality of first permanent magnets, and
to poles on a side opposite to the transport path side of the plurality of second permanent magnets,
wherein the yoke portion includes
a first yoke portion that supports the plurality of first permanent magnets from the side opposite to the transport path side of the plurality of first permanent magnets,
a second yoke portion that supports the plurality of second permanent magnets from the side opposite to the transport path side of the plurality of second permanent magnets, and
third yoke portions that couple the first yoke portion and the second yoke portion to each other, and
wherein a relationship $B_{mag} \times W_m < B_{yoke} \times 2T$ is satisfied, where
T is a smallest thickness of
a thickness in the vertical direction of the first yoke portion,
a thickness in the vertical direction of the second yoke portion, and
a thickness in a width direction of each of the third yoke portions, the width direction being a direction orthogonal to the transport direction and the vertical direction,
$B_{mag}$ is a remanent magnetic-flux density of the plurality of first permanent magnets and the plurality of second permanent magnets,
$W_m$ is a width of each of the plurality of first permanent magnets and the plurality of second permanent magnets, and
$B_{yoke}$ is a saturation magnetic-flux density of the yoke portion.

18. A production method for a magnetic recording medium, the production method comprising, in a transport path in an orientation device:
allowing a base on which a magnetic coating film containing magnetic powder has been formed to pass through the transport path along a transport direction; and
causing a permanent magnet portion to apply a magnetic field to the magnetic coating film on the base that passes through the transport path, thereby vertically orienting particles of the magnetic powder, the orientation device including
the transport path that is formed along the transport direction,
the permanent magnet portion that includes
a plurality of first permanent magnets, and
a plurality of second permanent magnets that is opposed to the plurality of first permanent magnets across the transport path in a vertical direction that is vertical to the transport direction in a manner that opposite poles face each other, and
a yoke portion
that is made of a soft magnetic material, and
that connects
to poles on a side opposite to the transport path side of the plurality of first permanent magnets, and
to poles on a side opposite to the transport path side of the plurality of second permanent magnets; and
a drying portion that dries the magnetic-layer coating film under a state in which the particles of the magnetic powder in the magnetic-layer coating film have been vertically oriented by the magnetic field applied from the permanent magnet portion,
wherein the drying portion includes a plurality of blowing ports that allows airflow for drying the magnetic coating film to be blown into the transport path,
wherein the drying portion further includes a plurality of suction ports for allowing the airflow in the transport path to be sucked and discharged to an outside of the transport path,
wherein the plurality of blowing ports is provided to allow the airflow to be blown in the vertical direction, and the plurality of suction ports is provided to allow the airflow to be sucked in a width direction orthogonal to the transport direction and the vertical direction, and
wherein each of the plurality of suction ports is provided at an intermediate position in the transport direction between corresponding two of the plurality of blowing ports.

19. A production method for a magnetic recording medium, the production method comprising, in a transport path in an orientation device:
allowing a base on which a magnetic coating film containing magnetic powder has been formed to pass through the transport path along a transport direction; and
causing a permanent magnet portion to apply a magnetic field to the magnetic coating film on the base that passes through the transport path, thereby vertically orienting particles of the magnetic powder, the orientation device including
the transport path that is formed along the transport direction,
the permanent magnet portion that includes
a plurality of first permanent magnets, and
a plurality of second permanent magnets that is opposed to the plurality of first permanent magnets across the transport path in a vertical direction that is vertical to the transport direction in a manner that opposite poles face each other, and
a yoke portion
that is made of a soft magnetic material, and
that connects
to poles on a side opposite to the transport path side of the plurality of first permanent magnets, and
to poles on a side opposite to the transport path side of the plurality of second permanent magnets,
wherein the orientation device includes a plurality of units that is thin in the transport direction and arrayed in the transport direction, and
each of the plurality of units includes
corresponding one of the plurality of first permanent magnets,
corresponding one of the plurality of second permanent magnets, and
a yoke unit portion that constitutes a part of the yoke portion, and
wherein the orientation device includes a magnet fixing plate for fixing the corresponding one of the plurality of first permanent magnet and the corresponding one of the plurality of second permanent magnets to the yoke unit portion, the magnet fixing plate being interposed between ones of the plurality of units, the ones of the plurality of units being adjacent to each other in the transport direction.

* * * * *